United States Patent
Ditmer et al.

(10) Patent No.: US 6,490,620 B1
(45) Date of Patent: Dec. 3, 2002

(54) INTEGRATED PROXY INTERFACE FOR WEB BASED BROADBAND TELECOMMUNICATIONS MANAGEMENT

(75) Inventors: Christine M. Ditmer, Fairview, TX (US); Randall W. King, Plano, TX (US); W. Russell Kennington, Plano, TX (US); Patrick W. Pirtle, Dallas, TX (US); Diane J. Wells, Allen, TX (US)

(73) Assignee: WorldCom, Inc., Clinton, MS (US)

(*) Notice: Subject to any disclaimer, the term of this patent is extended or adjusted under 35 U.S.C. 154(b) by 0 days.

(21) Appl. No.: 09/159,407

(22) Filed: Sep. 24, 1998

Related U.S. Application Data

(60) Provisional application No. 60/060,655, filed on Sep. 26, 1997.

(51) Int. Cl.[7] ............................................. G06F 15/173
(52) U.S. Cl. ........................ 709/224; 709/226; 709/223
(58) Field of Search ................................. 709/224, 229, 709/202, 203, 226, 250, 223; 705/1, 10, 35, 8, 44, 30; 707/4, 10, 104; 370/352, 384, 353; 345/335; 379/9, 10; 714/48, 26; 713/155, 201

(56) References Cited

U.S. PATENT DOCUMENTS

| | | |
|---|---|---|
| 4,160,129 A | 7/1979 | Peyser et al. |
| 4,345,315 A | 8/1982 | Cadotte et al. |
| 4,817,050 A | 3/1989 | Komatsu et al. |
| 4,893,248 A | 1/1990 | Pitts et al. |
| 4,972,504 A | 11/1990 | Daniel, Jr. et al. |
| 5,041,972 A | 8/1991 | Frost |
| 5,075,771 A | 12/1991 | Hashimoto |
| 5,131,020 A | 7/1992 | Liebesny et al. |
| 5,136,707 A | 8/1992 | Block et al. |
| 5,223,699 A | 6/1993 | Flynn et al. |
| 5,228,076 A | 7/1993 | Hopner et al. |

(List continued on next page.)

FOREIGN PATENT DOCUMENTS

| | | |
|---|---|---|
| EP | 0 809 387 A2 | 5/1997 |
| WO | WO 97/16911 | 5/1997 |
| WO | WO 97/23988 | 7/1997 |
| WO | WO 98/19472 | 5/1998 |
| WO | WO 99/01826 | 1/1999 |

OTHER PUBLICATIONS

Inoue et al, Secure Mobile IP Security Primitives, IEEE 1997.*
Biggs, M., "Help for the Web enhances customer support, reduces help desk load"*Inforworld*, Jun. 16, 1997, v. 19, No. 24, pp. 82+.
Burch, B., "AT&T, MCI to release new management tools", *Network World*, Jun. 1997, pp. 1994, p. 19.
Low, C., "Integrating Communication Services", *IEEE Communication Magazine*, Jun. 1997, pp. 164–169.
"McAfee's New 'Self–Service' Help Desk Web Suite Makes PCs Help Desk–Ready", Newswire Association Inc., Oct. 13, 1997.

(List continued on next page.)

*Primary Examiner*—Mark H. Rinehart
*Assistant Examiner*—Thong Vu

(57) ABSTRACT

A Web/Internet-based performance reporting and trouble shooting tool that enables customers to understand the performance of their broadband telecommunications data networks via a graphical user interface. The tool is an object-oriented client server application that provides customers Web/Internet access to real-time SNMP alarms, real-time events, and near real-time performance statistics and configuration reports pertaining to their virtual transport networks including ATM, Frame-Relay and other broadband networks. Messaging is employed to enable specific report option presentation, ad-hoc report customization and report execution options. A Web/Internet-based reporting system infrastructure is provided that enables the secure initiation, acquisition, and presentation of customer reports to via a Web browser.

23 Claims, 34 Drawing Sheets

U.S. PATENT DOCUMENTS

| | | | |
|---|---|---|---|
| 5,245,533 A | | 9/1993 | Marshall |
| 5,262,760 A | * | 11/1993 | Iwamura et al. ............ 345/861 |
| 5,285,494 A | | 2/1994 | Sprecher et al. |
| 5,287,270 A | | 2/1994 | Hardy et al. |
| 5,313,598 A | | 5/1994 | Yamakawa |
| 5,315,093 A | | 5/1994 | Stewart |
| 5,325,290 A | | 6/1994 | Cauffman et al. |
| 5,327,486 A | | 7/1994 | Wolff et al. |
| 5,361,259 A | * | 11/1994 | Hunt et al. ................. 370/402 |
| 5,369,571 A | | 11/1994 | Metts |
| 5,452,446 A | | 9/1995 | Johnson et al. |
| 5,475,836 A | | 12/1995 | Harris et al. |
| 5,481,542 A | | 1/1996 | Logston et al. |
| 5,483,596 A | | 1/1996 | Rosenow et al. |
| 5,490,060 A | | 2/1996 | Malec et al. |
| 5,491,779 A | | 2/1996 | Bezjian |
| 5,506,893 A | | 4/1996 | Buscher et al. |
| 5,526,257 A | | 6/1996 | Lerner |
| 5,530,744 A | | 6/1996 | Charalambous et al. |
| 5,533,108 A | | 7/1996 | Harris et al. |
| 5,537,611 A | | 7/1996 | Rajagopal et al. |
| 5,539,734 A | * | 7/1996 | Burwell et al. ............. 370/410 |
| 5,548,726 A | | 8/1996 | Pettus |
| 5,551,025 A | | 8/1996 | O'Reilly et al. |
| 5,555,290 A | | 9/1996 | McLeod et al. |
| 5,563,805 A | | 10/1996 | Arbuckle et al. |
| 5,566,351 A | | 10/1996 | Crittenden et al. |
| 5,586,260 A | | 12/1996 | Hu |
| 5,602,918 A | | 2/1997 | Chen et al. |
| 5,610,915 A | * | 3/1997 | Elliott et al. |
| 5,621,727 A | | 4/1997 | Vaudreuil |
| 5,623,601 A | | 4/1997 | Vu |
| 5,630,066 A | * | 5/1997 | Gosling |
| 5,649,182 A | | 7/1997 | Reitz |
| 5,650,994 A | | 7/1997 | Daley |
| 5,659,601 A | | 8/1997 | Cheslog |
| 5,666,481 A | | 9/1997 | Lewis |
| 5,671,354 A | | 9/1997 | Ito et al. |
| 5,689,645 A | | 11/1997 | Schettler et al. |
| 5,692,030 A | | 11/1997 | Teglovic et al. |
| 5,692,181 A | | 11/1997 | Anand et al. |
| 5,694,546 A | | 12/1997 | Reisman |
| 5,699,403 A | | 12/1997 | Ronnen |
| 5,699,528 A | * | 12/1997 | Hogan |
| 5,706,502 A | | 1/1998 | Foley et al. |
| 5,708,780 A | | 1/1998 | Levergood et al. |
| 5,710,882 A | * | 1/1998 | Svennevik et al. ......... 709/227 |
| 5,721,913 A | | 2/1998 | Ackroff et al. |
| 5,727,129 A | | 3/1998 | Barrett et al. |
| 5,734,709 A | | 3/1998 | De Witt et al. |
| 5,734,831 A | | 3/1998 | Sanders |
| 5,742,762 A | | 4/1998 | Scholl et al. |
| 5,742,763 A | | 4/1998 | Jones |
| 5,742,768 A | | 4/1998 | Gennaro et al. |
| 5,742,905 A | | 4/1998 | Pepe et al. |
| 5,745,754 A | | 4/1998 | Lagarde et al. |
| 5,754,830 A | | 5/1998 | Butts et al. |
| 5,757,900 A | | 5/1998 | Nagal et al. |
| 5,764,756 A | | 6/1998 | Onweller |
| 5,768,501 A | | 6/1998 | Lewis |
| 5,774,660 A | | 6/1998 | Brendel et al. |
| 5,778,178 A | | 7/1998 | Arunachalam |
| 5,778,377 A | | 7/1998 | Marlin et al. |
| 5,781,550 A | | 7/1998 | Templin et al. |
| 5,787,160 A | | 7/1998 | Chaney et al. |
| 5,787,412 A | * | 7/1998 | Bosch et al. |
| 5,790,780 A | | 8/1998 | Brichta et al. |
| 5,790,789 A | | 8/1998 | Suarez |
| 5,790,797 A | | 8/1998 | Shimada et al. |
| 5,790,809 A | | 8/1998 | Holmes |
| 5,793,762 A | | 8/1998 | Penners et al. |
| 5,793,964 A | * | 8/1998 | Rogers et al. |
| 5,796,393 A | | 8/1998 | MacNaughton et al. |
| 5,799,154 A | | 8/1998 | Kuriyan |
| 5,802,320 A | | 9/1998 | Baehr et al. |
| 5,805,803 A | | 9/1998 | Birrell et al. |
| 5,812,533 A | * | 9/1998 | Cox et al. |
| 5,812,654 A | | 9/1998 | Anderson et al. |
| 5,812,750 A | | 9/1998 | Dev et al. |
| 5,815,080 A | | 9/1998 | Taguchi |
| 5,815,665 A | | 9/1998 | Teper et al. |
| 5,819,225 A | | 10/1998 | Eastwood et al. |
| 5,819,271 A | | 10/1998 | Mahaoney et al. |
| 5,825,769 A | * | 10/1998 | O'Reilly et al. |
| 5,825,890 A | | 10/1998 | Elgamal et al. |
| 5,826,029 A | | 10/1998 | Gore, Jr. et al. |
| 5,826,269 A | | 10/1998 | Hussey |
| 5,832,519 A | | 11/1998 | Bowen et al. |
| 5,835,084 A | | 11/1998 | Bailey et al. |
| 5,844,896 A | | 12/1998 | Marks et al. |
| 5,845,067 A | | 12/1998 | Porter et al. |
| 5,845,267 A | | 12/1998 | Ronen |
| 5,848,233 A | | 12/1998 | Radia et al. |
| 5,848,396 A | * | 12/1998 | Gerace |
| 5,848,399 A | | 12/1998 | Burke |
| 5,850,517 A | | 12/1998 | Verkler et al. |
| 5,852,810 A | | 12/1998 | Sotiroff et al. |
| 5,852,812 A | | 12/1998 | Reeder |
| 5,862,325 A | | 1/1999 | Reed et al. |
| 5,867,495 A | | 2/1999 | Elliott et al. |
| 5,870,558 A | * | 2/1999 | Branton, Jr. et al. ......... 709/224 |
| 5,875,236 A | | 2/1999 | Jankowitz et al. |
| 5,877,759 A | * | 3/1999 | Bauer |
| 5,881,237 A | * | 3/1999 | Schwaller et al. .......... 709/224 |
| 5,883,948 A | | 3/1999 | Dunn |
| 5,884,032 A | * | 3/1999 | Bateman et al. |
| 5,884,312 A | | 3/1999 | Dustan et al. |
| 5,892,900 A | | 4/1999 | Ginter et al. |
| 5,907,681 A | * | 5/1999 | Bates et al. |
| 5,909,679 A | * | 6/1999 | Hall |
| 5,909,682 A | * | 6/1999 | Cowan et al. |
| 5,915,001 A | * | 6/1999 | Uppaluru |
| 5,920,542 A | * | 7/1999 | Henderson |
| 5,923,016 A | * | 7/1999 | Fredregill et al. |
| 5,930,764 A | | 7/1999 | Melchione et al. |
| 5,930,804 A | | 7/1999 | Yu et al. |
| 5,933,142 A | | 8/1999 | LaStrange et al. |
| 5,937,165 A | * | 8/1999 | Schwaller et al. .......... 709/224 |
| 5,938,729 A | * | 8/1999 | Cote et al. ................... 709/224 |
| 5,949,976 A | * | 9/1999 | Chappelle .................... 709/224 |
| 5,953,389 A | | 9/1999 | Pruett et al. |
| 5,956,714 A | | 9/1999 | Condon |
| 5,958,016 A | * | 9/1999 | Chang et al. ................ 709/229 |
| 5,960,411 A | | 9/1999 | Hartman et al. |
| 5,961,602 A | | 10/1999 | Thompson et al. |
| 5,963,925 A | | 10/1999 | Kolling et al. |
| 5,966,695 A | | 10/1999 | Melchione et al. |
| 5,970,467 A | | 10/1999 | Alavi |
| 5,974,396 A | | 10/1999 | Anderson et al. |
| 5,974,441 A | | 10/1999 | Rogers et al. |
| 5,982,864 A | | 11/1999 | Jagadish et al. |
| 5,982,891 A | | 11/1999 | Ginter et al. |
| 5,983,350 A | | 11/1999 | Minear et al. |
| 5,991,733 A | | 11/1999 | Aleia et al. |
| 5,991,746 A | | 11/1999 | Wang |
| 5,991,806 A | | 11/1999 | McHann, Jr. |
| 5,995,948 A | | 11/1999 | Whitford et al. |
| 5,999,525 A | | 12/1999 | Krishnaswamy et al. |
| 5,999,965 A | | 12/1999 | Kelly |
| 5,999,972 A | | 12/1999 | Gish |
| 5,999,973 A | | 12/1999 | Glitho et al. |

| | | |
|---|---|---|
| 6,003,079 A * | 12/1999 | Friedrich et al. ............ 709/224 |
| 6,006,265 A | 12/1999 | Rangan et al. |
| 6,011,844 A | 1/2000 | Uppaluru et al. |
| 6,012,090 A | 1/2000 | Chung et al. |
| 6,014,702 A | 1/2000 | King et al. |
| 6,018,768 A | 1/2000 | Ullman et al. |
| 6,021,409 A | 2/2000 | Burrows |
| 6,023,762 A | 2/2000 | Dean et al. |
| 6,029,182 A | 2/2000 | Nehab et al. |
| 6,031,904 A | 2/2000 | An et al. |
| 6,032,132 A | 2/2000 | Nelson |
| 6,032,184 A | 2/2000 | Cogger et al. |
| 6,041,325 A | 3/2000 | Shah et al. |
| 6,041,357 A | 3/2000 | Kunzelman et al. |
| 6,044,144 A | 3/2000 | Becker et al. |
| 6,044,362 A | 3/2000 | Neely |
| 6,049,602 A | 4/2000 | Foladare et al. |
| 6,049,789 A | 4/2000 | Smorodinsky |
| 6,052,450 A | 4/2000 | Allison et al. |
| 6,058,170 A | 5/2000 | Jagadish et al. |
| 6,058,381 A | 5/2000 | Nelson |
| 6,064,667 A | 5/2000 | Gisby et al. |
| 6,065,002 A | 5/2000 | Knotts et al. |
| 6,065,059 A | 5/2000 | Shieh et al. |
| 6,072,493 A | 6/2000 | Driskell et al. |
| 6,073,105 A | 6/2000 | Sutcliffe et al. |
| 6,073,122 A | 6/2000 | Wool |
| 6,073,241 A | 6/2000 | Rosenberg et al. |
| 6,078,891 A | 6/2000 | Riordan et al. |
| 6,078,924 A | 6/2000 | Ainsbury et al. |
| 6,084,953 A | 7/2000 | Bardenheuer et al. |
| 6,085,171 A | 7/2000 | Leonard |
| 6,085,190 A | 7/2000 | Sakata |
| 6,088,451 A | 7/2000 | He et al. |
| 6,088,796 A | 7/2000 | Cianfrocca et al. |
| 6,091,808 A | 7/2000 | Wood et al. |
| 6,094,655 A | 7/2000 | Rogers et al. |
| 6,104,704 A | 8/2000 | Buhler et al. |
| 6,105,131 A * | 8/2000 | Carroll ....................... 713/155 |
| 6,108,700 A * | 8/2000 | Maccabee et al. .......... 709/224 |
| 6,108,782 A | 8/2000 | Fletcher et al. |
| 6,112,238 A | 8/2000 | Boyd et al. |
| 6,112,242 A | 8/2000 | Jois et al. |
| 6,115,040 A | 9/2000 | Bladow et al. |
| 6,115,458 A | 9/2000 | Taskett |
| 6,115,693 A * | 9/2000 | McDonough et al. ......... 705/10 |
| 6,115,737 A | 9/2000 | Ely et al. |
| 6,119,109 A | 9/2000 | Muratani et al. |
| 6,122,258 A | 9/2000 | Brown |
| 6,128,624 A | 10/2000 | Papierniak et al. |
| 6,130,933 A | 10/2000 | Miloslavsky |
| 6,131,095 A | 10/2000 | Low et al. |
| 6,131,116 A | 10/2000 | Riggins et al. |
| 6,134,584 A | 10/2000 | Chang et al. |
| 6,137,869 A | 10/2000 | Voit et al. |
| 6,145,001 A | 11/2000 | Scholl et al. |
| 6,154,744 A | 11/2000 | Kenner et al. |
| 6,161,102 A | 12/2000 | Yanagihara et al. |
| 6,161,126 A | 12/2000 | Wies et al. ................. 709/203 |
| 6,161,128 A | 12/2000 | Smyk |
| 6,173,311 B1 | 1/2001 | Hassett et al. |
| 6,205,456 B1 | 3/2001 | Nakao |
| 6,212,506 B1 | 4/2001 | Shah et al. |
| 6,212,558 B1 | 4/2001 | Antur et al. |
| 6,240,450 B1 | 5/2001 | Sharples et al. |
| 6,253,239 B1 | 6/2001 | Shklar et al. |
| 6,286,050 B1 | 9/2001 | Pullen et al. |
| 6,292,481 B1 | 9/2001 | Voit et al. |
| 6,295,551 B1 | 9/2001 | Roberts et al. |
| 6,377,993 B1 | 4/2002 | Brandt et al. |
| 2001/0001014 A1 | 5/2001 | Akins, III et al. |

OTHER PUBLICATIONS

Niemeyer, R., "Using Web Technologies in Two MLS Environments: A Security Analysis." *IEEE*, pp. 205–214, 1997.

Porter, T., "MCI offers tracking system: Direct Dispatch lets users eye problems remotely", *Service News*, Apr. 1994, p. 17.

Shklar, L., et al., "MataMagic: Generating Virtual Web Sites Through Data Modeling,"http://www.scope.gmd.de/info/www6/posters/714/poster714.html.*

Vizard, M. et al., "MCI to Pilot Convergence Billing Service", *InfoWorld*, v. 18, Issue 37, Sep. 9, 1996.*

Yager, T., "Mixed Messages", *UNIX Review*, v. 16, n. 2, p. 29, Feb. 1998.*

"Carriers Improve Net Management Services", *Communications Week*, May 2, 1994, p. 74.*

"Network management; new software platform enhances network management capabilities; MCI ServiceView offers greater cost savings, increased flexibility.", Product Announcement, *Edge*, Oct. 2, 1995, on & about AT&T, v. 10, n. 375, p. 11(1).*

"New software platform enhances network management capabities...", *Business Wire*, Sep. 28, 1995 p. 9281122.

"User's Guide: Microsoft Access", Microsoft Corporation, 1994, pp. 378,594,599,630–632 (13).

Jainschigg, J., "Billing confirmed: this easy-to-use box turns guest calls into revenue." *Teleconnect*, vol. 12, No. 9, p. 39(4).

Chapman, D. Brent et al., "Building Internet Firewalls", Nov. 1995, O'Reilly & Associates, p. 58.

He, Teniguchi, "Internet Traffic Control and Management Architecture", IEEE, Oct. 22–24, 1998, pp. s46–03–1—s46–03–5.

Sixth International Conference on Network Protocols, IEEE, Technical Communication Services, Oct. 13–16, 1998, Table of Contents.

Markovich, Robert, "WAN Service Level Management Could Keep Your Feet Out of the Fire, Ensure Carriers Dilligence", Network World, Jul. 7, 1997.

Quadri et al., Hewlett–Packard and Cisco Systems, "Internet Usage Platform" White Paper.

"HP and Cisco Deliver Internet Usage Platform and Billing and Analysis Solutions, New Platform and Solutions Allow ISPs and Carriers to Offer Value–added Services", Copyright 1998 Cisco Systems, Inc. http://www.cisco.com/warp/public/146/pressroom/1998/apr98/28.html.

HP Smart Internet, "Transform User Data Into Revenue", Copyright Hewlett–Packard Company, 1999.

HP Smart Internet Usage Analysis Solution, "Transform User Data Into Competitive Advantage", Copyright Hewlett–Packard Company, 1999.

HP/Cisco, Internet Usage Platform, "Transforming Internet Services Into Revenue" ©Hewlett–Packard Co. 1998.

"Release Note for Netflow FlowCollector Release 2.0," ©Jul. 1998 and "Release Notes for Netflow FlowAnalyzer Release 1.0" ©Sep. 1997.

HP Invent, "Capturing the Usage Billing Advantage", Copyright 1994–2001, Hewlett Packard http://www.hp.com/communications/usage/infolibrary/whitepapers/dsforum print.html.

Anonymous, "Call Accounting Products", Teleconnect, vol. 15, No. 3, p. 89, Mar. 1997.

Deixler, Lyle, "Call Accounting Update", Teleconnect, vol. 15, No. 10, p. 87, Oct. 1997.

Deixler, Lyle, "Micro–Tel's Microcall for Windows 95/NT", Teleconnect, vol. 15, No. 12, p. 35, Dec. 1997.

Kenney, Kathleen, "American Management Systems Launces Internet–Based Customer Care and Billing Tool for Telecom Firms", PR Newswire, New York, Oct. 9, 1996, extracted from http://proquest.umi.com on internet Feb. 28, 2002.

Morgan, Rick, "When Used Right, Internet can be Effective Marketing Tool", Madison Capital Times, Madison, WI, Nov. 8, 1996, extracted from http://proquest.umi.com on internet on Feb. 28, 2002.

Edwards, Morris, "The Electronic Commerce Juggernaut", Communication News, Nokomis, Sep. 1997, vol. 34, Issue 9, extracted from http://proquest.umi.com on Internet on Feb. 28, 2002.

"Cryptography and the Internet", www.echonyc.com/~ysue/crypt.html, 1995.

Lee et al., "Supporting Multi–User, Multi–Applet Workspaces in CBE", Computer Supported Cooperative Work 1996, Cambridge, MA.

"Netscape 2.0 Beta Hip or Hype?", www.plant.net.au/innovations/20beta.html, Planet Internet, 1995.

*Computer Networks*, Andrew S. Tanenbaum, pp. 410–412.

"XIIR6.3 (Broadway) Overview", http://www.x.org/broadway.htm.

"Stac Unveils Windows NT 4.0 and Web Browser Support in New ReachOut 7" http://www.stac.com/news/pressrel/pr_ro7_unveil.html.

Meteorology; Databases, "Inforonics offers controlled access to Web Meteorology", Information Today, Apr. 97, vol. 14 Issue 4, p53, 2p. This article reports that Inforonics has developed a controlled access gateway to MGA (Meteorological and Geoastrophysica).

Rosen, Michele, "BPCS steps into new millennium", Midrange Systems; Spring House; May 10, 1996. This article informs about the new release of BPCS Client/Server Software as the most extensive upgrade of the product since 1980s. It incorporates onject tech.

* cited by examiner

INTEGRATED PROXY INTERFACE FOR WEB BASED BROADBAND TELECOMMUNICATIONS MANAGEMENT

CROSS-REFERENCE TO RELATED APPLICATIONS

The following patent application is based on and claims the benefit of U.S. Provisional Patent Application Serial No. 60/060,655 filed Sep. 26, 1997.

FIELD OF THE INVENTION

The present invention relates generally to information delivery systems and, particularly, to a novel, World Wide Web(Web)/Internet-based, telecommunications network data management reporting and presentation service for customers of telecommunications service entities.

BACKGROUND OF THE INVENTION

Telecommunications service entities, e.g., MCI, AT&T, Sprint, and the like, presently provide for the presentation and dissemination of customer account and network data management information to their customers predominantly by enabling customers (clients) to directly dial-up, e.g., via a modem, to the entity's application servers to access their account information, or, alternatively, via dedicated communication lines, e.g., ISDN, T-1, etc., enabling account information requests to be initiated through their computer terminal having a Windows-based operating system. The requests are processed by the entity's application server's, which retrieves the requested customer information from one or more databases, processes and formats the information for downloading to the client's computer terminal.

Currently, larger telecommunications inter-exchange carrier enterprises such as AT&T, Sprint, LCI, etc., provide management and performance information relating to circuits comprising a customer's Broadband network, e.g., frame-relay. Such network management information generally includes details of network use and performance such as, for instance, real time status and alarm information, near real time performance data, usage statistics, SNMP data, etc. While these data may be available "on-line", they are typically communicated over dedicated network lines to a customer's location employing a dedicated computing platform, e.g., Unix operating system, and, in some cases, employing dumb terminals having a user interface. Often these systems require deployment of proprietary software, and, in some instances, the inter-exchange carrier enterprise requires customer's to purchase network monitoring hardware, which can be a very expensive proposition. Moreover, current Broadband network monitoring systems are limited in the types of services available for customers.

It would be highly desirable to provide a Web-based client-server application capable of providing a network manager customer with reports and network performance information relating to their Broadband data networks via a user-friendly graphical user interface implemented on any computing platform.

It would be highly desirable to provide a Web-based client-server application capable of presenting to a customer a physical and logical view of their Broadband network configuration, physical and logical view of network alarms, and physical and logical performance information relating to the circuits which comprise the customer's data network via a low-cost PC interface implementing a browser application.

Moreover, it would be highly desirable to provide a Web-based client-server application capable of presenting tools which enable a network manager to research and predict Broadband network needs, dynamically re-allocate resources, receive important communications in real-time, and review detail histories to evaluate overall telecommunication usage via a graphical user interface provided on a low-cost PC platform running a browser.

SUMMARY OF THE INVENTION

The present invention is directed to a novel Web-based (Internet and Intranet) client-server application that enables customers to access information relating to the performance of their telecommunications virtual data, i.e., "Broadband" networks. Particularly, the novel Web-based (Internet and Intranet) client-server application is a telecommunications network management tool that provides customers with a visual representation of their physical and logical networks across all of their domestic sites, e.g., frame relay, and provides customers with graphical reports of their network performance, e.g., detailing network utilization and throughput. Such reporting functionality enables customer's to trend and analyze the performance history of their broadband networks, enabling them to determine if their network needs to be changed to ensure that it's operating at maximum performance levels to meet their business needs. Additionally, customers are enabled to monitor, via their Web browser interface and in real-time, network alarms and real-time events affecting their network.

Particularly, the Broadband network management tool supports three technologies: Frame Relay, Switched Multi-megabit Data Service (SMDS), and may also support Asynchronous Transfer Mode (ATM). The reporting tool utilizes at least two components that can be utilized separately or combined: a Performance Reporting System ("PRS") which provides the means for obtaining network performance data specific to a customer's broadband network; and, a Simple Network Management Protocol ("SNMP") system which is an alarm monitoring system providing real-time or near-real time alarm status conditions of customer network components to customer's via their Web browser interface.

In accordance with the preferred embodiments of the invention, there is provided a Web/Internet- based reporting system for communicating information relating to a data network to a customer via an integrated interface. The system comprises a client browser application located at a client workstation for enabling interactive Web based communications with the reporting system, the client workstation identified with a customer and providing the integrated interface; at least one secure server for managing client sessions over the Internet, the secure server supporting a first secure socket connection enabling encrypted communication between the browser application client and the secure server; a dispatch server means for communicating with the secure server through a firewall over a second socket connection, the first secure and second sockets forming a secure communications link, the dispatch server enabling forwarding of a report request message and an associated report response message back to the client browser over the secure communications link; a device for inputting network information pertaining to a specific customer and associating the customer with a corresponding network performance reporting functionality; and, a device for periodically polling network switches pertaining to the customer's network and gathering performance data relating thereto in accordance with the network performance reporting functionality; wherein the performance data is assembled in a form suitable for display at the client workstation via the integrated interface.

Advantageously, the instant invention can be readily adapted to provide performance information relating to other types of telecommunications networks.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings, and in which.

DETAILED DESCRIPTION OF THE INVENTION

The present invention is one component of an integrated suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695, filed Sep. 24, 1998, the nMCI Interact system architecture is basically organized as a set of common components comprising the following:

1) an object-oriented software architecture detailing the client and server based aspect of nMCI Interact;

2) a network architecture defining the physical network needed to satisfy the security and data volume requirements of the networkMCI System;

3) a data architecture detailing the application, back-end or legacy data sources available for networkMCI Interact; and 4) an infrastructure covering security, order entry, fulfillment, billing, self-monitoring, metrics and support.

Each of these common component areas will be generally discussed hereinbelow. A detailed descriptions of each of these components can be found in a related, co-pending U.S. patent application U.S. Ser. No. 09/159,695 entitled INTEGRATED CUSTOMER INTERFACE SYSTEM FOR COMMUNICATIONS NETWORK MANAGEMENT, the disclosure of which is incorporated herein by reference thereto.

Figure 1:
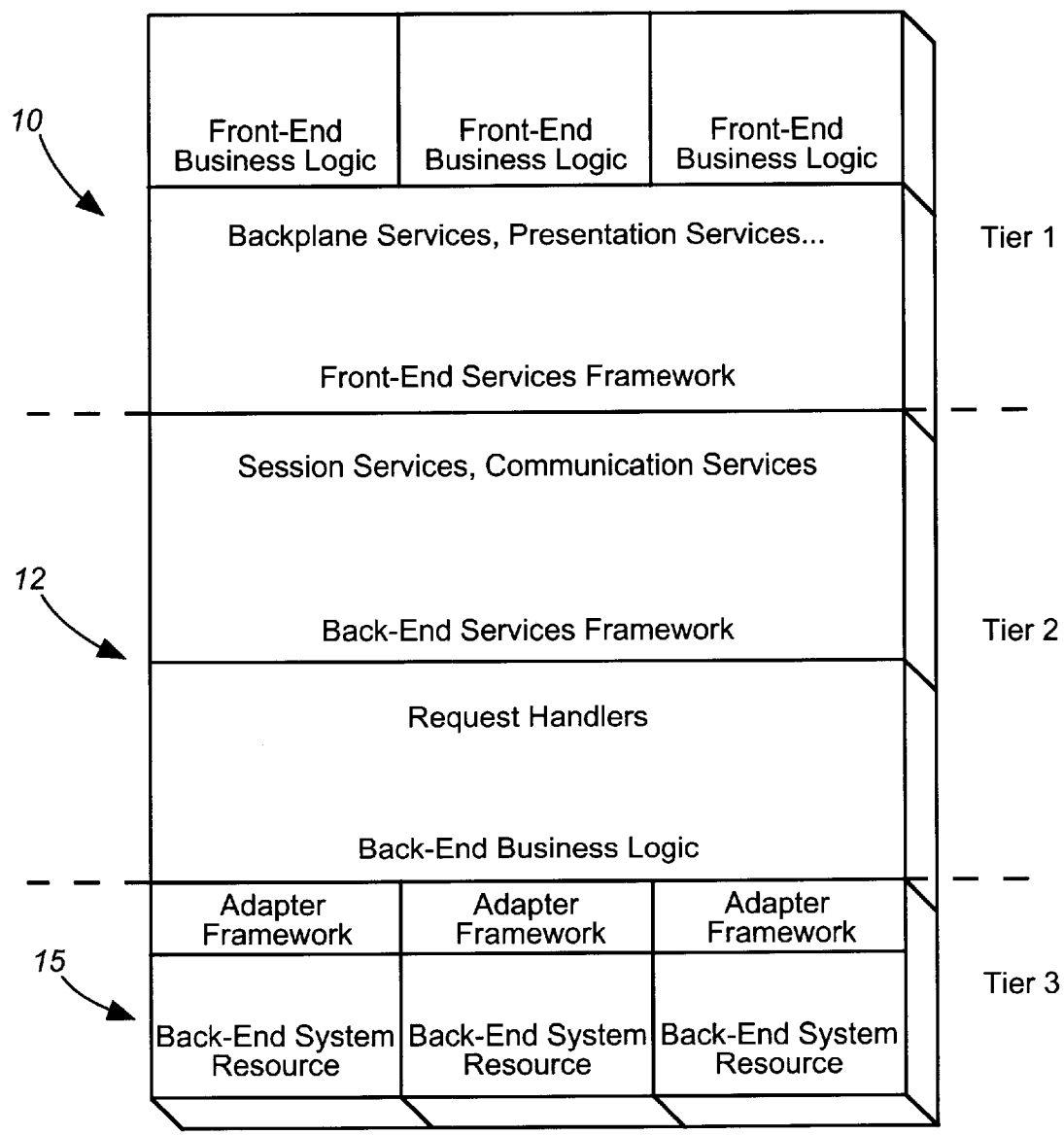
FIG. 1 illustrates the software architecture component comprising a three-tiered structure.

FIG. 1 is a diagrammatic illustration of the software architecture component in which the present invention functions. A first or client tier 10 of software services are resident on a customer work station 10 and provides customer access to the enterprise system, directed to front end business logic, one or more backplane service objects for managing sessions, one or more presentation services objects for the presentation of customer options and customer requested data in a browser recognizable format and a customer supplied browser for presentation of customer options and data to the customer and for internet communications over the public Internet. Additionally applications are directed to front end services such as the presentation of data in the form of tables and charts, and data processing functions such as sorting and summarizing in a manner such that multiple programs are combined in a unified application suite. A second or middle tier 12, is provided having secure web servers and back end services to provide applications that establish user sessions, govern user authentication and their entitlements, and communicate with adaptor programs to simplify the interchange of data across the network.

A third or back end tier 15 having applications directed to legacy back end services including database storage and retrieval systems and one or more database servers for accessing system resources from one or more legacy hosts.

Generally, as explained in co-pending U.S. patent application Ser. No. 09/159,515, entitled GRAPHICAL USER INTERFACE FOR WEB ENABLED APPLICATIONS, the disclosure of which is incorporated herein by reference thereto, the customer workstation includes client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, toll free network management or Call Manager functions. The system is capable of delivering to customers the functionality appropriate to their product mix.

Figure 2:
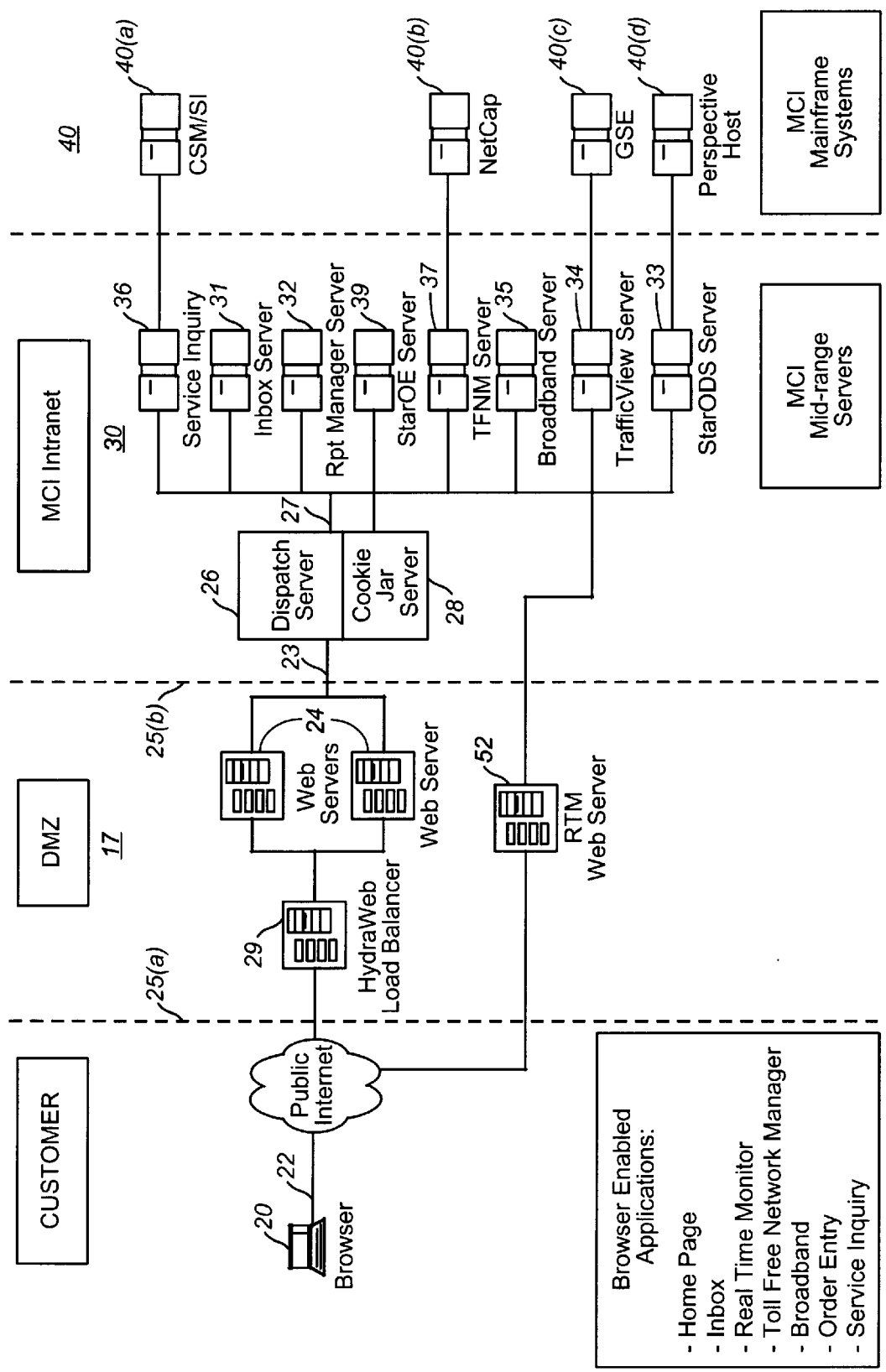
FIG. 2 is a diagrammatic overview of the software architecture of the networkMCI Interact system.

FIG. 2 is a diagrammatic overview of the software architecture of the networkMCI Interact system including: the Customer Browser (a.k.a. the Client) 20; the Demilitarized Zone (DMZ) 17 comprising a Web Servers cluster 24; the MCI Intranet Dispatcher Server 26; and the MCI Intranet Application servers 30, and the data warehouses, legacy systems, etc. 40.

Figure 3:
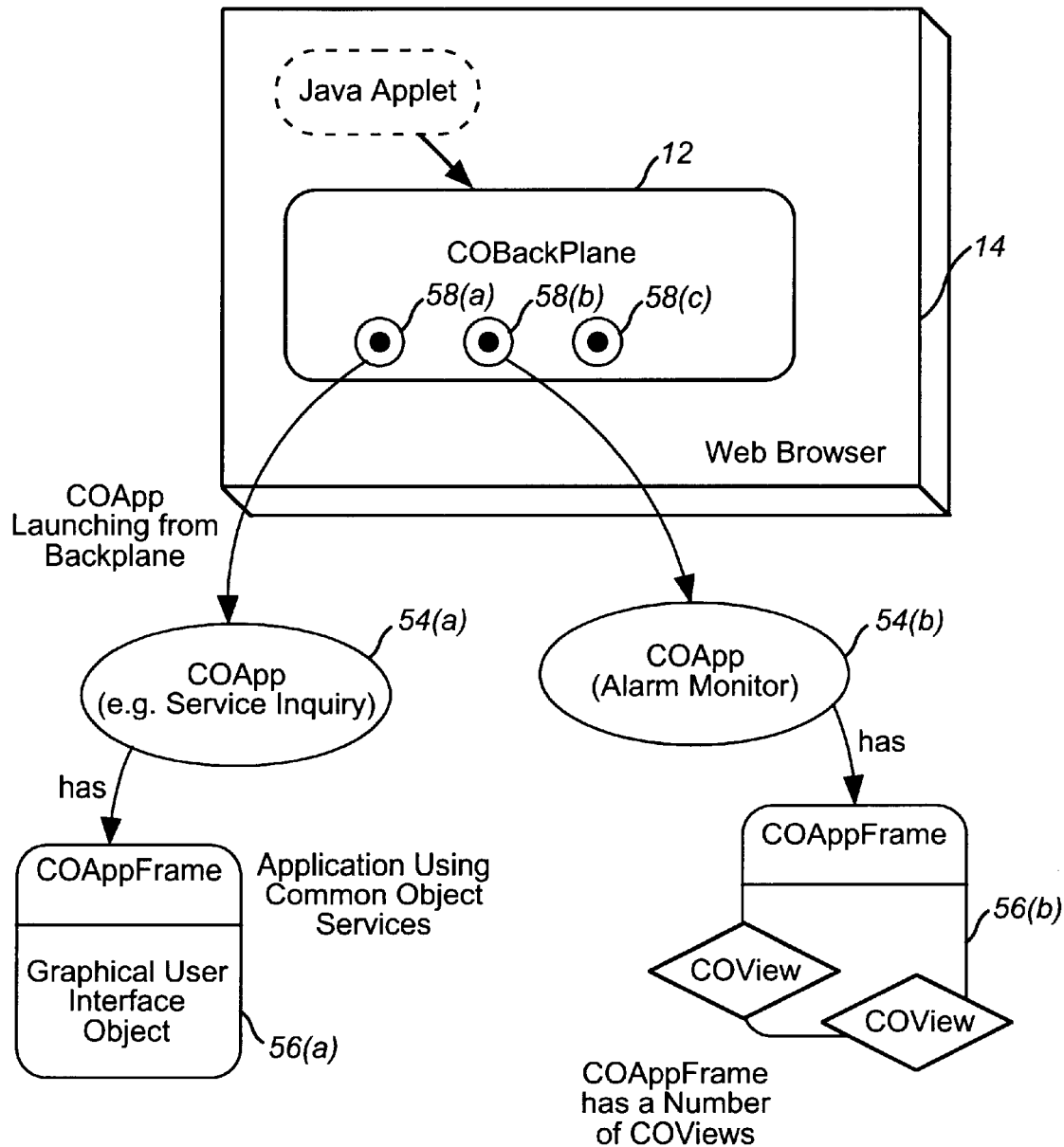
FIG. 3 is an illustrative example of a backplane architecture schematic.

The Customer Browser 20, is browser enabled and includes client applications responsible for presentation and front-end services. Its functions include providing a user interface to various MCI services and supporting communications with MCI's Intranet web server cluster 24. As illustrated in FIG. 3, and more specifically described in the above-mentioned, co-pending U.S. patent application Ser. No. 09/159,515 entitled GRAPHICAL USER INTERFACE FOR WEB ENABLED APPLICATIONS, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects which provide the front end business logic and manages their launch. The networkMCI Interact common set of objects provide a set of services to each of the applications such as: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

FIG. 3 is a diagrammatic example of a backplane architecture scheme illustrating the relationship among the common objects. In this example, the backplane services layer 12 is programmed as a Java applet which can be loaded and launched by the web browser 14. With reference to FIG. 3, a typical user session starts with a web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG. 3 as buttons 58a,b,c selectable by the user. As illustrated in FIG. 3, upon selection of an application, the backplane 12 launches that specific application, for example, Service Inquiry 54a or Alarm Monitor 54b, by creating the application object. In processing its functions, each application in turn, may utilize common object services provided by the backplane 12. FIG. 3 shows graphical user interface objects 56a,b created and used by a respective application 54a,b for its own presentation purposes.

Figure 4:
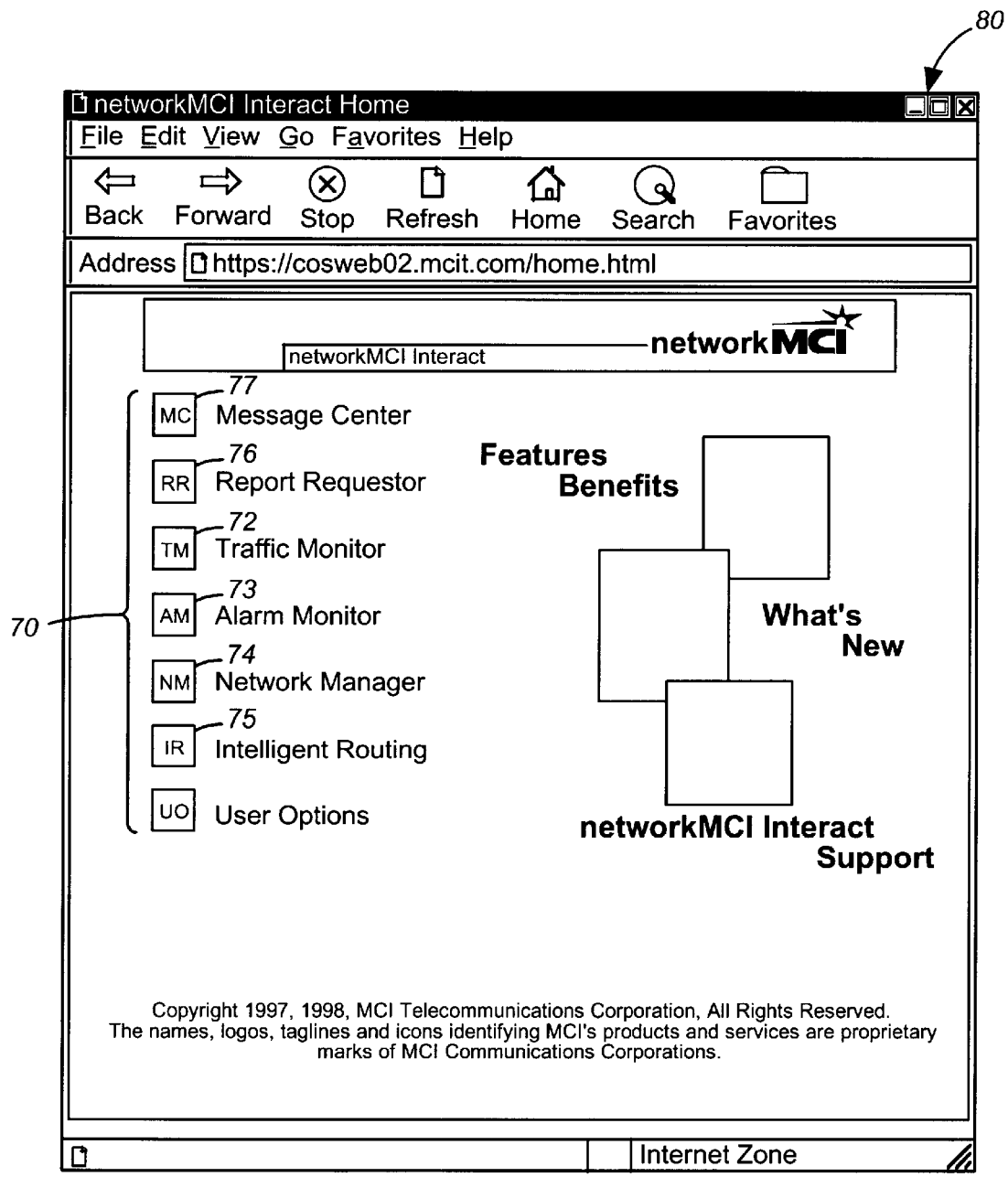
FIG. 4 illustrates an example client GUI presented to the client/customer as a browser web page.

FIG. 4 illustrates an example client GUI presented to the client/customer as a browser web page 80 providing, for example, a suite 70 of network management reporting applications including: MCI Traffic Monitor 72; an alarm monitor 73; a Network Manager 74 and Intelligent Routing 75. Access to network functionality is also provided through Report Requester 76, which provides a variety of detailed reports for the client/customer and a Message Center 77 for providing enhancements and functionality to traditional e-mail communications.

As shown in FIGS. 3 and 4, the browser resident GUI of the present invention implements a single object, COBackPlane which keeps track of all the client applications, and which has capabilities to start, stop, and provide references to any one of the client applications.

The backplane 12 and the client applications use a browser 14 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm, and COAppFrame classes. COBackPlane 12 is an application backplane which launches the applications 54a, 54b, typically implemented as CoApp. COBackPlane 12 is generally implemented as a Java applet and is launched by the Web browser 14. This backplane applet is responsible for launching and closing the COApps.

When the backplane is implemented as an applet, it overrides standard Applet methods init( ), start( ), stop( ) and run( ). In the init( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp( ) method. The launched application then may use the backplane for inter-application communications, including retrieving Inbox data.

The COBackPlane 12 includes methods for providing a reference to a particular COApp, for interoperation. For example, the COBackPlane class provides a getApp( ) method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, copending application GRAPHICAL USER INTERFACE FOR WEB ENABLED APPLICATIONS.

As shown in FIG. 2, the aforesaid objects will communicate the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 will re-encrypt the request using symmetric encryption and forward it over a second secure socket connection 23 to the dispatch server 26 inside the enterprise Intranet.

As described in greater detail in co-pending U.S. patent application Ser. No. 09/159,515 entitled SECURE CUSTOMER INTERFACE FOR WEB-BASED DATA MANAGEMENT, the contents and disclosure of which is incorporated by reference as if fully set forth herein, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 28 to generate a "cookie" which is a unique server-generated key that is sent to the client along with each reply to a HTTPS request. The client holds the cookie and returns it to the server as part of each subsequent HTTPS request. As desired, either the Web servers 24, the cookie jar server 28 or the Dispatch Server 26, may maintain the "cookie jar" to map these keys to the associated session. A separate cookie jar server 28, as illustrated in FIG. 2 has been found desirable to minimize the load on the dispatch server 26. A new cookie will be generated when the response to the HTTPS request is sent to the client. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25b over a TCP/IP connection 23 to the dispatch server 26 on a new TCP socket while the original socket 22 from the browser is blocking, waiting for a response. The dispatch server 26 will unwrap an outer protocol layer of the message from the DMZ services cluster 24, and will reencrypt the message with symmetric encryption and forward the message to an appropriate application proxy via a third TCP/IP socket 27. While waiting for the proxy response all three of the sockets 22, 23, 27 will be blocking on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from StarOE server 49 at logon time and cached.

If the requestor is authorized to communicate with the target service, the message is forwarded to the desired service's proxy. Each application proxy is an application specific daemon which resides on a specific Intranet server, shown in FIG. 2 as a suite of mid-range servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting service are acting as clients to the application servers providing the service. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages, a Report Manager Proxy capable of communicating with a system-specific Report Manager server 32 for generating, managing and scheduling the transmission of customized reports including, for example: call usage analysis information provided from the StarODS server 33; network traffic analysis/monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

As partially shown in FIG. 2, it is understood that each Intranet server of suite 30 communicates with one or several consolidated network databases which include each customer's network management information and data. In the present invention the Services Inquiry server 36 includes communication with MCI's Customer Service Management legacy platform 40(a). Such network management and customer network data is additionally accessible by authorized MCI management personnel. As shown in FIG. 2, other legacy platforms 40(b), 40(c) and 40(d) may also communicate individually with the Intranet servers for servicing specific transactions initiated at the client browser. The illustrated legacy platforms 40(a)–(d) are illustrative only and it is understood other legacy platforms may be interpreted into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the internet to the client workstation 10 via the Dispatch Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 5:
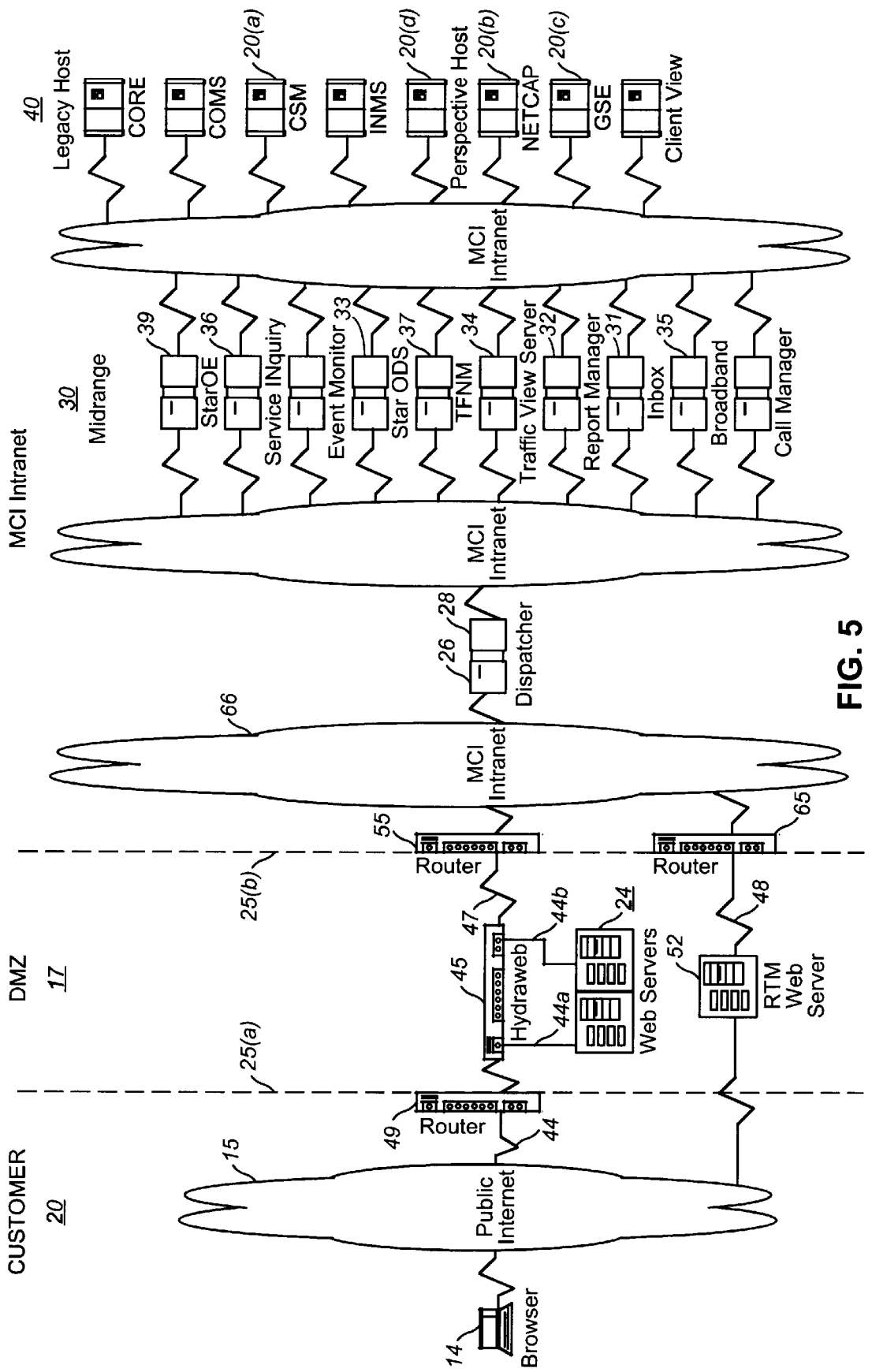
FIG. 5 is a diagram depicting the physical networkMCI Interact system architecture.

FIG. 5 is a diagram depicting the physical networkMCI Interact system architecture 10. As shown in FIG. 5, the system is divided into three major architectural divisions including: 1) the customer workstation 20 which include those mechanisms enabling customer connection to the Secure web servers 24; 2) a secure network area 17, known as the DeMilitarized Zone "DMZ" set aside on MCI premises double firewalled between the both the public Internet 25 and the MCI Intranet to prevent potentially hostile customer attacks; and, 3) the MCI Intranet Midrange Servers 30 and Legacy Mainframe Systems 40 which comprise the back end business logic applications.

As illustrated in FIG. 5, the present invention includes a double or complex firewall system that creates a "demilitarized zone" (DMZ) between two firewalls 25a, 25b. In the preferred embodiment, one of the firewalls 29 includes port specific filtering routers, which may only connect with a designated port on a dispatch server within the DMZ. The dispatch server connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet, thus ensuring internal company system security and integrity. Even with a stolen password, the hijacker may not connect to other ports, root directories or applications within the enterprise system.

The DMZ acts as a double firewall for the enterprise intranet because the web servers located in the DMZ never store or compute actual customer sensitive data. The web servers only put the data into a form suitable for display by the customer's web browser. Since the DMZ web servers do not store customer data, there is a much smaller chance of any customer information being jeopardized in case of a security breach.

As previously described, the customer access mechanism is a client workstation 20 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 29a in the DMZ 17. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 24 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB™ unit 45, manufactured by HydraWEB Technologies, Inc., which provides the DMZ with a virtual IP address so that subscriber HTTPS requests received over the Internet will always be received. The Hydraweb unit 45 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant Hydraweb unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases. The use of the HydraWEB™ enables better load distribution when needed to match performance requirements.

As shown in FIG. 5, the most available Web server 24 receives subscriber HTTPS requests, for example, from the HydraWEB™ 45 over a connection 44a and generates the appropriate encrypted messages for routing the request to the appropriate MCI Intranet midrange web server over connection 44b, router 55 and connection 23. Via the Hydraweb unit 45, a TCP/IP connection 38 links the Secure Web server 24 with the MCI Intranet Dispatcher server 26.

Further as shown in the DMZ 17 is a second RTM server 52 having its own connection to the public Internet via a TCP/IP connection 48. As described in co-pending U.S. patent application Ser. No. 09/159,516 entitled INTEGRATED PROXY INTERFACE FOR WEB BASED TELECOMMUNICATIONS MANAGEMENT TOOLS, this RTM server provides real-time session management for subscribers of the networkMCI Interact Real Time Monitoring system. An the networkMCI Interact Real Time Monitoring system. An additional TCP/IP connection 48 links the RTM Web server 52 with the MCI Intranet Dispatcher server 26.

With more particularity, as further shown in FIG. 5, the networkMCI Interact physical architecture includes three routers: a first router 49 for routing encrypted messages from the Public Internet 15 to the HydraWeb 45 over a socket connection 44; a second router 55 for routing encrypted subscriber messages from a Secure Web server 24 to the Dispatcher server 26 located inside the second firewall 25b; and, a third router 65 for routing encrypted subscriber messages from the RTM Web server 52 to the Dispatcher server 26 inside the second firewall. Although not shown, each of the routers 55, 65 may additionally route signals through a series of other routers before eventually being routed to the nMCI Interact Dispatcher server 26. In operation, each of the Secure servers 24 function to decrypt the client message, preferably via the SSL implementation, and unwrap the session key and verify the users session from the COUser object authenticated at Logon.

After establishing that the request has come from a valid user and mapping the request to its associated session, the Secure Web servers 24 will re-encrypt the request using symmetric RSA encryption and forward it over a second secure socket connection 23 to the dispatch server 26 inside the enterprise Intranet.

As described herein, and in greater detail in co-pending U.S. patent application Ser. No. 09/159,695 (D# 11038), the data architecture component of networkMCI Interact reporting system is focused on the presentation of real time (un-priced) call detail data, such as provided by MCI's TrafficView Server 34, and priced call detail data and reports, such as provided by MCI's StarODS Server 33 in a variety of user selected formats.

All reporting is provided through a Report Requestor GUI application interface which support spreadsheet, a variety of graph and chart type, or both simultaneously. For example, the spreadsheet presentation allows for sorting by any arbitrary set of columns. The report viewer may also be launched from the inbox when a report is selected.

A common database may be maintained to hold the common configuration data which can be used by the GUI applications and by the mid-range servers. Such common data will include but not be limited to: customer security profiles, billing hierarchies for each customer, general reference data (states, NPA's, Country codes), and customer specific pick lists: e.g., ANI's, calling cards, etc. An MCI Internet Star DE server will manage the data base for the common configuration of data.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data will be resident in an Inbox server database and managed by the Inbox server.

The Infrastructure component of the nMCI Reporting system includes means for providing secure communications regardless of the data content being communicated. As described in detail in above-referenced, co-pending U.S. patent application Ser. No. 09/159,514, the nMCI Interact system security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the nMCI Interact infrastructure includes order entry, which is supported by the Order Entry ("StarOE") server. The general categories of features to be ordered include: 1) Priced Reporting; 2) Real-time reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; 14) Portfolio; and, 15) Client View.

The Self-monitoring infrastructure component for nMCI Interact is the employment of mid-range servers that support SNMP alerts at the hardware level. In addition, all software processes must generate alerts based on process health, connectivity, and availability of resources (e.g., disk usage, CPU utilization, database availability).

The Metrics infrastructure component for nMCI Interact is the employment of means to monitor throughput and volumes at the Web servers, dispatcher server, application proxies and mid-range servers. Metrics monitoring helps in the determination of hardware and network growth.

To provide the areas of functionality described above, the client tier 10 is organized into a component architecture, with each component providing one of the areas of functionality. As explained in further detail in co-pending U.S. patent application Ser. No. 09/159,515 (Atty. D# 11040), the client tier software is organized into a "component" architecture supporting such applications as inbox fetch and inbox management, report viewer and report requester, TFNM, Event Monitor, Broadband, Real-Time Monitor, and system administration applications. Further functionality integrated into the software architecture includes applications such as Outbound Network Manager, Call Manager, Service Inquiry and Client View.

The present invention focuses on the client and middle-tier service and application proxy components that enable customers to request, specify, schedule and receive data reports relating to their Broadband ("BB") networks.

Figure 6:
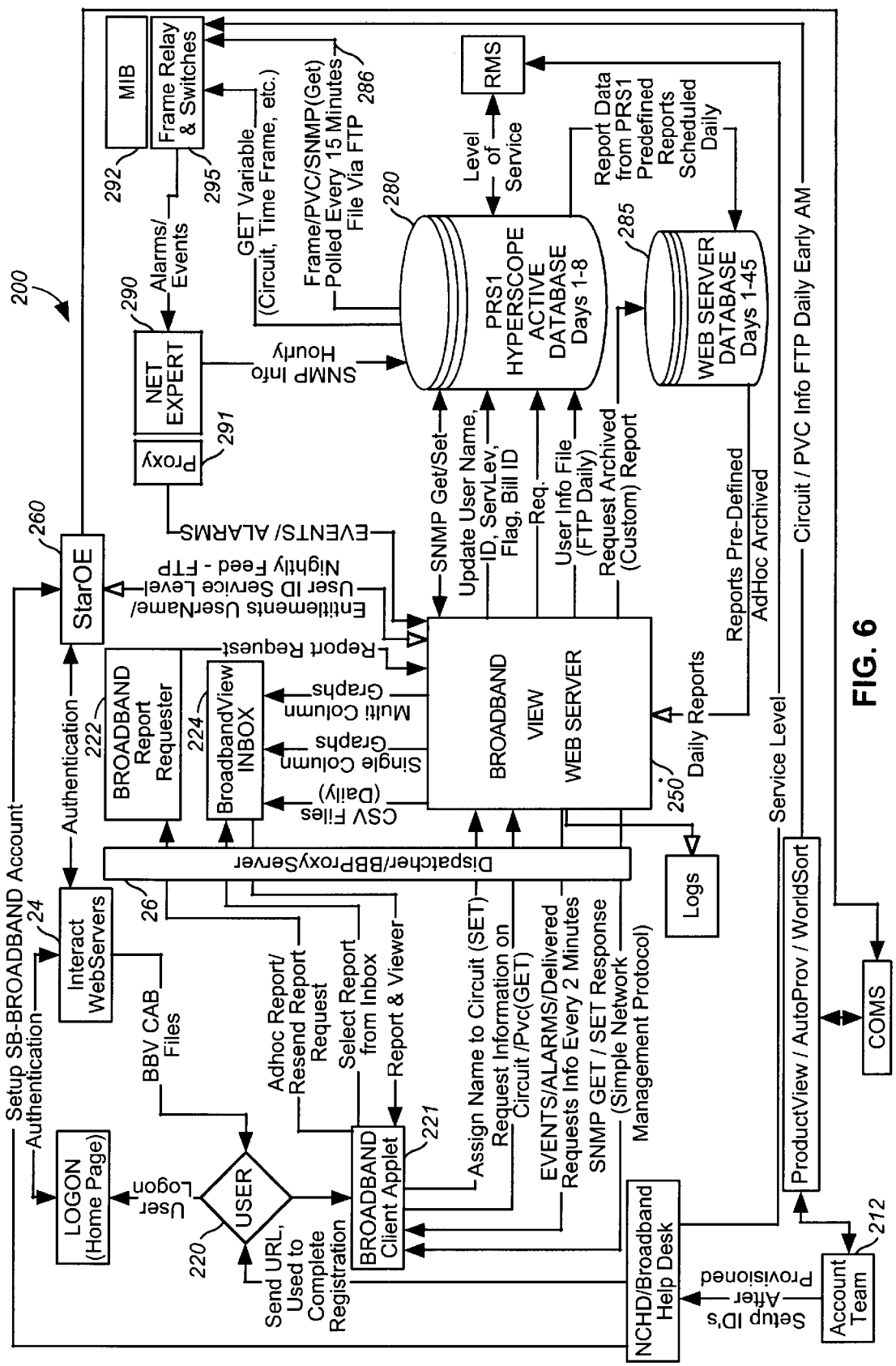
FIG. 6 is a detailed block diagram depicting the physical architecture of the Broadband reporting system.

A general block diagram illustrating the Broadband reporting system architecture 200 of the invention is shown in FIG. 6. In accordance with the invention, the Broadband reporting system includes a Broadband view client comprising a client workstation component 220 employing a web browser running, for example, Internet Explorer® 4.01 or greater, for enabling the generation of requests and receipt of responses from the Broadband system processes over the Web/Internet via a secure socket connection. To implement BB reporting functionality, the Broadband system 200 comprises Broadband view Report Requestor Server 222 and Broadband view Inbox Server 224 components. These BB Report Requestor and BB Report Inbox tools function analogous to the StarWRS Inbox, Report management/ scheduler and Report Requestor and Report Viewer components of the nMCI Interact system as described in commonly owned, co-pending U.S. patent application Ser. No. 09/159, 409 entitled INTEGRATED PROXY INTERFACE FOR WEB BASED REPORT REQUESTOR TOOL SET, the contents and disclosure of which are incorporated herein by reference as if fully set forth herein. All interactions with the Broadband reporting and SNMP features occur between a Broadband applet 221 and the Broadband server 250 via the Dispatcher 26 and Broadband proxy application 204. Particularly, Broadband application's Java classes invoke a "message class" that has the Common Object code as an interface definition.

Also shown as part of the Broadband reporting system architecture 200 of FIG. 6 is a Web Server 24 and Dispatcher component 26 which provides message transport between the BB client browser and a Broadband proxy interface including all authentication and encryption. Thus, secure communication from the customer browser to a DMZ Web server is enabled over a first TCP/IP socket connection, such as SSL, and, secure communication from the DMZ Web server over a corporate firewall to the Dispatcher server is enabled over a second TCP/IP socket connection, such as DES. These secure paths enable customer requests and server responses to be communicated between the client browser and the Broadband server 250. Specifically, the Dispatcher server 26 includes an integrated Broadband proxy application to forward user requests and responses to/from the Broadband server process 250 and to enable the Broadband functionality. This proxy capability includes a multi-thread engine enabling multiple, simultaneously executing sessions supporting anticipated user load. The interface between the Dispatcher server and the Broadband proxy process is also message-based employing, e.g., TCP/ IP socket transport, and, as will be described, a messaging protocol is defined that comprises a generic message header followed by proxy-specific data. For messages sent to the Broadband server, the generic message header is first sent followed by the proxy specific data. In the other direction, the same process is employed, i.e., the Broadband proxy sends the generic header followed by the proxy-specific response back to the dispatch server for communication over the firewall and back to the Web server.

In the embodiment shown in FIG. 6, the necessary CSV data files are downloaded to the Broadband Inbox messaging server for subsequent access. It should be understood however, that all Broadband responses including CSV data files are forwarded through the Dispatcher server 26 and intervening DMZ Web server 24 for eventual display at the client.

In the preferred embodiment, the Broadband server 250 performs the various database queries and function calls in response to requests received from the customer via the Broadband proxy 240. That is, the BB Client submits all requests and queries to the BB Server 250 using a generic proxy framework called BBProxyServer 240. These communications include Report requests, retrieval and viewing; requests for circuit information using SNMP Get commands; assignments of mnemonics for circuit names using SNMP Set commands; and, establishing a session to monitor alarm activities on circuits. Particularly, the Broadband server 250 is responsible for all tasks leading up to and including the generation of performance report and SNMP information including data collection, calculation, storage, and report generation.

As shown in FIG. 6, the components feeding information to the Broadband server 250 include: 1) a Performance Reporting System ("PRS") server 280 for sending performance and statistical data to the Broadband server; and, 2) a system network management platform 290 ("SNMP") which is a tool that feeds real- or near real-time SNMP alarm and network event data to the Broadband Web server. One such SNMP tool implemented by the assignee of the present invention is entitled "NetExpert". The Broadband server 250 additionally supports SNMP "get/set" functionality which is a menu-driven facility enabling a user to query the SNMP database for the value of a variable in a Management Information Base ("MIB"), or, to set the value of certain variables in the MIB, as will be described in further detail hereinafter.

The Broadband server 250 additionally supports communication with a system administration ("StarOE") component 260 which provides order entry functions including functionality necessary to manage (create, update, delete) Broadband users and, allows for a feed of the appropriate information to the Broadband server in order to associate the appropriate reports and Broadband functionality to the right customer once given admission to the Broadband service. The StarOE order entry process essentially provides the means for authenticating users, and, initiating report generation. A messaging interface is provided between StarOE to the Broadband Web Server 250 functioning as a client to receive authentication information and Bill ID and Level of service information which are supplied in response to launch of the Broadband applet.

With further regard to the Broadband order entry process, a first step is setting up the appropriate Broadband circuits/PVCs which is done by placing circuit and Broadband orders with the appropriate account teams 212. The account teams then provision the circuits using ProductView, AutoProv and WorldSort products 211. When circuits have been provisioned, the account team contacts the Broadband Help Desk 205 which sets up an account and ID using the Bill ID provided by a circuit order management system ("COMS") 207. Setting up nNMCI Interact Broadband customers includes the steps of adding the customer and level of service desired at StarOE 260 and adding the Bill ID received from COMS 207 to StarOE tables via messaging interface 210. Bill ID, user ID and level of service are also added to StarOE 260. Once this is done, the new customer information (User ID, Bill ID, Level of Service, etc.) are included in a file produced by a periodic, e.g., nightly, fulfillment batch job run by the StarOE component 260. As part of the batch job, StarOE transfers the file, e.g., via FTP, to the Broadband Server 250 via interface 262. It should be understood that this order entry process is implemented when Bill ID, Circuits, PVC, Level of Service, and any other nMCI Interact service customer entitlement information is modified or deleted.

To establish Basic level reporting, the Broadband Server 250 transmits new customer information to the PRS1 component 285 when it is received. The customer Bill ID and circuit information are entered into the PRS1 tables via messaging interface 264. Any additions to or updates of User Name, User ID, Bill IDs are periodically passed from the Broadband Server 250 to the PRS1 280 via FTP messaging interface 263 in response to the periodic, e.g., nightly, updates to the Broadband server from StarOE. Particularly, the Broadband server 250 receives from the StarOE server 260 a file containing all current BB customers with the following information: a date/time stamp; a username; a userid; a service level indicator; and, the number of billing ids and bill ids. For the level of service indicator, Broadband offers the following options: 1) Basic; 2) Standard; 3) Enhanced SNMP; 4) Premium; 5) Enhanced Adhoc Reporting; 6) Enhanced SNMP+Adhoc Reporting; and 7) Dedicated SNMP. Enhanced SNMP+Adhoc Reporting; and 7) Dedicated SNMP. StarOE, comma separated value (CSV) reports are automatically created on a daily basis by the PRS1 from the inception of service until service is discontinued. As an example, for the Basic level of service, the Broadband Server delivers three (3) CSV Files to StarWRS Inbox 224: Configuration report, Circuit usage, and PVC usage.

Figure 7:
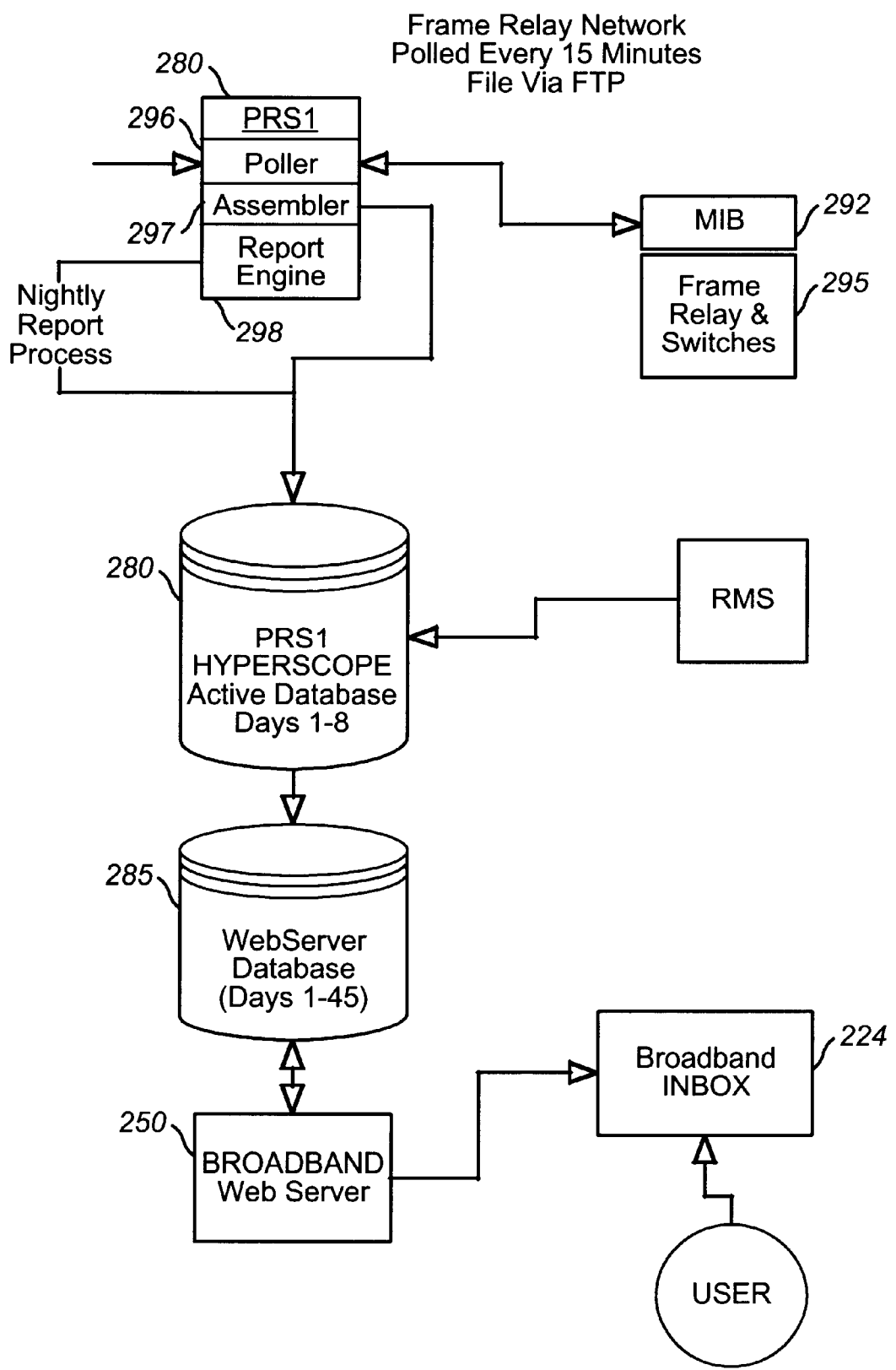
FIG. 7 illustrates those components utilized for Broadband performance reporting.
Figure 11A:
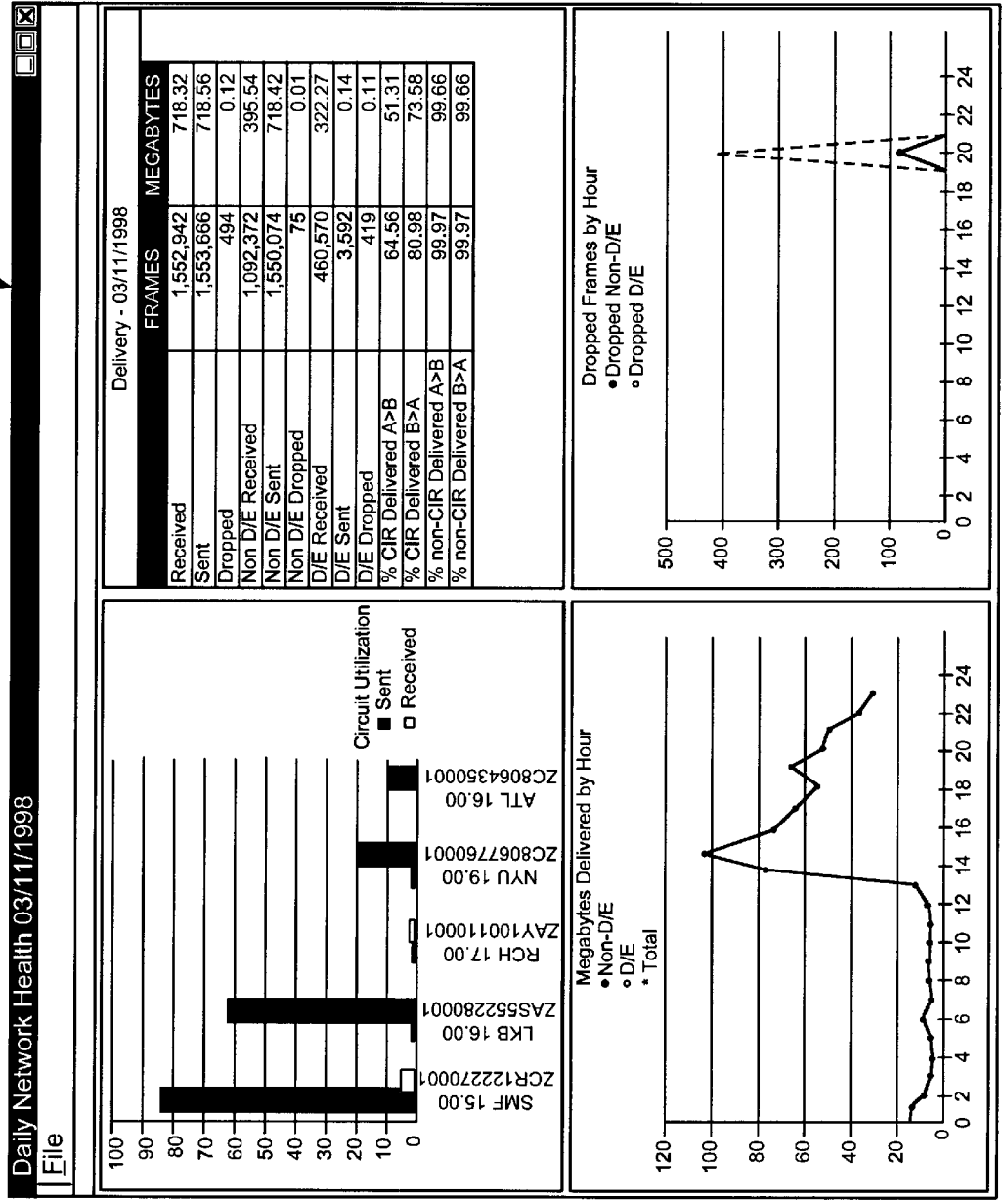
FIGS. 11(a)–11(g) depict example graphic reports relating to a customer's Frame Relay (Broadband) network.
Figure 11B:
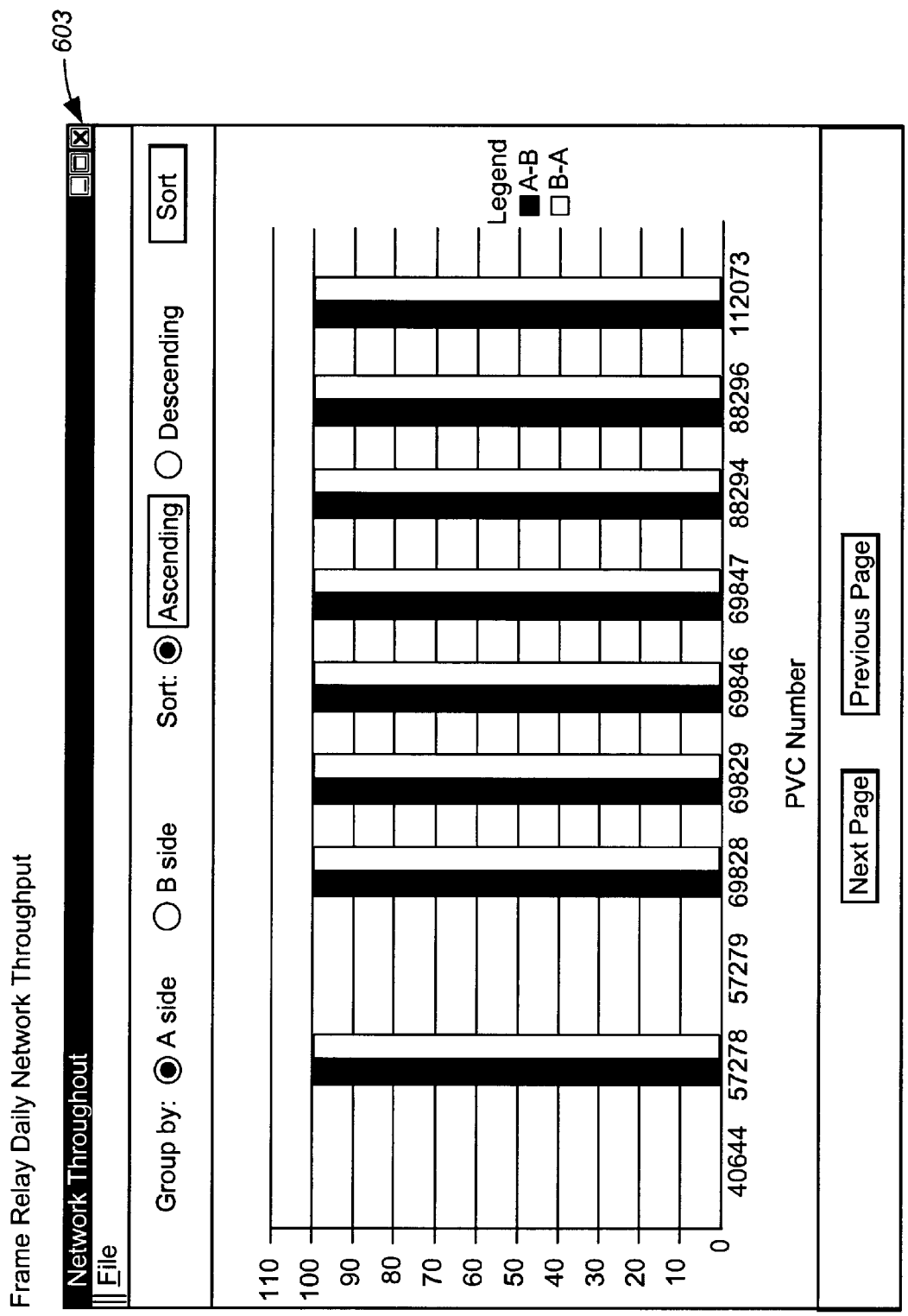
Figure 11C:
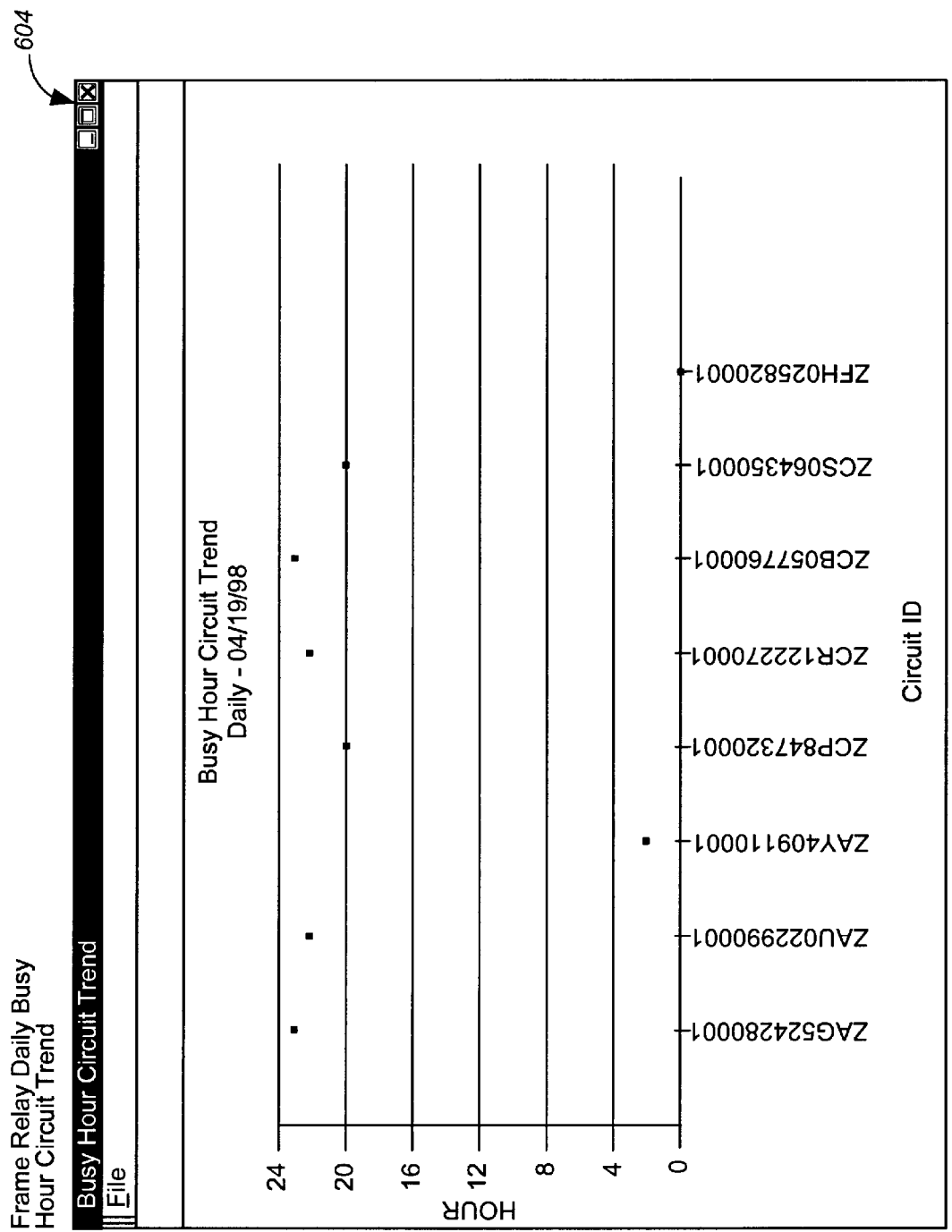
Figure 11D:
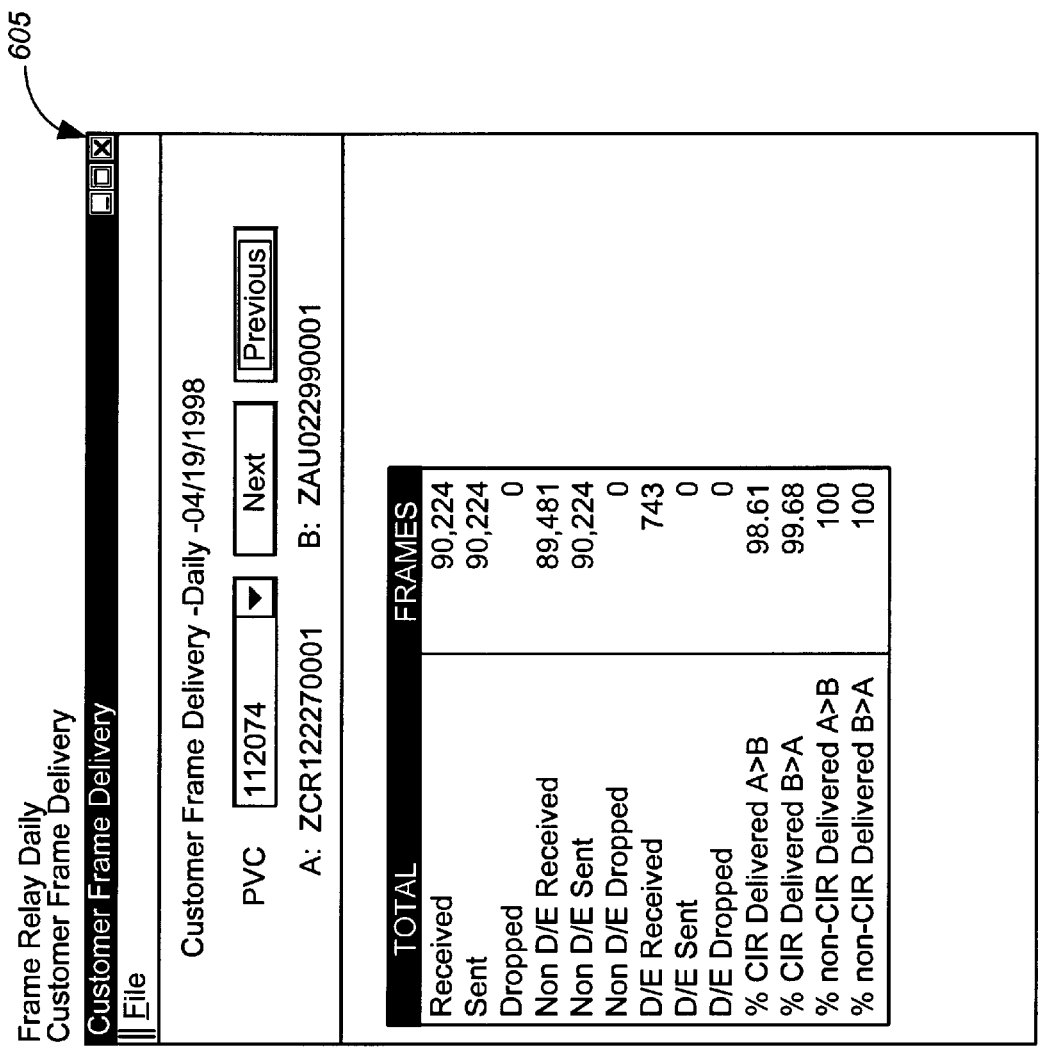
Figure 11E:
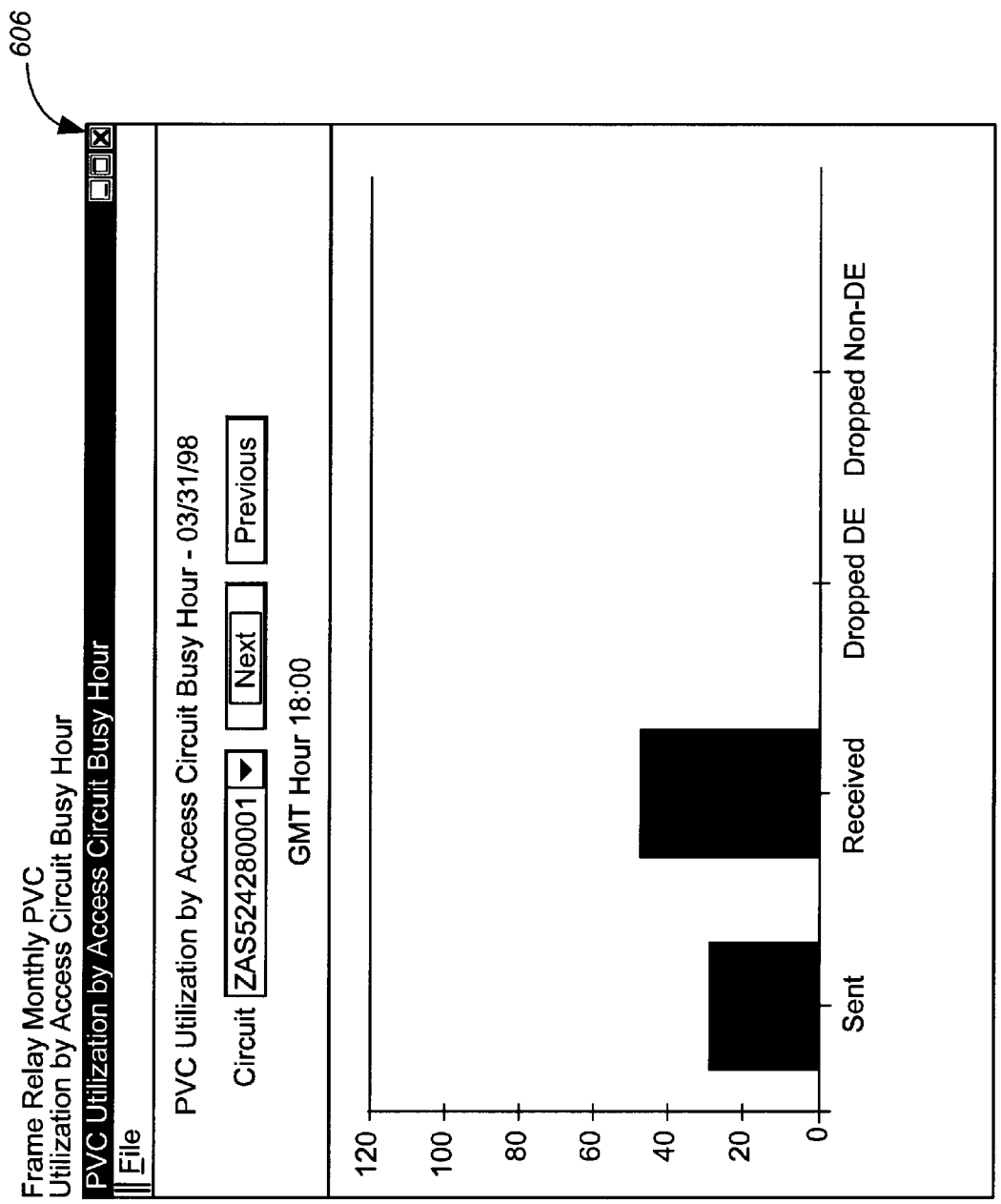
Figure 11F:
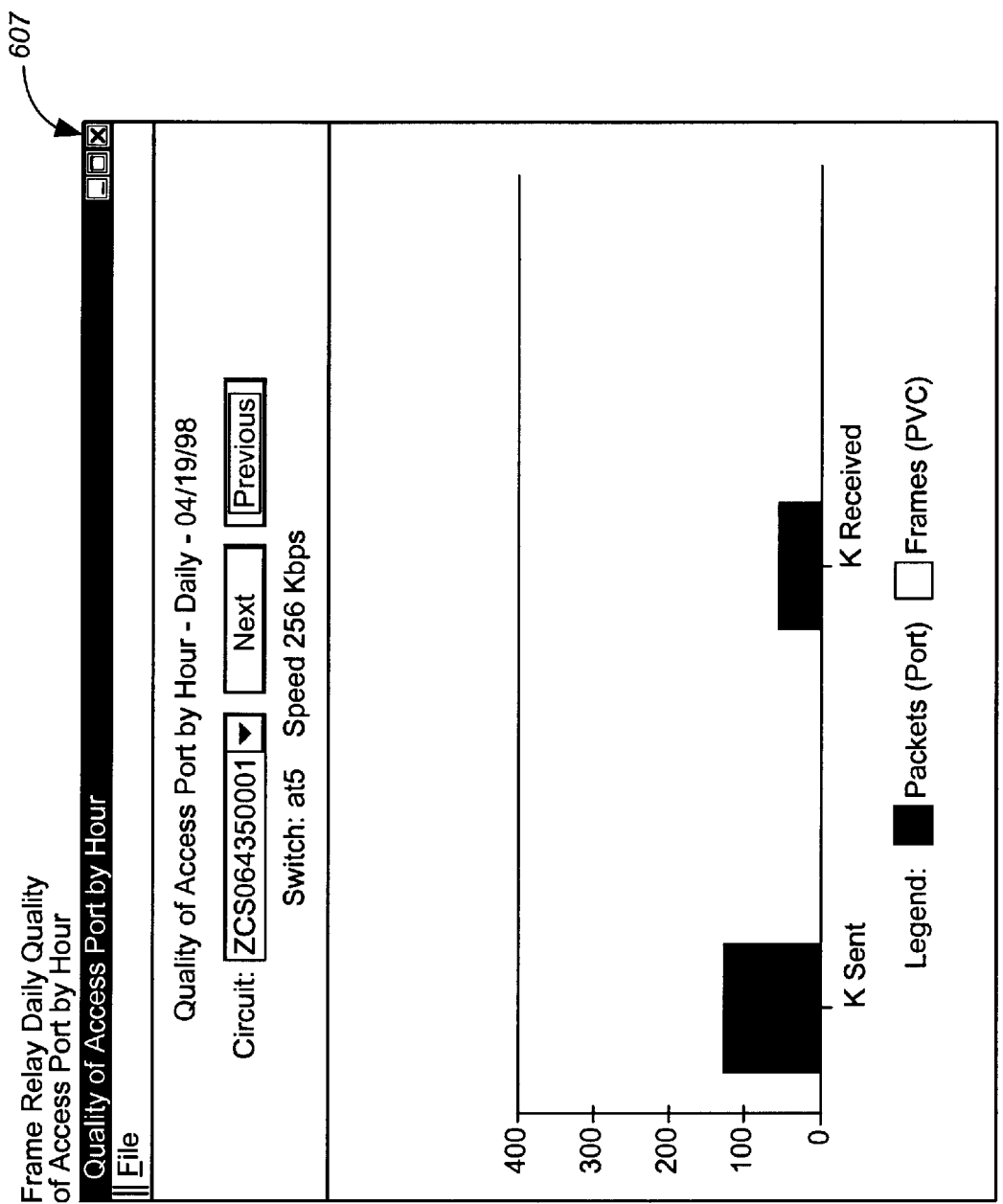
Figure 11G:
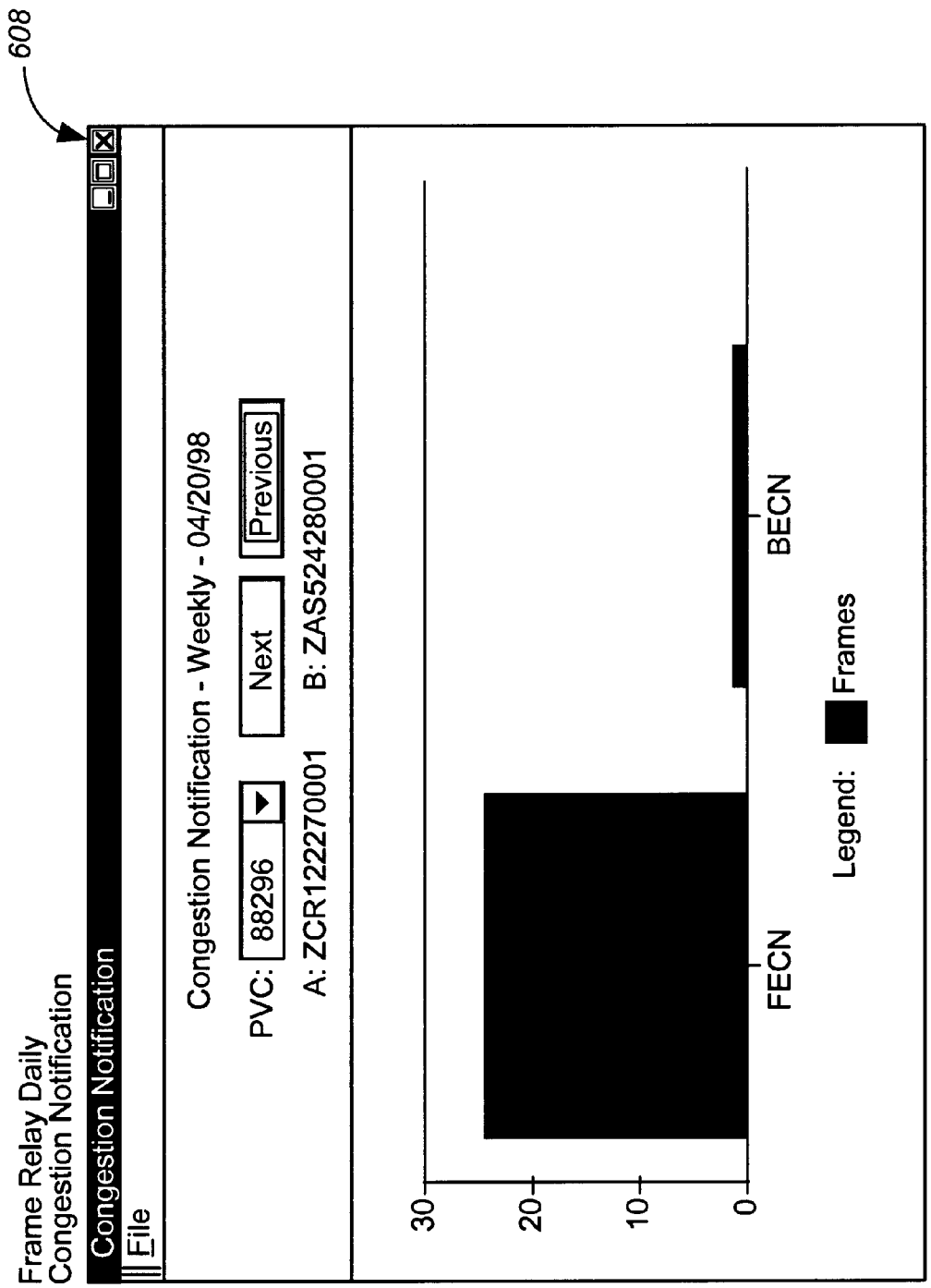

Referring to FIG. 7, the PRS device 280 performs the following: 1) queries the MIB 292 on each switch via interface 286 for information about that circuit; 2) collects the data from the MIB; and, 3) assembles that data in the appropriate tables for storage in the Broadband Server database 285. A nightly process between the RMS 270 and PRS database 280 syncs up PRS level of service information with the RMS 270 to determine what level of reporting is assigned to each circuit/PVC and runs the appropriate reports. From these components, the following functions, reports and capabilities are available to nMCI Interact users: a) near real-time performance statistics; b) customer performance reports including, but not limited to: 1) Frame Relay Graphs including: Network Health (Daily-Monthly) such as shown in the Frame Relay Daily Network Fitness report 602, FIG. 11(a); Network Throughput (Daily-Weekly-Monthly) such as shown in the Frame Relay Daily Network Throughput report 603, FIG. 11(b); Busy Hour Circuit Trend (Daily-Weekly-Monthly) such as shown in the Frame Relay Daily Busy Hour Circuit trend report 604, FIG. 11(c); Customer Frame Delivery (Daily-Weekly-Monthly) such as shown in the Frame Relay Daily Customer Frame Delivery report 605, FIG. 11(d); PVC Utilization by Access Circuit Busy Hour (Daily-Weekly-Monthly) such as shown in Frame Relay Daily PVC Utilization by Access Circuit Busy Hour report 606, FIG. 11(e); Quality of Access Port by Hour (Daily) such by Hour report 607, FIG. 11(f); and, Frame Relay Daily Daily Congestion Notification report 608, FIG. 11(g); 2) corresponding Frame Relay Text Reports including, but not limited to: Network Throughput (Daily-Weekly-Monthly); Busy Hour Circuit Trend (Daily-Weekly-Monthly); Customer Frame Delivery (Daily-Weekly-Monthly); PVC Utilization by Access Circuit Busy Hour (Daily-Weekly-Monthly); PVC Utilization by Access Circuit (Daily); Quality of Access Port by Hour (Daily); Frame Relay (Daily) Congestion Notification; and, Customer Configuration (Daily); 3) Frame Relay Downloads including: Circuit Usage (Daily) and PVC Usage (Daily); and 4) SMDS Graphs including Circuit Statistics (Daily-Weekly-Monthly) and Busy Hour Circuit Trend (Daily-Weekly-Monthly). Additional capabilities include providing Near Real-time alarms and configuration reports (Frame and SMDS) relating to an MCI customer's virtual transport network. Thus, the Broadband system 200 of the invention provides a tool set by which a customer can understand the performance of their virtual data network. It provides the customer with the ability to trend network performance statistics over time, and then to determine whether the network should be changed to ensure that it is operating at maximum performance levels (i.e., meeting business needs). The Broadband reporting system further enables customers to review network performance data over a period of time, e.g., up to 45 days, by creating and saving reports on their workstation, a network server, or a floppy disk. Alarm trending and analysis, correlating alarm occurrences to network availability, network performance and problem resolution may also be performed.

Figure 8A:
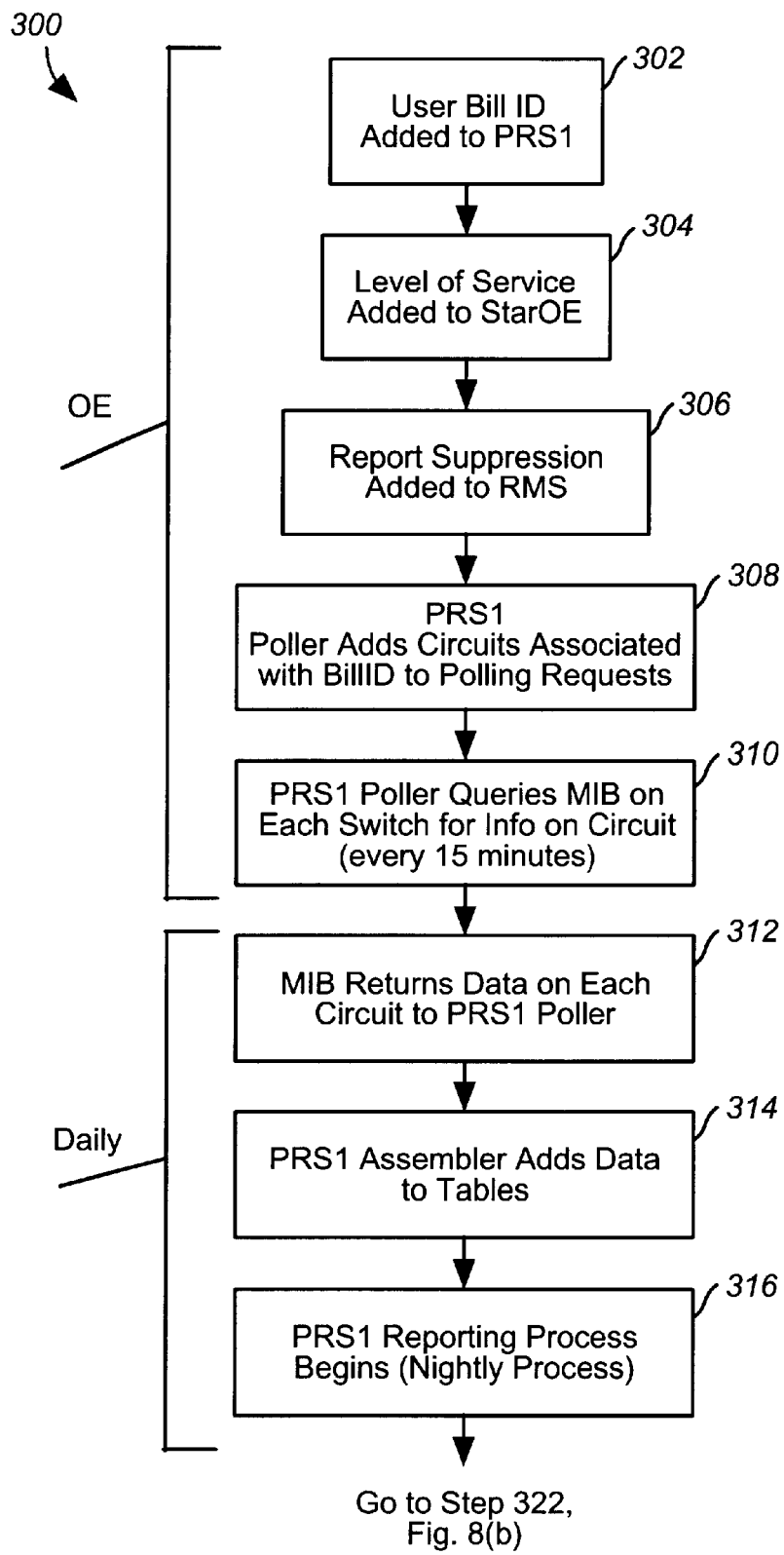
FIGS. 8(a)–8(b) illustrate the flow diagrams depicting the Broadband system report creation process 300.

A detailed flow diagram illustrating the CSV report creation process is now illustrated in view of FIGS. 6–7, 8(a) and 8(b). As shown in FIG. 8(a), steps 302–306 depict the addition of the User Bill ID to PRS1, the addition of level of service information to StarOE and, addition of any report suppression information to the RMS. As described, level of Service information is available from the StarOE system. Level of service information from StarOE is of a courser granularity and is used to enable access to the appropriate Broadband capabilities, based on the order entry process. A user can suppress the transmission of a report or set of reports using the BB application, however, this does not stop the collection of performance statistics, only the generation of reports.

The next few steps 308–314 relate to the data collection process. Specifically, data on the performance of all circuits associated with a particular Bill ID is collected from all switches in the ATM or Frame Relay Network by an automated periodic polling process, e.g., hourly. The addition of a new Bill ID to the PRS1 tables (step 302) is utilized by the polling process which process adds circuits and PVC to its polling requests based on association with the new Bill ID, as indicated at step 308. Then, as indicated at step 310, the poller queries the MIB 292 on each switch in the network for statistics on selected circuits and PVC on a cyclical basis, e.g., every 15 minutes. As shown in FIG. 7, the PRS poller function 296 polls the MIB 292 at each switch in the network, e.g., Frame Relay or ATM network, in sequence. The Poller sends a UDP packet to the MIB on each switch in sequence for statistics on all circuits/PVCs enabled for Broadband service. In response to the UDP request, at step 212, the MIB returns all the current statistics on circuit/PVC data from the switch. In the event that a switch is not reachable, the polling process logs an error in a PRS1 error log indicating that the specific switch was not reachable. Next, as indicated at step 314, the PRS1 writes the data to a text file and a Sybase bulk loader process adds the information to a raw data table. Particularly, as shown in FIG. 7, a PRS assembler process 297 distributes statistics to the appropriate tables in a PRS1 active database 280. The assembler process compares the previous hour's data to the data in the raw table, compares values and writes the deltas to the hourly tables, which tables are then replicated to the reporter.

Then, in FIG. 8(a) at step 316, an automated process runs selected reports on available statistics in the PRS database tables. In the preferred embodiment, as shown in FIG. 7, this reporting process 298 occurs nightly, however, it can be run on any periodic basis. The specific reports that are run are determined by the level of service for which the Bill ID is enrolled as stored in StarOE tables.

Figure 8B:
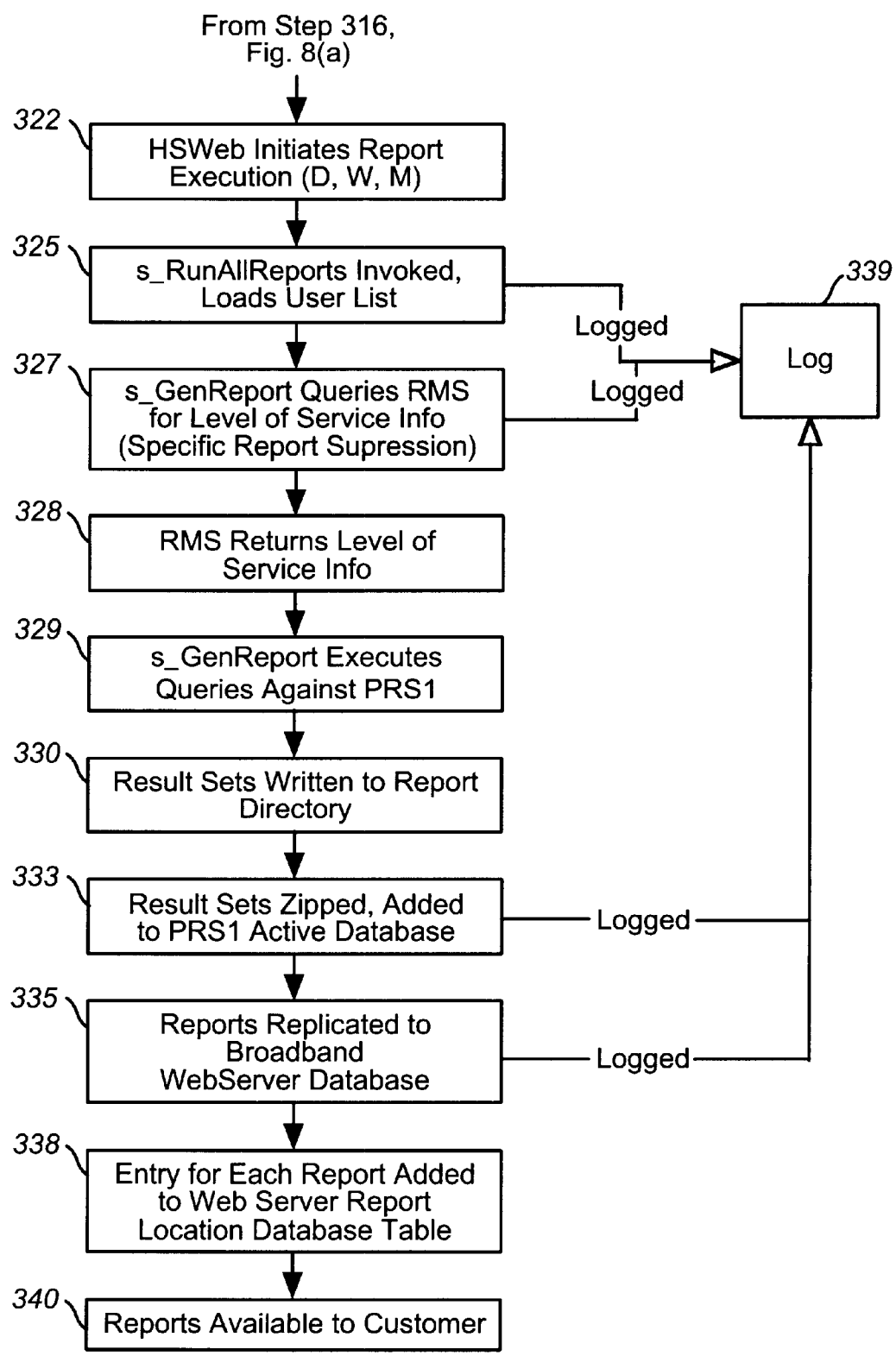

Referring to FIG. 8(b), as indicated at step 322, for each Bill ID, the reporter determines which reports are to be produced, generates queries against the appropriate tables, runs the queries at the appropriate time and delivers reports to the users BB Inbox 224. Report creation is done in sequence: all dailies, then all weeklies (if appropriate) then all monthlies (as appropriate). Particularly, as indicated at steps 325 and 327, a control process "s_RunAllReports" is invoked to load all customer lists, and at step 325 calls "s_GenReport" which collects level of service information for all customers. As indicated at step 328, the RMS process returns level of service information indicating any report suppression, and, at steps 329, the "s_GenReport" creates and executes queries against the data collected in the PRS1 database. At step 330, result sets are written to a temporary report directory and are then compressed at step 333 and added to the PRS database which may store the report for a predetermined amount of time, e.g., one week. Next, as indicated at step 335, the reports are replicated using off-the-shelf components, e.g., Sybases's RepServer, and saved on a Broadband server report location database ("RLD") 285 which can be remote mounted by the Broadband Server 250. Particularly, the PRS reporter 298 shares a drive on which these reports are located with the Broadband Server via a remote file mount. The Broadband Server database retains data and reports for a predetermined period of time, e.g., 45 days, prior to the current data.

Finally, as indicated at step 338, the Broadband Server 250 determines which reports have been produced and forwards them directly to of with the Broadband Inbox component associated with the Bill ID. Broadband Server creates a unique filename for each CSV report and places each report on the Broadband Inbox 224 (FIG. 6) for customer retrieval, as indicated at step 340. The steps of 322–338 are depicted in a condensed physical architecture diagram of the Broadband system shown in FIG. 7.

As shown in FIG. 8(b) at steps 325–327, 333–335 a determination is made as to whether the processing performed in each step was successful. If the processing performed in each step was not successful, or, an error occurs, then the error may be logged in a log file 339 at the Broadband Server and at Inbox for subsequent review, when necessary.

Figure 9:
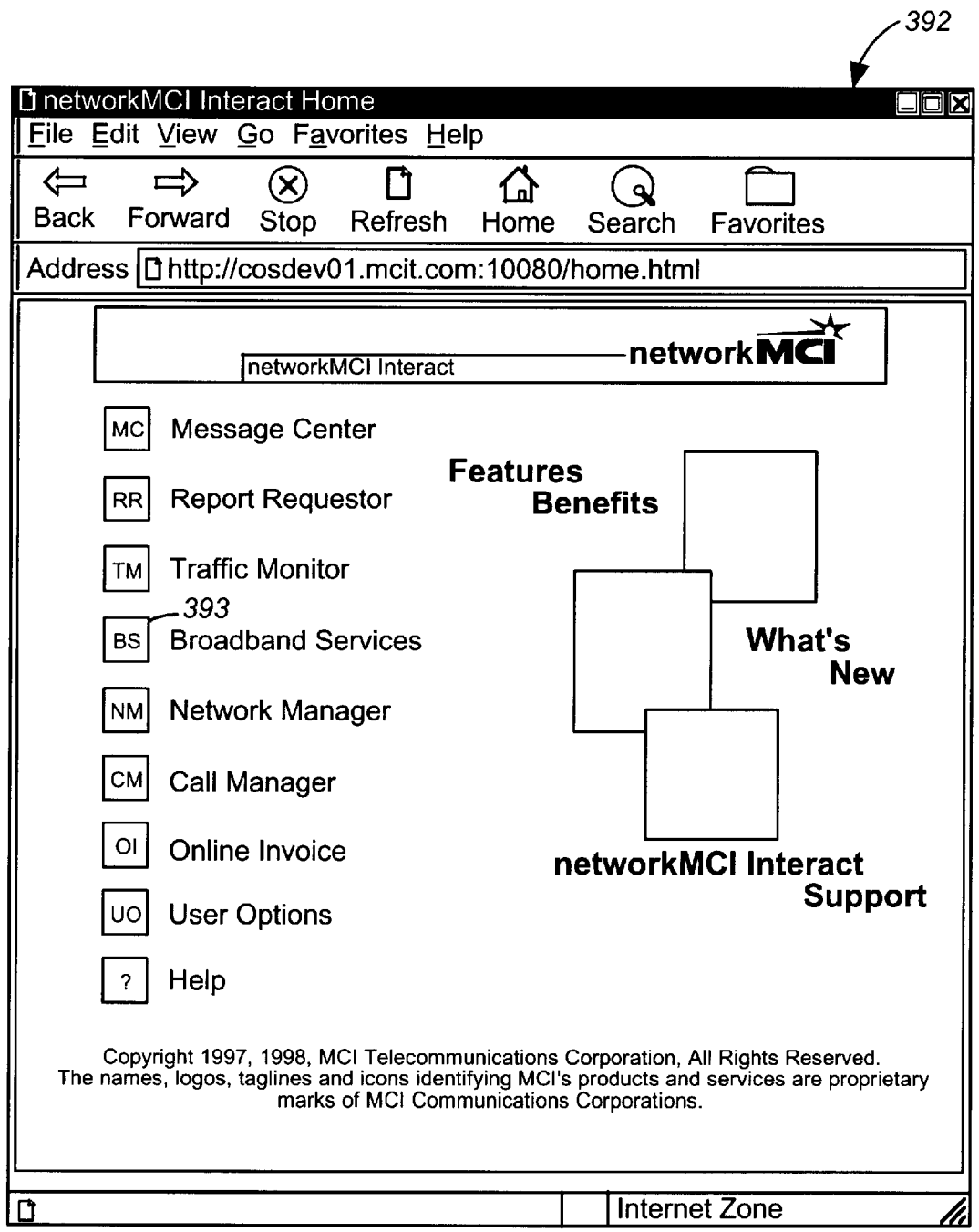
FIG. 9 illustrates an example web-based nMCI Interact System home page.
Figure 10A:
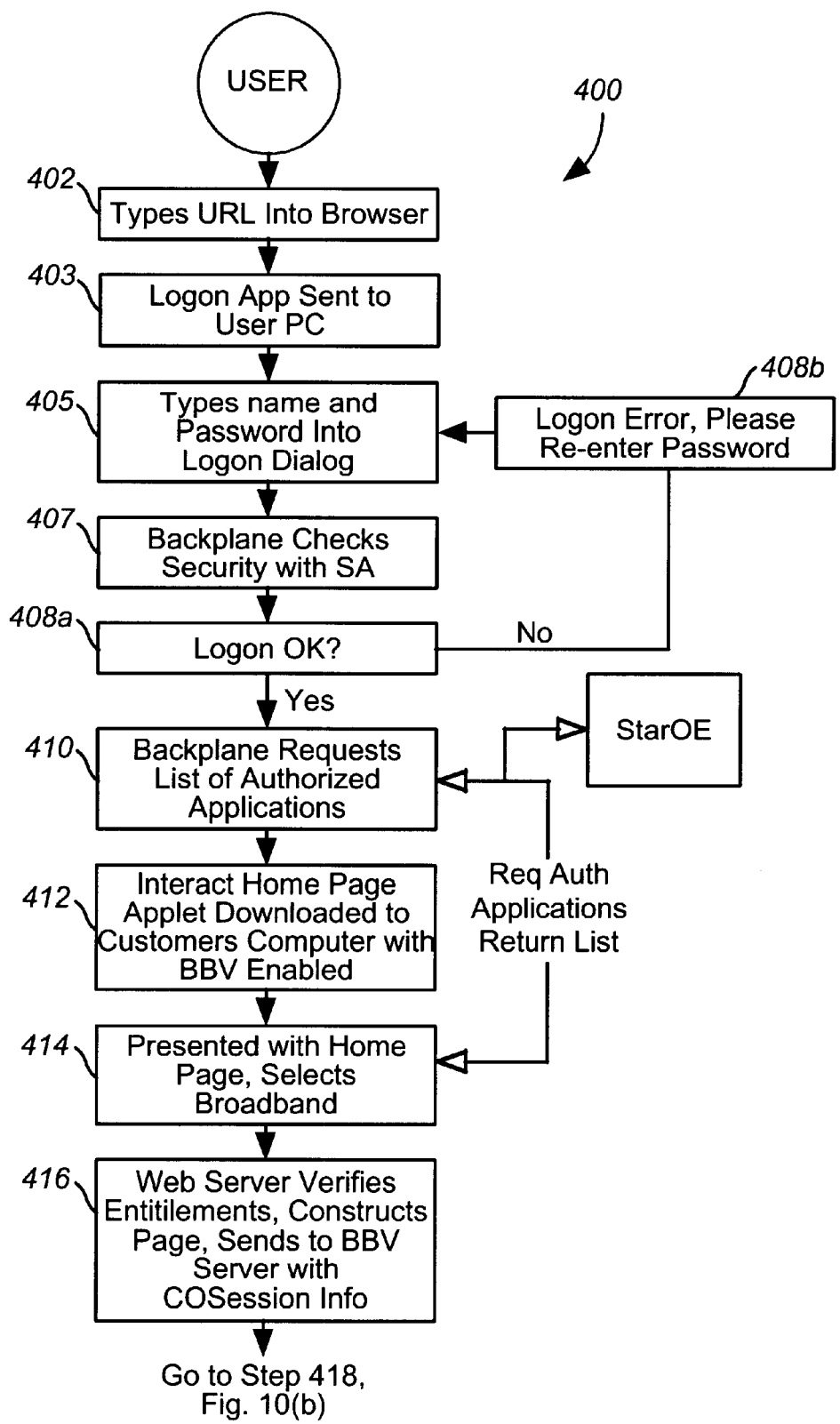
FIGS. 10(a)–10(e) illustrate process flow diagrams depicting various Broadband report and SNMP alarm data retrieval processes.
Figure 10B:
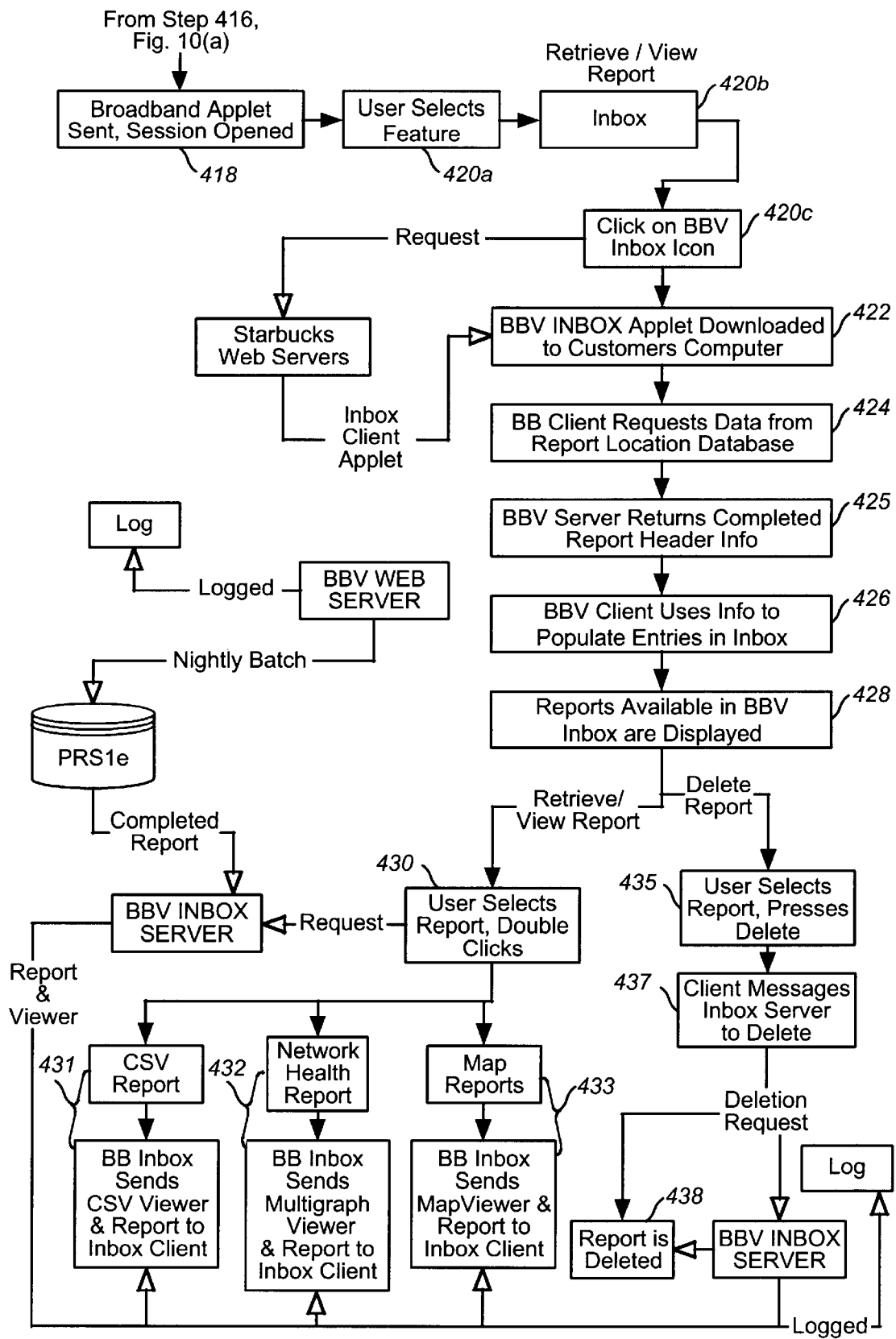
Figure 10C:
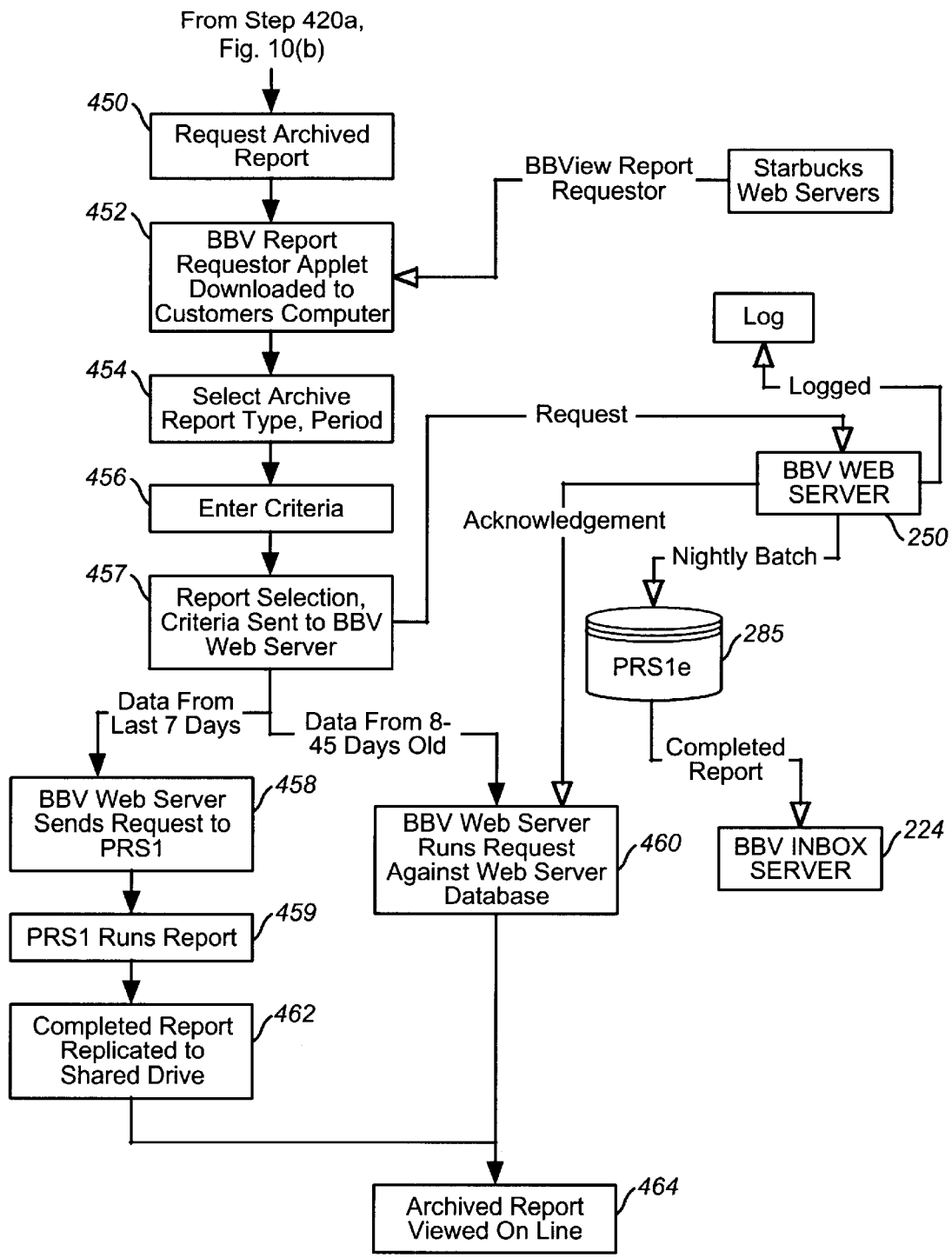

Details of the Broadband report retrieval process 400 is now described in view of FIGS. 10(a)–10(b). As shown in the process flow diagram of FIG. 10(a), a customer first types in the URL into the Web Browser where a connection is made to the networkMCI Interact web page, as indicated at step 402. A logon applet is sent to the web page at step 403. Having accessed the web page, the user logs in, as indicated at step 405, and a user Common Object is created. At this point, a message is sent via an established TCP/IP connection via a Dispatcher Server 26 (FIG. 6) to the StarOE Server 260 to validate the customer as indicated at step 407. Once the customer is validated, at step 408a,b, the backplane objects request a list of all the authorized applications from the StarOE server, as indicated at step 410. At steps 412 and 414 respectively, a networkMCI Interact applet is downloaded to the customers Web Browser via the established TCP/IP connection, and the browser presents the customer with the networkMCI Interact systems home page, such as the exemplary home page 392 shown in FIG. 9. It should be understood that in the preferred embodiment, the icons for applications the user has security access to are shown bolded. Referring back to FIG. 10(a), at step 414, the customer selects the Broadband application from the home page by clicking on a Broadband Services icon 393 (FIG. 11), and StarOE validates the user's id and password in the manner as described in commonly owned, co-pending U.S. patent application Ser. No. 09/159,514 entitled AUTHENTICATION AND ENTITLEMENT FOR USERS OF WEB BASED DATA MANAGEMENT PROGRAMS, the whole contents and disclosure of which is incorporated by reference as if fully set forth herein. The Broadband server sends a message to the StarOE server directly requesting the customer's security status, e.g., support personnel, read-only user, or regular user. This communication is also accomplished through Java applets using TCP/IP with a UNIX process listening on a known TCP Port. Once the security has been verified by StarOE, the backplane object allows the user access to the Broadband Client front end. As shown at step 416, a client Broadband applet is downloaded to the customer who is presented with the Broadband screen, as indicated at step 418.

Figure 12A:
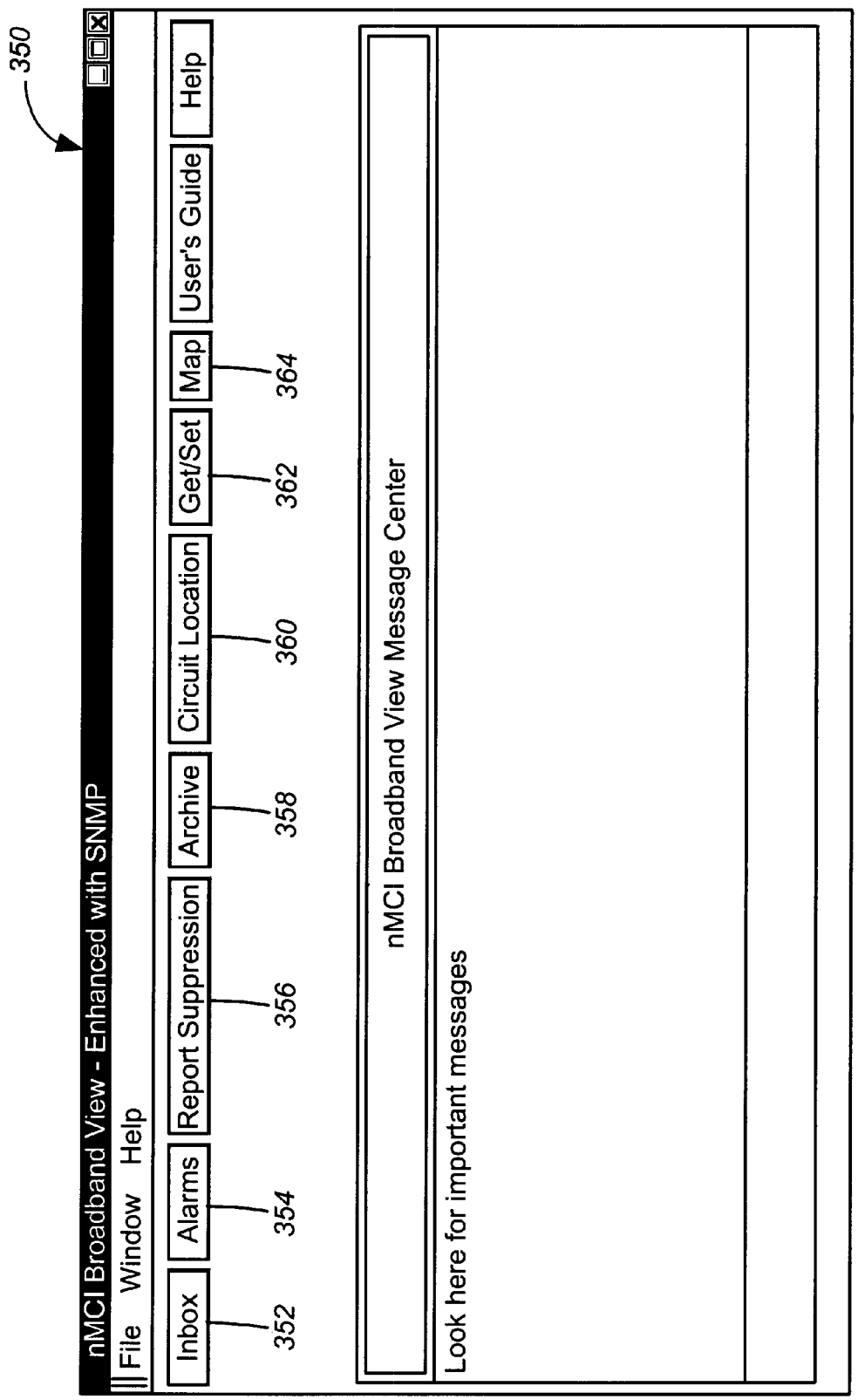
FIGS. 12(a)–12(e) depict example dialog screens displayed on web-pages for enabling all Broadband Services.

An exemplary Broadband web-page BB Main Display screen 350 is shown in FIG. 12(a) which presents a variety of user-selectable Broadband options including: 1) an Inbox option 352 enabling a user to retrieve their Broadband reports; 2) an option 354 enabling a user to view SNMP alarms; 3) an option 356 enabling a user to specify reports to be suppressed; 4) an option 358 enabling a user to retrieve Broadband reports that have been archived; 5) an option 360 enabling a user to receive information regarding their circuit locations; 6) an option 362 enabling the "get/set" functionality; 7) an option 364 enabling the retrieval of a map viewer application for generating maps portraying the customer's virtual networks.

In the preferred embodiment, a Broadband Main Display applet is provided as a launching pad for accessing all of the aforementioned Broadband services. The Main Display applet is launched by selecting Broadband Services from an nMCI Interact home page (FIG. 9). Preferably, the Main Display is a Java applet running inside the user web browser 220 and utilizing classes which extend the basic Java applet functionality in areas such as application management, user session management, user-interface, inter-applet communication, and client/server communications. Particularly, from the Broadband Main Display applet access to and communications between Broadband applications is provided using the Common Object COApplet, COApp, and COBackPlane services which are objects functioning in the manner as described in co-pending U.S. patent application Ser. No. 09/159,515, COS-97-089), the contents of which are incorporated by reference as if fully set forth herein. In the manner as shown in FIG. 3, the Main Display applet BBMainDisplay inherits from COAppIMPL class with a COApplet interface and is launched from the nMCI Interact COBackPlane using the COApplet interface. When a user clicks on a Broadband service toolbar button or menu item, BBMainDisplay creates an instance of a COApp(let) to manage the corresponding application. When the user exits from Broadband services, the COBackPlane is utilized to destroy the application and its windows.

The Broadband Main Display applet provides a menu-bar, toolbar, and status bar for accessing Broadband services according to the customer's subscribed service option which includes: Basic; Standard; Enhanced SNMP; Premium; Enhanced Adhoc Reporting; Enhanced SNMP+Adhoc Reporting; and Dedicated SNMP. As determined by the user logon session with the StarOE server 260, if the user is not entitled or does not have authorization for a particular service, the corresponding toolbar icon or menu item is disabled (ghosted-out). For example, custom reporting service is disabled if customer does not have Standard or Enhanced service options and, Broadband SNMP service is disabled if the customer does not have Broadband SNMP or PRS Enhanced service option. Thus, the corresponding service icon and/or menu item will be rendered insensitive to user input in accordance with the customer service option.

When BBMainDisplay is launched, the Main Display first determines the user's Broadband level of service option, e.g., Basic, Standard, Enhanced SNMP, etc. A user selects a Broadband service, e.g., custom reporting, archive reporting, or SNMP features such as Get/Set and alarm panel by clicking on the corresponding toolbar icon or pull-down menu item on the Main Display applet (FIG. 12(a)). For the case of custom (adhoc) reporting of data, e.g., from the Frame Relay MIB, a custom reporting applet interface is provided. From this web interface, a customer can select from the available data variables (i.e. physical or logical circuit, data point value, time frame for report, etc.). Specific responsibilities of the custom report applet include: 1) allowing customers to define a custom report query using single performance statistics category, statistics range, and date/time range; 2) allowing customers to select reports presenting statistics relating to their current network Access Circuits or network PVCs. This comprises enabling a customer to select either Access Circuit or PVC reporting category type, in which case a drop down list displays current performance statistics for the selected category. The Customer then selects a single performance statistics category from drop down list; 3) allowing a customer to specify range on statistic value using relational operators and numerical values, e.g., value>=80%; 4) allowing a customer to specify report date/time range covering, for example, the previous 45 days of service. A customer can select start and stop date/time anytime within range; 5) allowing the customer to save the custom defined queries by providing a "Save Query" option; and, 6) providing an "Auto Run" function to allow custom reports to be run automatically and available when the default reports are produced through the Broadband Inbox. Once the user submits the custom report request it is forwarded to the Broadband Inbox for subsequent view.

When basic service option is provided, the Broadband main display applet has the responsibility of: 1) requesting service type (entitlements) either from StarOE authentication server or as data from BackPlane (FIG. 3); 2) requesting reports that are no longer on the Inbox server to be retrieved from a report data archive if a pre-determined period of time has elapsed, e.g., 45 days, and provide these reports to the customer via the Broadband Inbox; 3) defining how the customer reports should be requested, e.g. report ID, date, etc.; 4) providing on-line context sensitive help for all aspects of the Broadband WEB application; 5) providing access to the Broadband User's Guide; 6) providing the ability to spawn separate dialog windows, for example, to explain reporting activity in progress; 7) providing a "send mail" function to provide the customer with a method to create a mail memo for distribution to a help desk; and, depending upon the customer's service option, 8) providing access to custom reporting capability (Adhoc Reporting) via toolbar and menu; and, 9) providing access to the SNMP features (Get/Set and Alarm) via toolbar and pull-down menu.

Referring to FIG. 10(b), the user may select the BB Inbox feature as indicated at steps 420a–420c by clicking on the BB Inbox icon. By clicking the BB Inbox icon a download of the BroadBand Inbox applet is initiated, as indicated at step 422. Via this applet, the BroadBand View Inbox client requests all available report data (headers) from the Report Location Database as indicated at step 424. Then, at step 425, the RLD returns header information such as report name, id, location, date/time requested, data time produced to the client, and uses the information to autopopulate the entries in the Broadband Inbox at step 426. The report availability is then displayed in the BB Inbox (client) screen at step 428. It should be understood that by the time a user has received the welcome packages from nMCI Interact, backend data collection and report generation activities at the appropriate level of service have already begun. As a result, completed reports are available at the first login.

FIG. 12(*b*) depicts an example Broadband view Inbox screen display 353 having a screen area 355 for displaying the currently available reports. Referring back to FIG. 10, a user may retrieve any report for viewing by double clicking on the report desired which action causes a request for the report and the appropriate viewer to be sent to the Broad-Band Server, as indicated at step 430. BroadBand Server responds by locating the file (using the RLD) and transferring the file to the user and the appropriate viewer to the client. In the preferred embodiment, the user is enabled to display comma separated values ("CSV") textual reports, as indicated at step 431; network health multigraph reports, as indicated at step 432; and, map reports, as indicated at step 433.

Thus, in the preferred embodiment, the Broadband Report Viewer component includes Java applet viewer classes that enable the downloading and display of performance reports generated from the Broadband web server 250. In the preferred embodiment, there are at least two types of viewer classes providing the following reports: 1) Monthly Network Health Reports which are static standard and multi-graph reports having three information areas: i) domestic latency, i.e., network delays; ii) delivery, i.e., network throughput; and iii) Peak Utilization, e.g., based on committed information rates; and, 2) Daily Network Health Reports which are static standard and multi-graph reports having the domestic latency, delivery and Peak Utilization reporting views, in addition to a fourth reporting Exceptions view. Besides having the ability to select reports on a daily or monthly basis, a custom reporting Java applet is provided to enable customers to select Broadband "ad hoc" (one time) reports at any previously defined interval. For example, a customer may have a standard "Daily Throughput Performance" report delivered each day. However, for a particular day, the same customer may choose to submit an ad hoc "Throughput Performance" report for a previous time interval, e.g., previous week, or previous month. In the preferred embodiment, the Broadband web server adds completed report data in CSV to the Broadband Inbox server 224 which component enables the client reporting process 226 to display reports. Particularly, the BB client application loads the report viewer, which loads the requested report and displays it to the user. For CSV/spreadsheet reports the user has the option to manipulate the data in the viewer. When viewing multi-graph reports such as the Network Health report, the viewer provides drill down capability: by double clicking on a section of a graph, the supporting data is displayed.

The Broadband Report Viewer component additionally includes Java applet classes enabling the display of customer configuration maps which are two dimensional maps having certain locations highlighted, e.g., customer gateways, in addition to lines connecting two or more locations representing a customer's dedicated data transport paths, e.g., permanent virtual connections ("PVC"), as will be hereinafter described in further detail. Besides having the ability to generate network performance reports and configuration maps, the Report Viewer component of the Broadband Reporting tool includes Java applet classes enabling the presentation of real- or near real-time alarm and network event data obtained from the network management platform, "NetExpert" 290 as shown as FIG. 6. Via a proxy application 291, events and alarm notifications are sent to the BB server 250 which processes the alarms for communication through the dispatcher/BBProxyServer applications directly to the BB client 221, via secure TCP/IP socket messaging, as will be described in greater detail hereinafter.

Referring back to FIG. 12(*a*), the selection of the report suppression option 356 will enable the presentation of a BB view report suppression screen 363, an example screen of which is shown in FIG. 12(*c*). From this screen, the user is enabled to suppress or enable the particular selected report name, type, schedule, by selecting pull-down menu 355.

Furthermore, as shown in FIG. 12(*a*), the selection of the archive option 358 will enable the presentation of a BB view archive report screen 367 an example screen of which is shown in FIG. 12(*d*). From the screen of FIG. 12(*d*), the user is enabled to select the archived report to be displayed at the BB Inbox by name, type, scheduling period, and reporting time period in entry fields 369. FIG. 10(*c*) details the process flow in generating the Broadband archive reports after user logon and authentication process is performed (FIG. 10(*b*)). As shown in FIG. 10(*c*), after the Request Archived Report function is selected at step 450, a report requester (BB) application is downloaded at step 452 enabling the user to select the archive report name and type at step 454 and, enter the reporting period information, as indicated at step 456. The user is prevented from making invalid requests by edit checks in entry fields and business rules embedded in program logic. At step 457, the request with criteria is sent to the BroadBand View Server 250 where it is converted into a query and run against the appropriate database. For example, if the report period requested is within the last week, the request is run against the PRS database, as indicated at steps 458–459; if the report period requested is within the previous 45 days, for example, the request is run against the Broadband Server, as indicated at step 460. When the query is completed, the results are compressed and replicated to the shared drive. When the replication is successfully completed at step 462, the archived report is displayed on line as indicated at step 464.

As further shown in FIG. 12(*a*), the selection of the circuit location option 360 will enable the presentation of a BB view circuit location screen 371 an example screen of which is shown in FIG. 12(*e*). From the screen of FIG. 12(*e*), the user is enabled to retrieve network configuration information pertaining to that customer's network by clicking the appropriate circuit ID and location field from a list 373. By clicking on this field, a textual report containing circuit configuration information may be displayed. The preferred method of reporting to a customer the current configuration of their MCI supplied virtual data network is via a web base geographical image map. The Broadband mapping report and Customer Configuration Map report are available for customers of all levels of service via the Broadband reporting system.

Preferably, all Broadband customers receive a basic report set containing information on utilization, throughput and treatment of data transmitted over their virtual data networks as part of the default report set for the selected service option. Each service, e.g., SMDS and Frame Relay option, is provided reports specific to the performance indicators of that service (e.g. utilization, throughput and treatment of data transmitted over the virtual data network). The actual reports and the reporting interval may be unique, based on the type of report although default reports are available. A Customer Configuration text report is included within a default set of reports. The mapping report is preferably updated on a daily basis based on changes that have occurred within the customer's network in the previous 24-hour period. As the update is dependent upon a successful completion record, update latency can be greater than 24 hours from the actual event causing the change.

The data source for the customer's Configuration Map and Customer Configuration text reports includes: a customer name; Billing id; contact (name and phone number of customer representative for this account); customer's mailing address; and the company providing FR service, e.g., MCI; a location field comprising a mnemonic identifying the MCI point of presence (POP), i.e., the city and state where the circuit is located; a circuit name assigned in circuit order management system for customer's FR access; a gateway field containing a mnemonic identifying the gateway that services this circuit; a Network Mgt. ID field that identifies the "NetExpert" system (FIG. 6) address by gateway, slot, port, and channel in the router card cage for this circuit; a Bandwidth field indicating circuit speed; a # PVC field indicating the Number of PVCs associated with this circuit (circuit name) a CIR total field indicating the sum of the CIRs for all PVCs on this circuit; an OVR SUB (%) field indicating the CIR Total (above) divided by the bandwidth times 100; a PVC field indicating a PVC number; a Gateway field comprising a mnemonic identifying the gateway that services circuit on the A side of the PVC; a Circuit field indicating the circuit name assigned to the A side of the PVC; a DLCI field indicating the DLCI assigned to the A side of the PVC; a CIR field indicating the CIR for the A side of the PVC; a Gateway field comprising a mnemonic identifying the gateway that services circuit on the B side of the PVC; a Circuit field indicating the circuit name assigned to the B side of the PVC; a DLCI field indicating the DLCI assigned to the B side of the PVC; and, a CIR field indicating the CIR for the B side of the PVC.

As mentioned above, the BB Report Viewer component includes the capability of displaying maps. The Map viewer displays all available (BB enabled) circuits provisioned for the user. Clicking on a circuit enables a display of the latest statistics for the circuit. All display functions including sorting, saving to disk and printing the report are executed by the viewer locally.

Figure 13A:
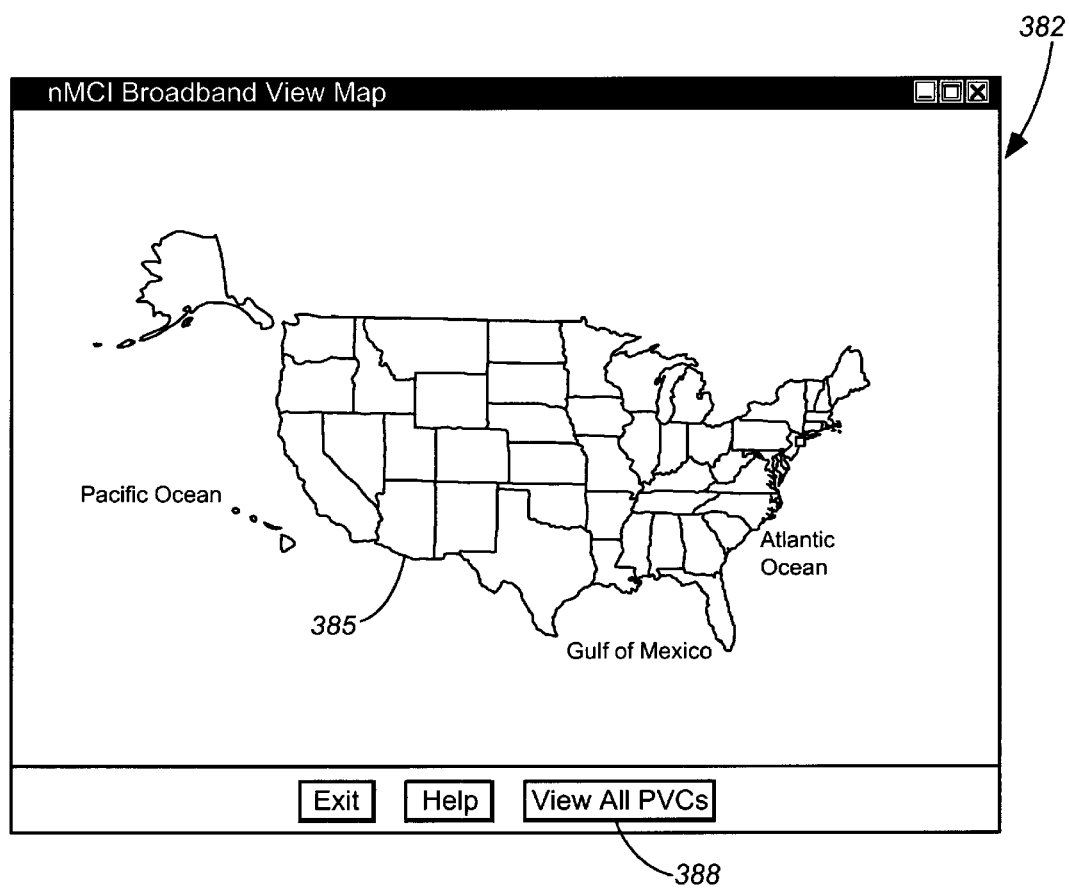
FIGS. 13(a)–13(b) illustrate two example views presented by the Broadband map viewer.
Figure 13B:
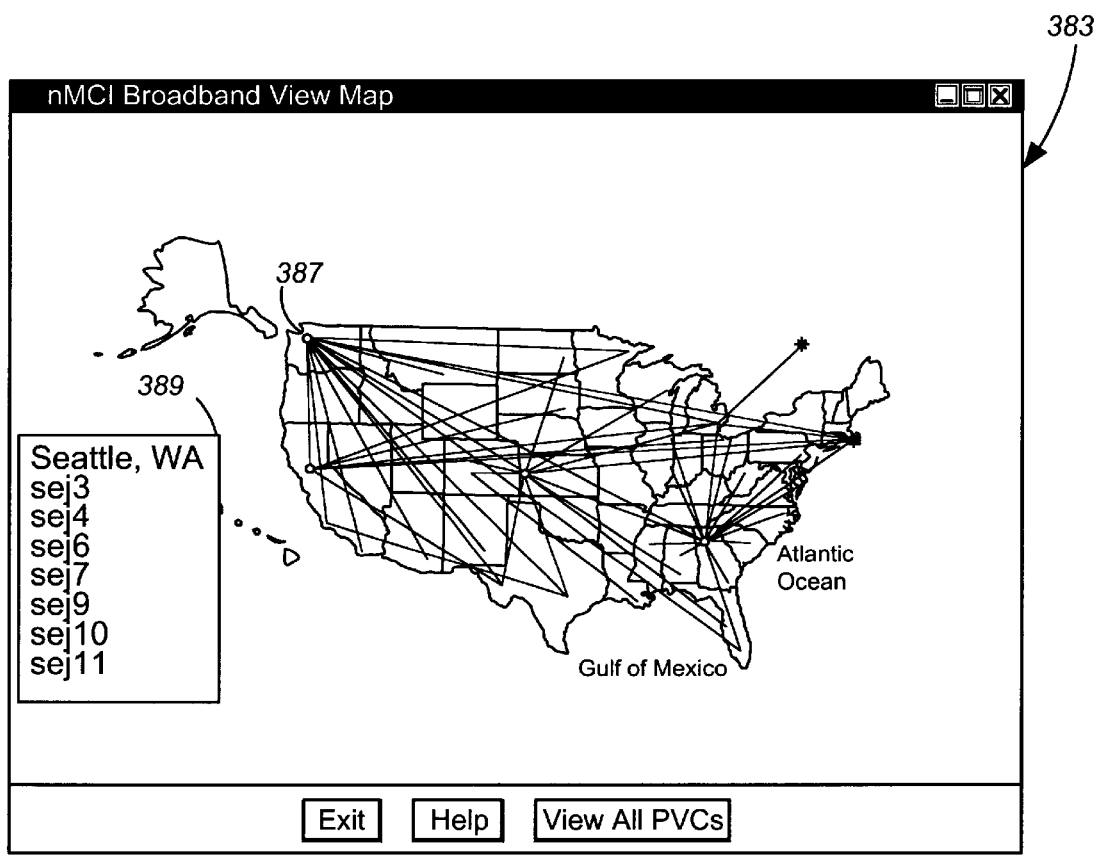

In the preferred embodiment, there are two graphical views of the configuration report to support both the Standard and Enhanced service level options: FIG. 13(a) illustrates the first map view 382 which presents a two dimensional US map with all end points of a customer's virtual data network represented with an indicator 385, e.g., depicted in FIG. 13(a) as a star. Each star represents a customer's circuit end point location within an MCI data network, but may also indicate non-domestic frame relay, SMDS or LEC access end points. As shown in the FIG. 13(a), selection of the "View all PVC's" button 388 enables the presentation of all circuits supported in the network. A second map view may also be displayed such as shown in FIG. 13(b). From this view, the customer may drill down on a selected endpoint by clicking on an identified location, e.g., location 387 and receiving a text box view 389 that includes the physical circuits supported by that network end point. Thus, a click on any identified point provides greater detail about the circuits supported from that end point including: circuit location; Circuit number; Gateway mnemonic; Network Management ID; Bandwidth; # PVC; and, CIR Total. As shown in FIG. 13(b), lines connecting PVC end points are also drawn by a mouse click on an identified end point. In the preferred embodiment, map views of FIGS. 13(a) and 13(b) are supported by invocation of Java applets which have the advantage that an image map implemented as a Java applet provides instant feedback to users. When a user clicks on a map displayed by a Java applet, the applet locally computes a response to the click and instructs the browser to load a new page. The tools capable of providing such map views and drill down capability include: Visual Café 1.1.2, JDK 1.1.3 and above, Sybase JCONNECT for back end database access, BusinessMap LTF, e.g., version 1.03 for Map background; Adobe PhotoShop for Map background.

Referring back to the report retrieval process flow 400 illustrated in FIG. 10(b), at step 428, the customer may be enabled to delete a report by selecting the delete report option.

To delete a report, the user highlights the report in the Inbox listing (FIG. 12(a)) and selects a delete function, as indicated at step 435. In response, at step 437, the client submits a delete request to the BB Inbox Server which locates the report, logs the request, deletes the file, and returns an acknowledgment to the client, as indicated at step 438. Upon receipt of the acknowledgment, the Inbox client refreshes the display to reflect the deletion. Errors in the deletion activity result in an error message which is logged at the server, and returned to the Inbox client. In response, the client may notify the user of the deletion failure by a pop-up dialog box on screen.

For the case of accessing SNMP capabilities, an SNMP application is launched from the Broadband SNMP Main Display Application if the customer has the SNMP dedicated or PRS Enhanced service option. Specific responsibilities of the SNMP application include: 1) providing SNMP Get/Set operations including: obtaining the selected variables from the Enterprise MIB upon initialization; 2) communicating with BBProxyServer and Broadband server database; 3) invoking Get/Set operations on MIB and returning results and displays; 4) providing an Alarm Panel for displaying alarms and event reporting; 5) handling customer near real time notification of updates to these alarms if the customer's web browser is pointed to a Broadband web page; and, 6) providing customer with SNMP get capability for the lowest interval data, e.g., 15 minutes to 1 hour.

Figure 12B:
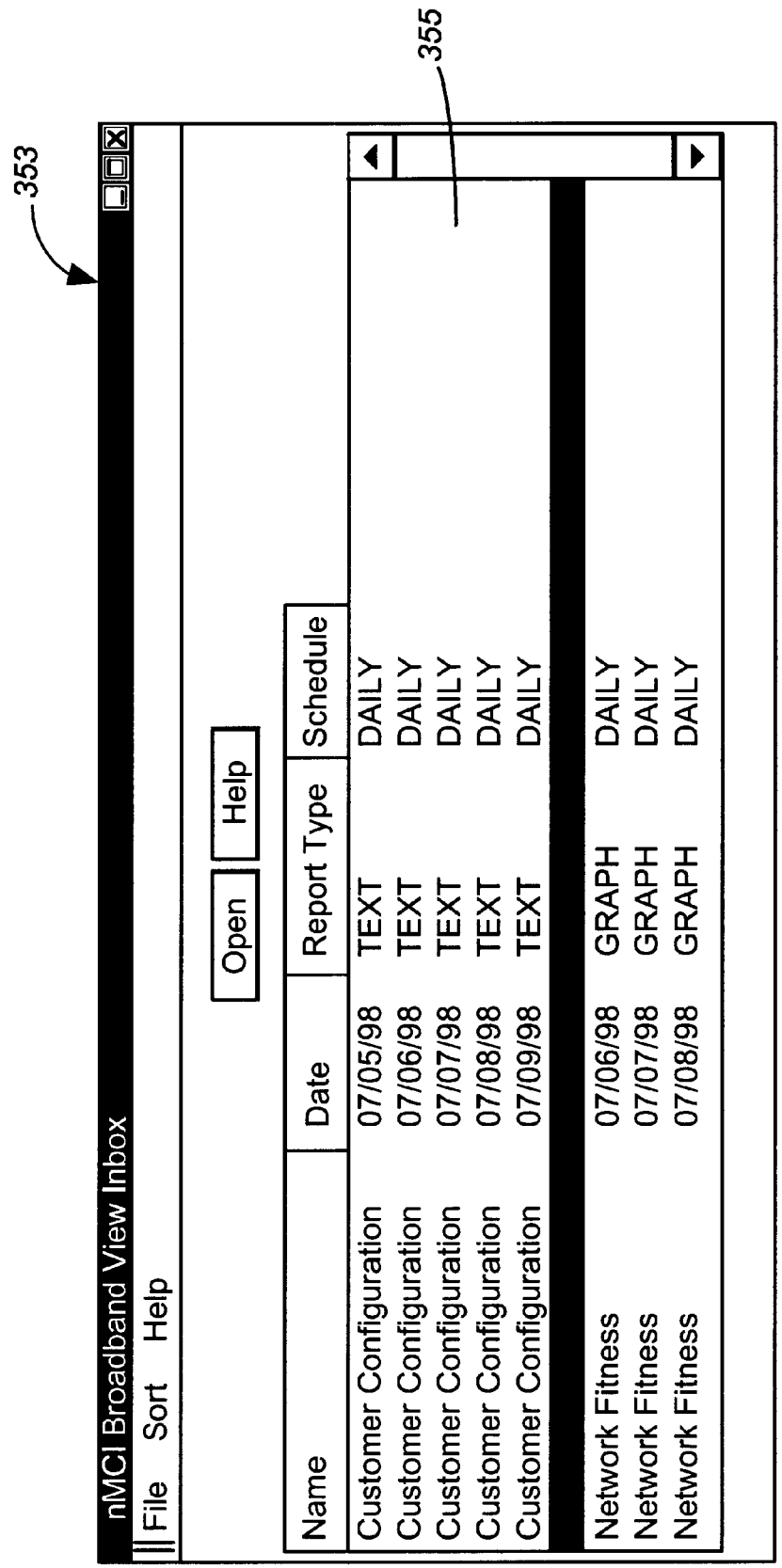
Figure 12C:
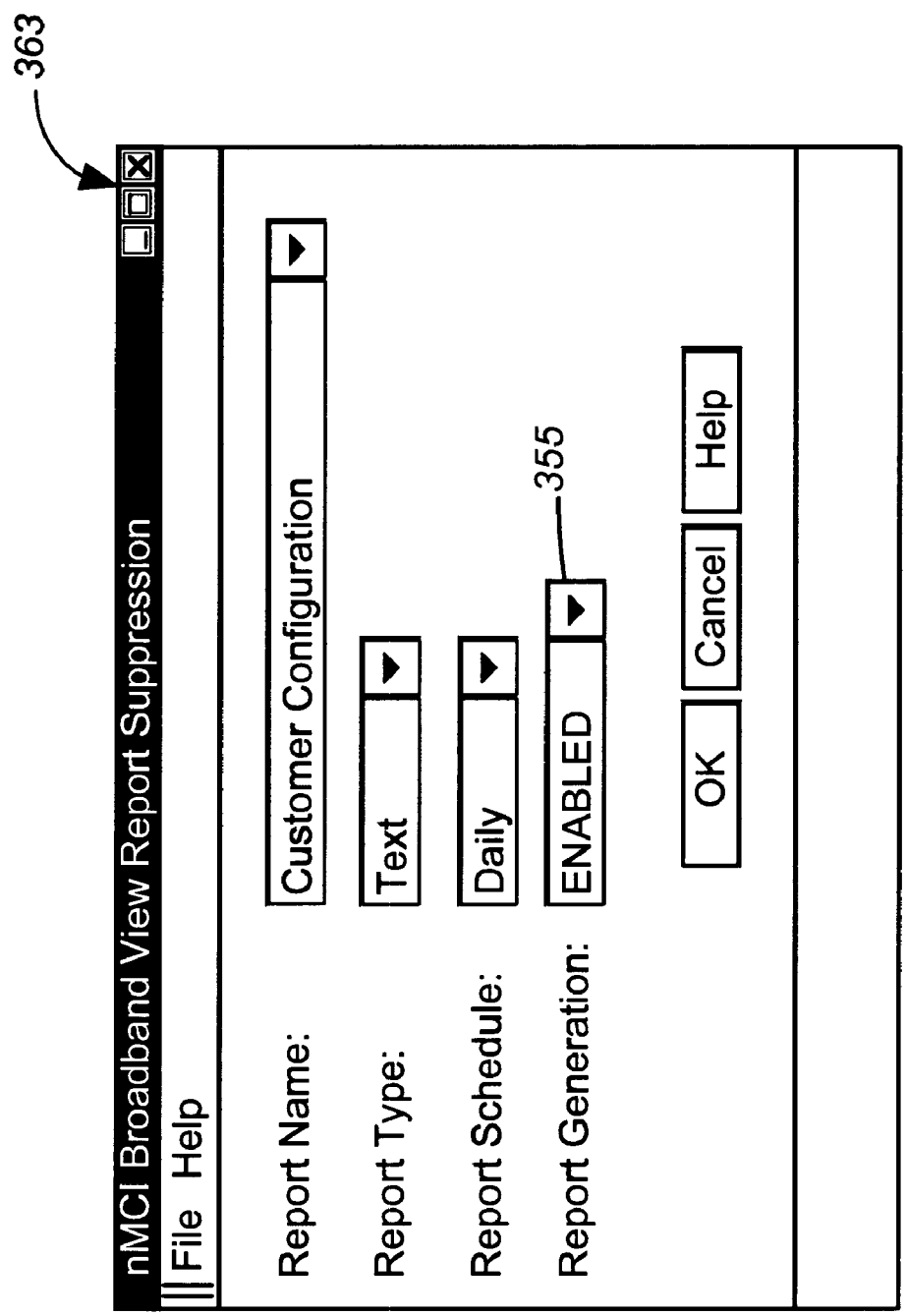
Figure 12D:
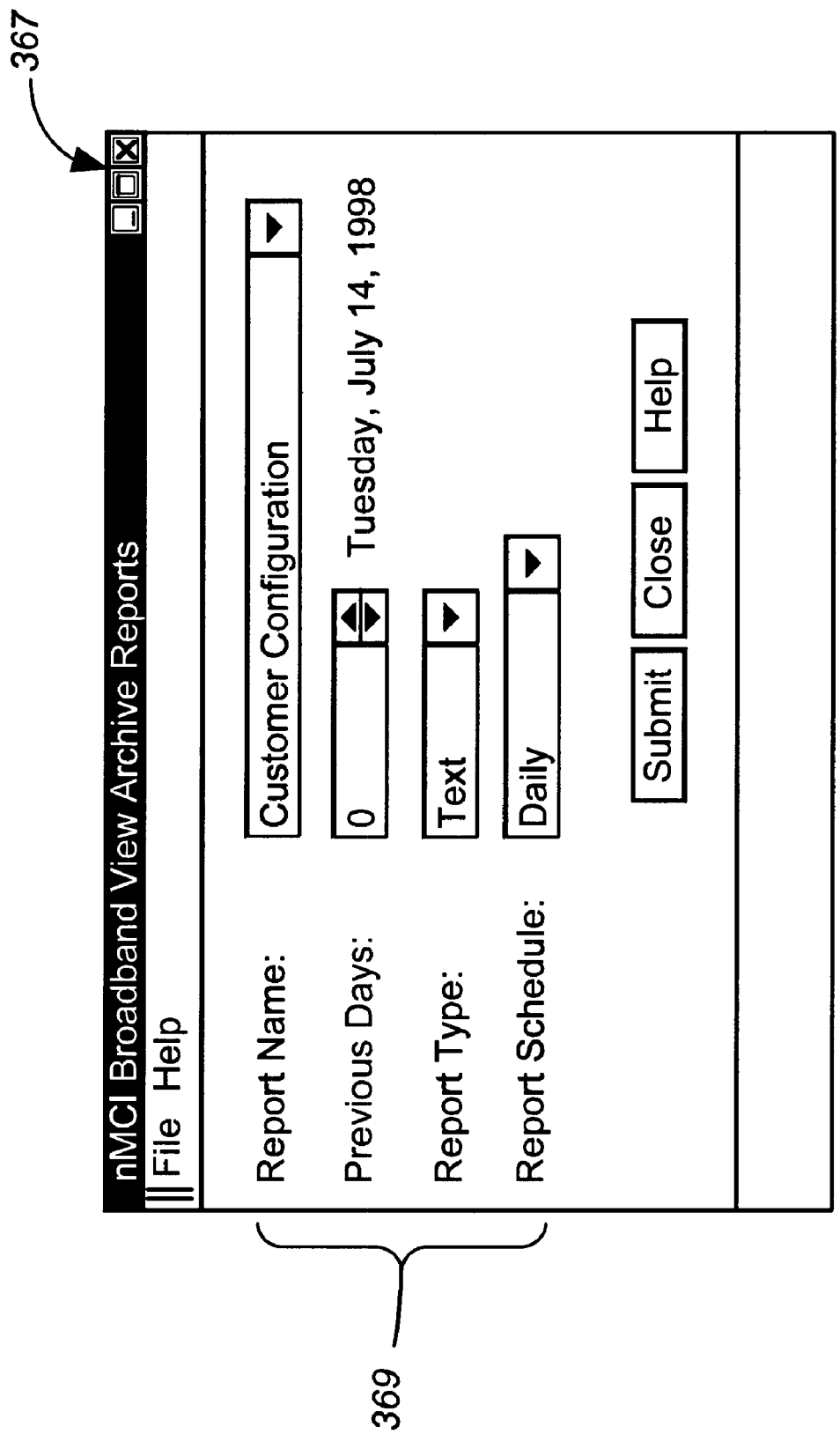
Figure 12E:
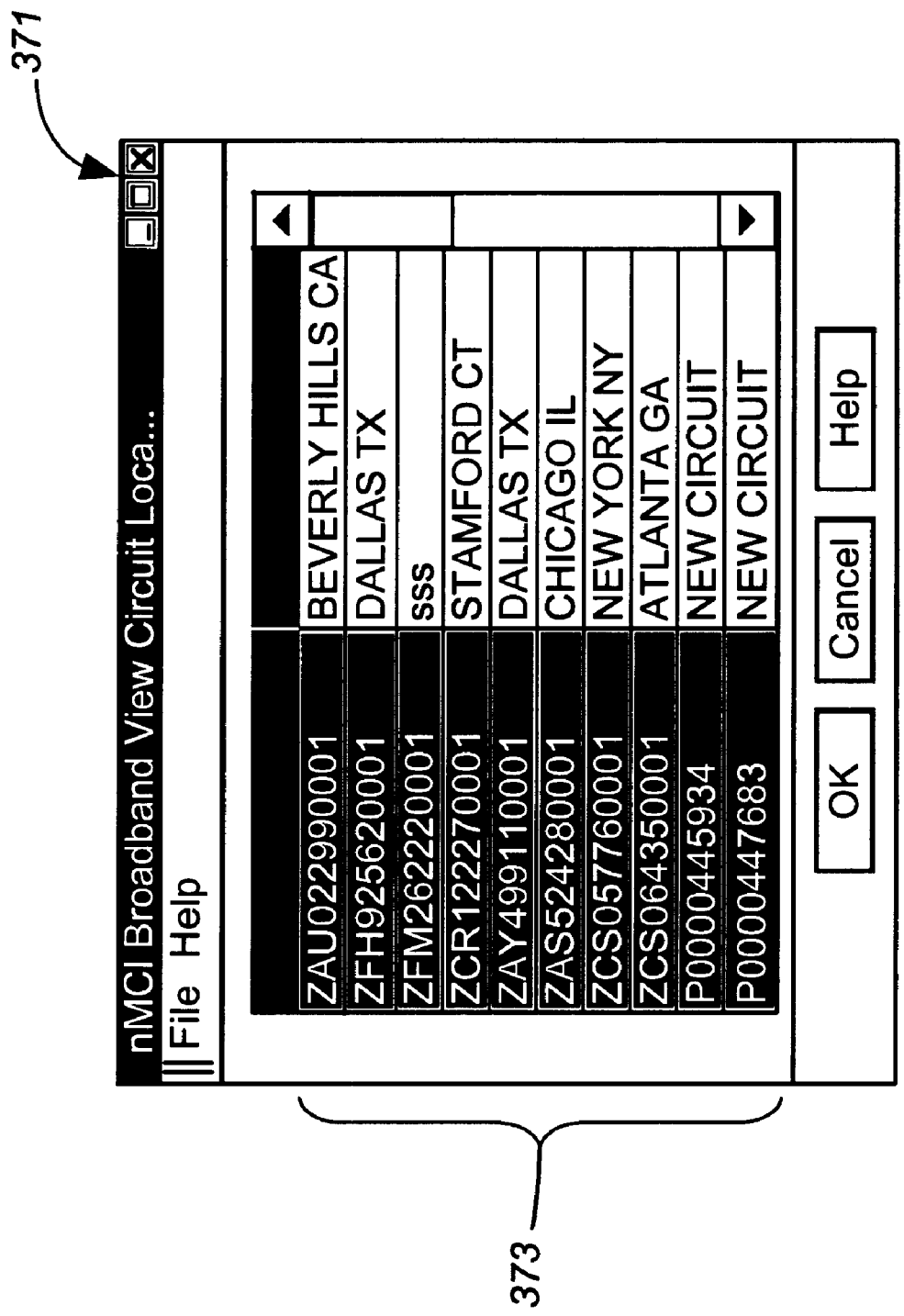
Figure 12F:
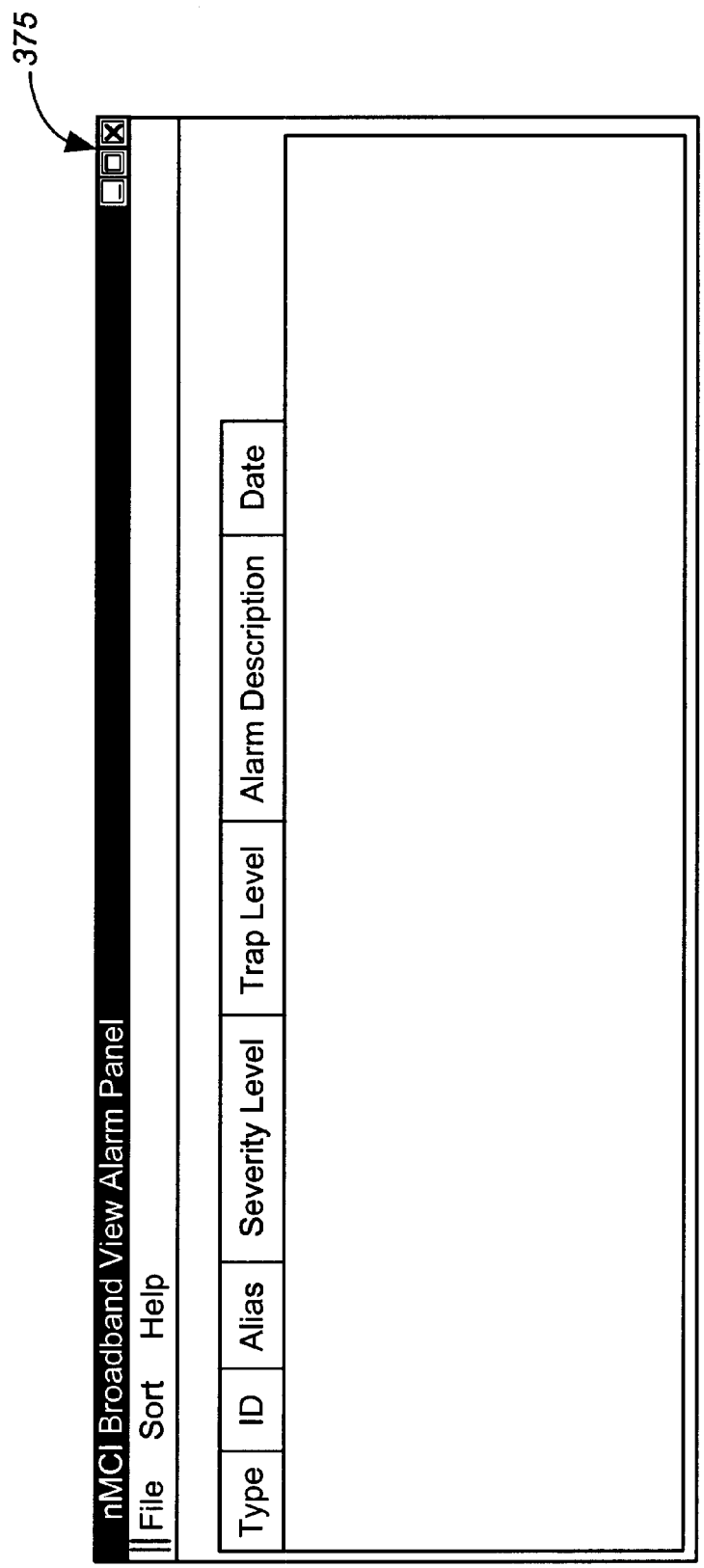

Thus, as further shown in FIG. 12(b), the selection of the SNMP Alarm option 354 enables the presentation of a BB alarm panel screen 375 an example screen of which is shown in FIG. 12(f). From the screen of FIG. 12(f), the user is enabled to retrieve and view their virtual network alarm conditions including the following indications: an alarm type; circuit id; alias; alarm severity level; alarm trap level; alarm description; and, date of the alarm.

Figure 10D:
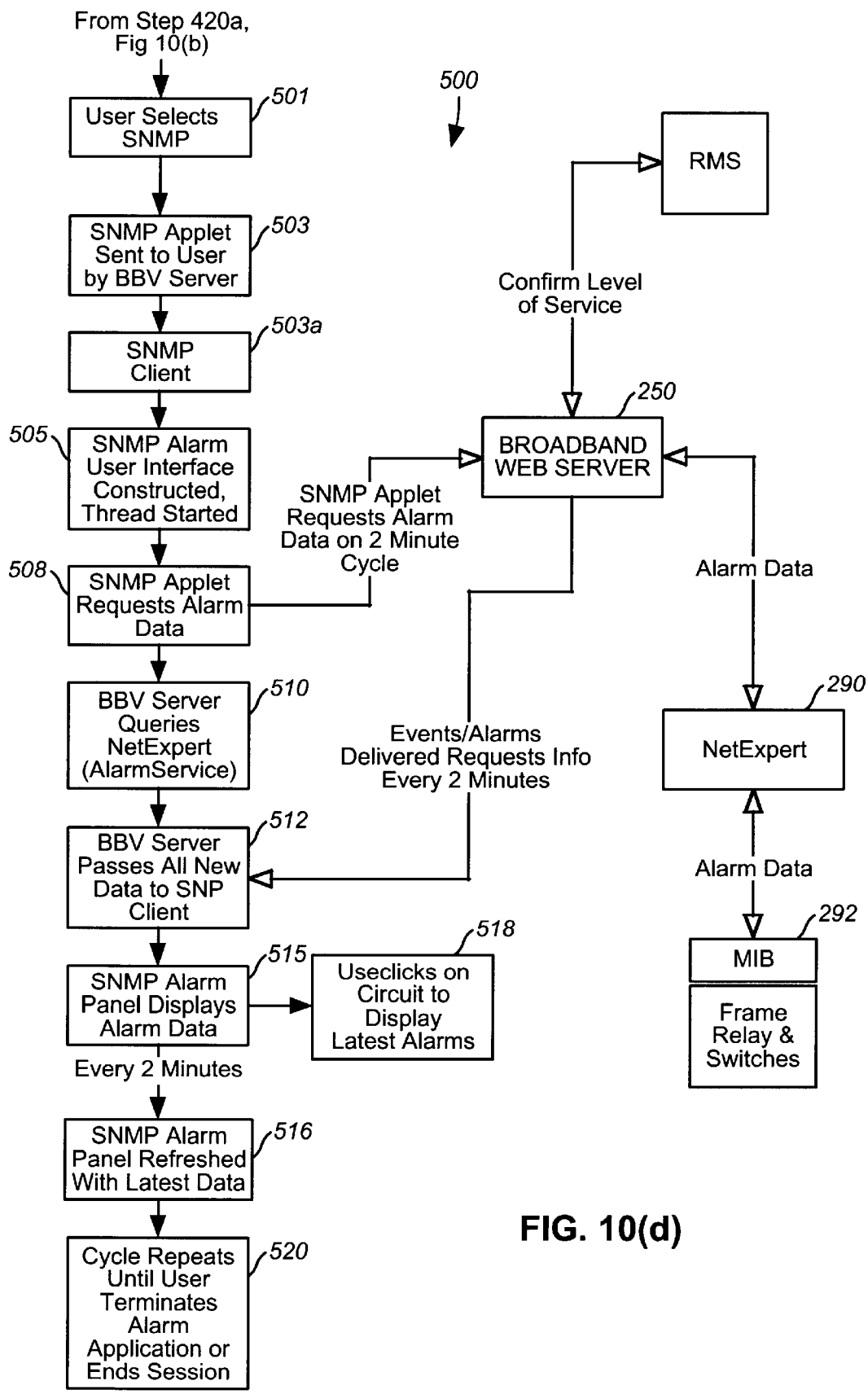

Specifically, FIG. 10(d) details the process flow 500 in providing near-real time Broadband alarms after user logon and authentication process is performed (FIG. 10(b)). As shown in FIG. 10(d), after the user selects SNMP Alarm button function from the main display at step 501, an SNMP applet is sent to the user by the BB Server application at step 503 to enable an SNMP client at step 503a. Particularly, the Main Display creates a SNMPAlarmPanelApp object to manage the application and instantiate other appropriate objects, e.g., SNMPAlarmPanelFrame, SNMPAlarmPanelView, SNMPAlarmPanelModel and SNMPAlarmPanelController to create the appropriate user interface components, as indicated at step 505. The application opens with a blank display and SNMPAlarmPanelApp starts a thread to handle communications with the BB Server to capture events and alarms. Every two minutes the application submits a request to BroadBand Server 250 for the latest current events and alarms for PVC and access circuits, as indicated at step 508. Specifically, the BroadBand Client invokes a "getAlarmList( )" method on BBProxyServer to retrieve a list of alarms. At step 510, the BB server passes this request to the NetXpert component 590 which communicates with the access circuits MIB 292 to retrieve all alarm/event data, receives the reply from NetXpert, and passes the data back to the SNMPAlarmPanelController, as indicated at step 512. The SNMPAlarmPanelController communicates with SNMPAlarmPanelView and SNMPAlarmPanelModel to update the display at steps 515, 516. All events and alarms for all circuits enabled for BB SNMP capability are retrieved in each polling cycle until the user terminates the alarm application or ends the session at step 520. As indicated at step 518, to view alarm data for a specific circuit, the user may double click on the circuit identifier and the latest alarm data is displayed.

In one embodiment, as shown in FIG. 12(f), the alarm data is handled by listing all of the PVCs and the associated Access Circuits as well. For each PVC and Access circuit all relevant events and alarms will be displayed. Preferably, color coding is used for indicating alarm severity in compliance with OSI standards, e.g., orange for major, red for critical. In the preferred embodiment, Broadband alarms may be grouped into two categories: Network Detected alarms and User Defined alarms. Network Detected alarms include: "Set alarms" that are generated when a condition exists indicating service degradation or failure, and "Clear alarms" which are generated when a previously set alarm condition no longer exists. Particularly, in order for alarm data to be updated, the alarm collection server process invokes two methods on BBProxyServer: 1) a "recordalarm" method which records an alarm and writes the alarm data to the database; and 2) a "clearAlarm" method which clears an alarm and removes it from the database.

It should be understood that all Network Detected Alarms are event-based and discovered by SNMP Network Management tool. User Defined Alarms include "Ad-Hoc Threshold" alarms which are generated in instances where a customer set value in a custom report is exceeded. The alarms are generated as the reports are updated, based on the polling frequency, and only when the customer set threshold is exceeded. User defined alarms additionally includes SNMP alarms which are generated when a customer defined alarm condition exists based on the SNMP service.

Figure 12G:
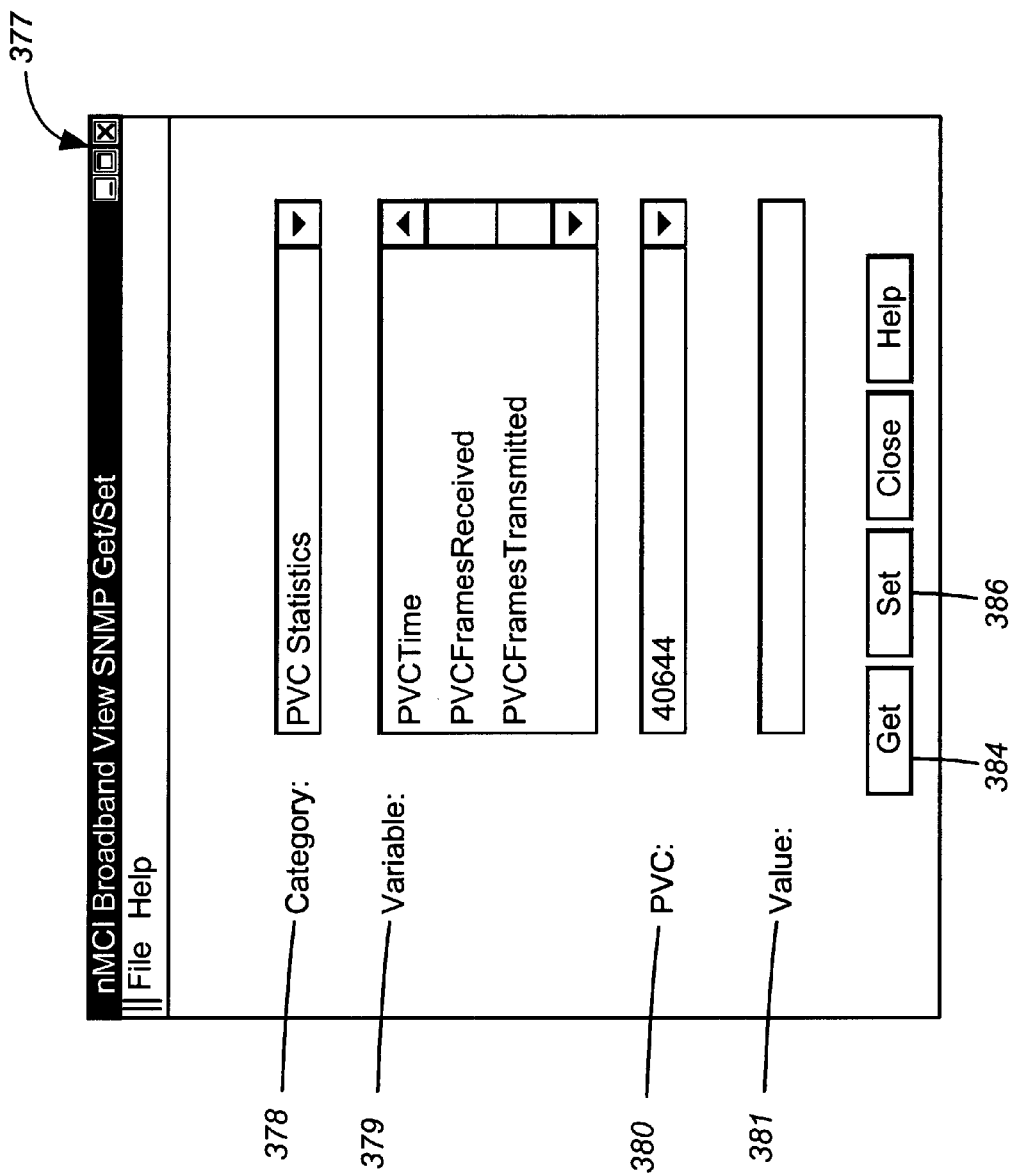

Assuming that order entry for the user has been completed and the user is provisioned with a level of service which includes SNMP functionality, the user has additional access to SNMP functions Get and Set. The Get and Set represent paired functionality which is accessed when the user selects the SNMP Get/Set option 362 from the BroadBand View Main Display of FIG. 12(a). The selection of the SNMP Get/Set option 362 enables the presentation of a BB SNMP Get/Set screen 377 an example screen of which is shown in FIG. 12(g). From the screen of FIG. 12(g), the user is enabled to: Get SNMP statistics and Set SNMP name.

Figure 10E:
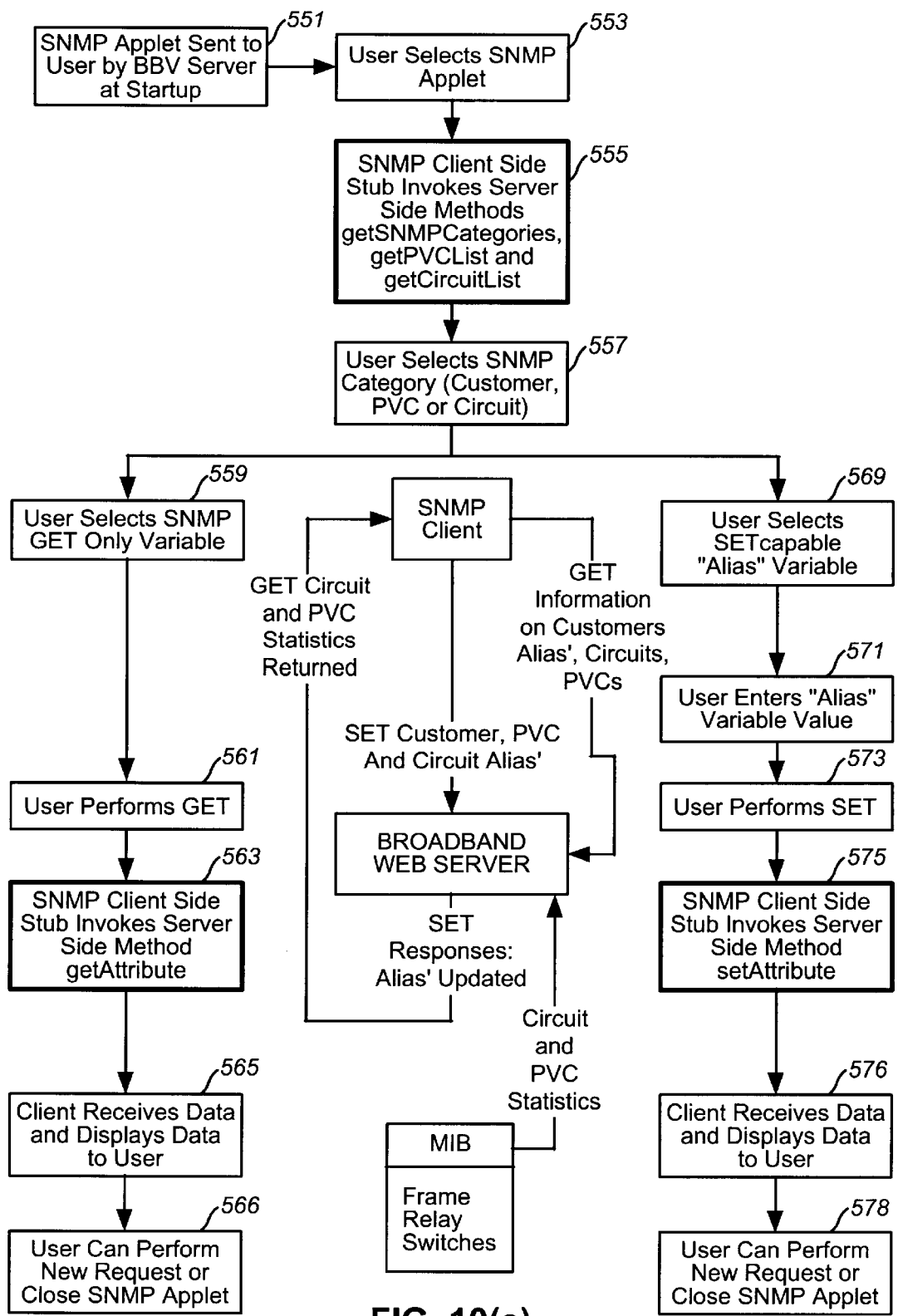

Specifically, FIG. 10(e) details the process flow 550 for providing SNMP Get/Set capabilities after user logon and authentication process is performed (FIG. 10(b)). As shown in FIG. 10(e), at startup, an SNMP applet is sent to the client workstation by the BB Server application at step 551. At step 553, selection of the SNMP Get/Set button (FIG. 12(a)) from the main display causes the creation of a SNMPGetSetApp (COApp) object to manage the session and create a series of objects, SNMPGetSetFrame, SNMPGetSetView, SNMPGetSetModel and SNMPGetSetController to handle the presentation to/interaction with the user. This also results in the presentation of the get/set display window (FIG. 12(g)) having a dialog box 377 presenting the user with the customer, PVC or circuit to be queried. Particularly, the SNMP client stub invokes the following BBProxyServer methods for populating the dialog box with the PVC and circuit information: 1) a getSnmpCategories( ) method for communicating the request to retrieve SNMP variables from the MIB; 2) a "getPVCList( )" method for returning a list of customer PVC's; and, 3) a "getCircuitList( )" method for returning a list of customer's access circuits, i.e., circuit IDs. As indicated at step 555, the appropriate service is invoked on BBProxyServer, the BroadBand database is queried and the results are returned to the customer browser for display. At step 557, the user selects the desired SNMP category 378, i.e., customer, PVC, or access circuit, to be queried. It should be understood that the MIB variable list box is updated to list only those variables from the selected category.

When a SNMP variable "GET" operation is desired, at step 559, the user selects the particular SNMP variable. Then, at step 561, the user invokes the get operation by selecting the GET button 384 from the Get/Set display of FIG. 12(g). Selection of the GET button causes the SNMP client stub to invoke the BBProxyServer side "getAttribute" method which returns object <String>, the string being an SNMP attribute name, to the customer browser, as indicated at step 563. By invoking the "getAttribute" method, the request is submitted to the BB server and communicated to the MIB to retrieve SNMP attributes, e.g., circuit and PVC statistics. At step 565, the MIB obtains the latest SNMP data, transfers the data to the BB server, and returns control to the BB Client which handles the display of the data to the customer (FIG. 12(g)). Particularly, the BB server issues a GetService request in turn to the MIB on the appropriate switch(es). The MIB locates the latest polled status information and returns the data to the server, which passes the data back to the client with a GetService Response message. Upon receipt of the data, the client closes the thread and updates the display. Finally, at step 566, the user may submit requests for SNMP variables from other circuits, or, may end the session.

In accordance with the preferred embodiments, the valid customer attributes that a client may get include: Name, Name Alias, Address, Contact, MCI Mail ID, Phone, Billing ID, and Mnemonic. The list of valid Access Circuit Attributes that a client may get include: Access Circuit Alias, Speed, Status, Carrier ID, Switch Board Type, Service Type, Location, Gateway Name, IP Address, NetEx ID, Start Time, End Time, Rcvd Packets, Sent Packets, Rcvd Octlets, Sent Octets, Rcvd Avg Packet Size, Sent Avg Packet Size, Rcvd Utilization, Sent Utilization, In Discards, Out Discards, In Errors, and Out Errors. The valid customer PVC attributes that a client may get include: PVC Alias, Dlci, CIR, Access Circuit ID, Status, Start Time, End Time, Frames Rcvd, Frames Sent, Octets Rcvd, Octets Sent, Frames Set DE, Frames Discarded DE, Frames Revd DE, Frames Sent DE, Frames Dropped, Octets Set DE, Octets Discarded DE, Octets Rcvd DE, Octets Send DE, Octets Dropped, Frames FECN, and Frames BECN.

Likewise, when the user wishes to Set a circuit name, the user first selects the particular SNMP variable, as indicated at step 569. The user further enters the "alias" variable value for the selected SNMP circuit at step 571. This "alias" variable value is entered in the "value" entry field 381 as shown in FIG. 12(*g*). Then, at step 573, the user invokes the set operation by selecting the SET button 386 from the Get/Set display of FIG. 12(*g*). Selection of the SET button causes the SNMP client stub to invoke the BBProxyServer side "setAttribute" method which updates the selected SNMP variable in the Broadband database sets, as indicated at step 575. By invoking the "setAttribute" method, the request is sent to the BB server which issues a setService( ) request to the MIB on the appropriate switch(es). The MIB changes the (user defined) alias assigned to the circuit and returns an acknowledgment to the server, which passes it to the client with a SetService Response message, at step 576. Upon receipt of the data, the client closes the thread and updates the display, acknowledging that the circuit name has been changed. Finally, at step 578, the user may submit new requests to set SNMP variables from other circuits, or, may end the session.

As mentioned, the Broadband network management tool 200 is an objected oriented application implemented in a client server architecture. To implement the Broadband reporting functionality as described herein, the Broadband proxy servers have a paired client side stub implementation used to initiate browser requests and receive server responses. Both proxy servers and client side stub implementations share common interfaces which interfaces describe the methods that are valid for a particular proxy server. In general, Broadband proxy servers 26 invokes methods received when their corresponding client side stub method is invoked by the browser and; returns responses for the requesting client side stub method, if required.

In particular, the Broadband Server proxy 26 is a process with multiple interfaces to the Broadband Web server database and GUI, each interface providing method signatures for a series of discreet services via specific Java methods. These interface/method combinations include: 1) BBAlarmServerInterface which provides SNMP alarm functionality by invoking: a) getAlarmList method which returns a vector of alarms to the customer browser; b) a recordalarm method which writes an intercepted alarm to the Broadband database; and c) clearAlarm method which deletes an alarm from the Broadband database; 2) BBMapServerInterface which provides graphical configuration mapping functionality by invoking: a) getSwitchLocations method which returns vector BBSwitchLocation, a list of switch locations, to the customer browser; b) getAccessCircuits method which returns a vector BBAccessCircuit, a list of access circuits, to the customer browser; and c) getPVCList method which returns vector <BBPVC>, (permanent virtual circuit), to the customer browser; 3) BBReportServerInterface which provides report management and delivery functionality by invoking: a) getReport method which returns object BBReport to the customer browser; b) getReportList method which returns vector <BBReport>, a list of valid report types, to the customer; c) getInboxReports method which returns vector <BBReport>, a list of reports available in the customer's Inbox; and d) setReportGeneration method which returns Boolean value to the customer browser after updating the Broadband database; 4) BBServerInterface which provides Broadband Web server access functionality by invoking a logon method which returns a Boolean value to the customer browser after authenticating customer access; 5) BBSnmpServerInterface which provides SNMP Get/Set functionality by invoking: a) getSnmpCategories method which returns vector <BBSnmpCategory>, a list of SNMP performance variables, to the customer browser; b) getPVCList method which returns vector <String >, each String a PVC number, to the customer browser; c) getCircuitList method which returns vector <String >, each string a Circuit ID, to the customer browser; d) setAttribute method which updates an SNMP variable in the Broadband database sets; and e) getAttribute method which returns object <String>, the string being an SNMP attribute name, to the customer browser; and, 6) BBUtilityServerInterface which provides the interface for all other browser functionality by invoking: a) getLevelOfService method which returns object BBUtilityServiceLevel, a level of service value, to the customer browser; b) getHelpDeskNumber method which returns object <String>, the string being a customer service contact phone number, to the customer browser; c) getCircuitLocation method which returns vector <String>, each string a circuit location ID, to the customer browser; d) setCircuitLocation method which returns a boolean value to the customer browser after updating circuit location values in the Broadband database; e) getServiceType method which returns object BBServiceType, a broadband service type (Frame Relay or SMDS) identifier, to the customer browser; and f) getMessageCenterText method which returns object <String> the string being a textual string value, to the customer browser.

The formats for each of these methods are described in Appendix A.

Although each server side method performs a specific back end function, it may also return an object, or basic type (int, float, etc.) to the invoking client side stub. Most methods generally perform back end database updates, keyed by values. Java Database Connectivity (JDBC), e.g., such as the jconnect® system by Sybase, can be used as the transaction protocol between the Broadband proxy and the Broadband Server. Object returning methods return either 1) a single object made up of string values as documented in Appendix A; or, 2) vector objects, containing lists. The vector objects are variable byte streams and are essentially objects that are containers for a group of related objects. Every server side method has the ability of throwing error exceptions, in lieu of generated return codes.

Figure 14:
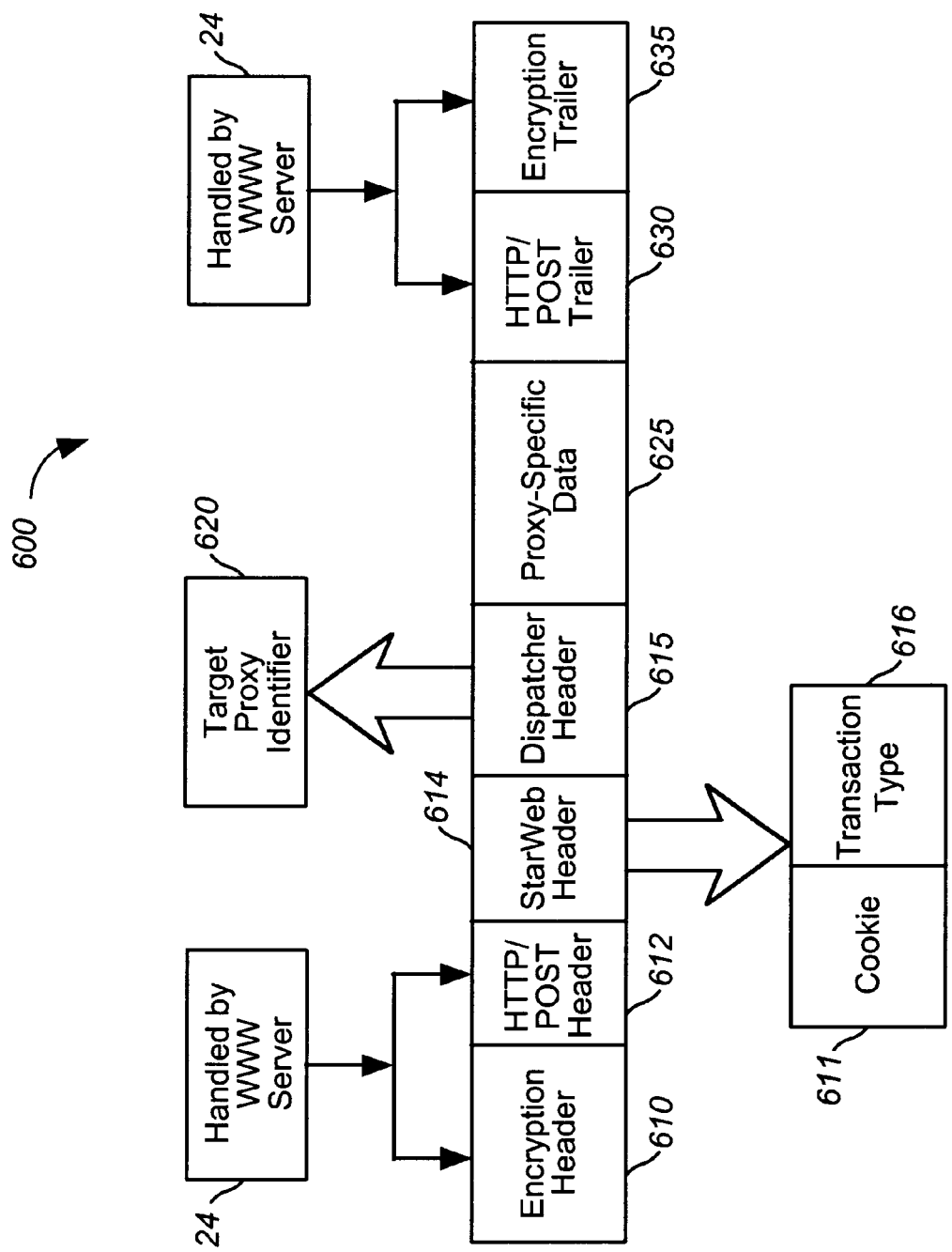
FIG. 14 illustrates a logical message format sent from the client browser to the desired middle tier server for a particular application; and, FIGS. 15(a) and 15(b) are schematic illustrations showing the message format passed between the Dispatcher server and the application specific proxy (FIG. 15(a)) and the message format passed between the application specific proxy back to the Dispatcher server (FIG. 15(b)).

As described herein with respect to FIG. 2, the messages created by the client Java software are transmitted to the secure Web Servers 24 over HTTPS. For incoming (client-to-server) communications, the Secure Web servers 24 decrypt a request, authenticate and verify the session information. The logical message format from the client to the Web server is shown as follows:

‖ TCP/IP ‖ encryption ‖ http ‖ web header ‖ dispatcher header ‖ proxy-specific data ‖ where "‖" separates a logical protocol level, and protocols nested from left to right. FIG. 14 illustrates a specific message sent from the client browser to the desired middle tier server for the particular application. As shown in FIG. 14, the client message 600 includes an SSL encryption header 610 and a network-level protocol HTTP/POST header 612 which are decrypted by the Secure Web Server(s) 24 to access the underlying message; a DMZ Web header 614 which is used to generate a cookie 611 and transaction type identifier 616 for managing the client/server session; a dispatcher header 615 which includes the target proxy identifier 620 associated with the particular type of transaction requested; proxy specific data 625 including the application specific message utilized by the target proxy to form the particular messages for the particular middle tier server providing a service; and, the network-level HTTP/POST trailer 630 and encryption trailer 635 which are also decrypted by the DMZ Web server 24.

Referring to FIG. 2, after establishing that the request has come from a valid user and mapping the request to its associated session, the request is then forwarded through the firewall 25*b* over a socket connection 23 to one or more decode/dispatch servers 26 located within the corporate Intranet 30 (FIG. 2). The messaging sent to the Dispatcher will include the user identifier and session information, the target proxy identifier, and the proxy specific data. The decode/dispatch server 26 decrypts then authenticates the user's access to the desired middle-tier service from previously cached data from the StarOE server as described in greater detail in above-identified, co-pending U.S. patent application Ser. No. 09/159,514.

As shown in FIG. 14, the Secure Web server 24 forwards the Dispatcher header and proxy-specific data to the Dispatcher Server 26 "enriched" with the identity of the user (and any other session-related information) as provided by the session data/cookie mapping, the target proxy identifier and the proxy-specific data. The dispatch server 26 receives the requests forwarded by the Secure Web server(s) 24 and dispatches them to the appropriate application server or its proxy. The messages wrappers are examined, revealing the user and the target middle-type service for the request. A first-level validation is performed, making sure that the user is entitled to communicate with the desired service. The user's entitlements in this regard are fetched by the dispatch server 26 from StarOE server 260 at logon time and cached. Assuming that the Requestor is authorized to communicate with the target service, the message is then forwarded to the desired service's proxy. Each of these proxy processes further performs: a validation process for examining incoming requests and confirming that they include validly formatted messages for the service with acceptable parameters; a translation process for translating a message into an underlying message or networking protocol; and, a management process for managing the communication of the specific customer request with the middle-tier server to actually get the request serviced. Data returned from the middle-tier server is translated back to client format, if necessary, and returned to the dispatch server as a response to the request.

It should be understood that the application server proxies can either reside on the dispatch server 26 itself, or, preferably, may be resistant on the middle-tier application server, i.e., the dispatcher front end code can locate proxies resident on other servers.

Figure 15A:
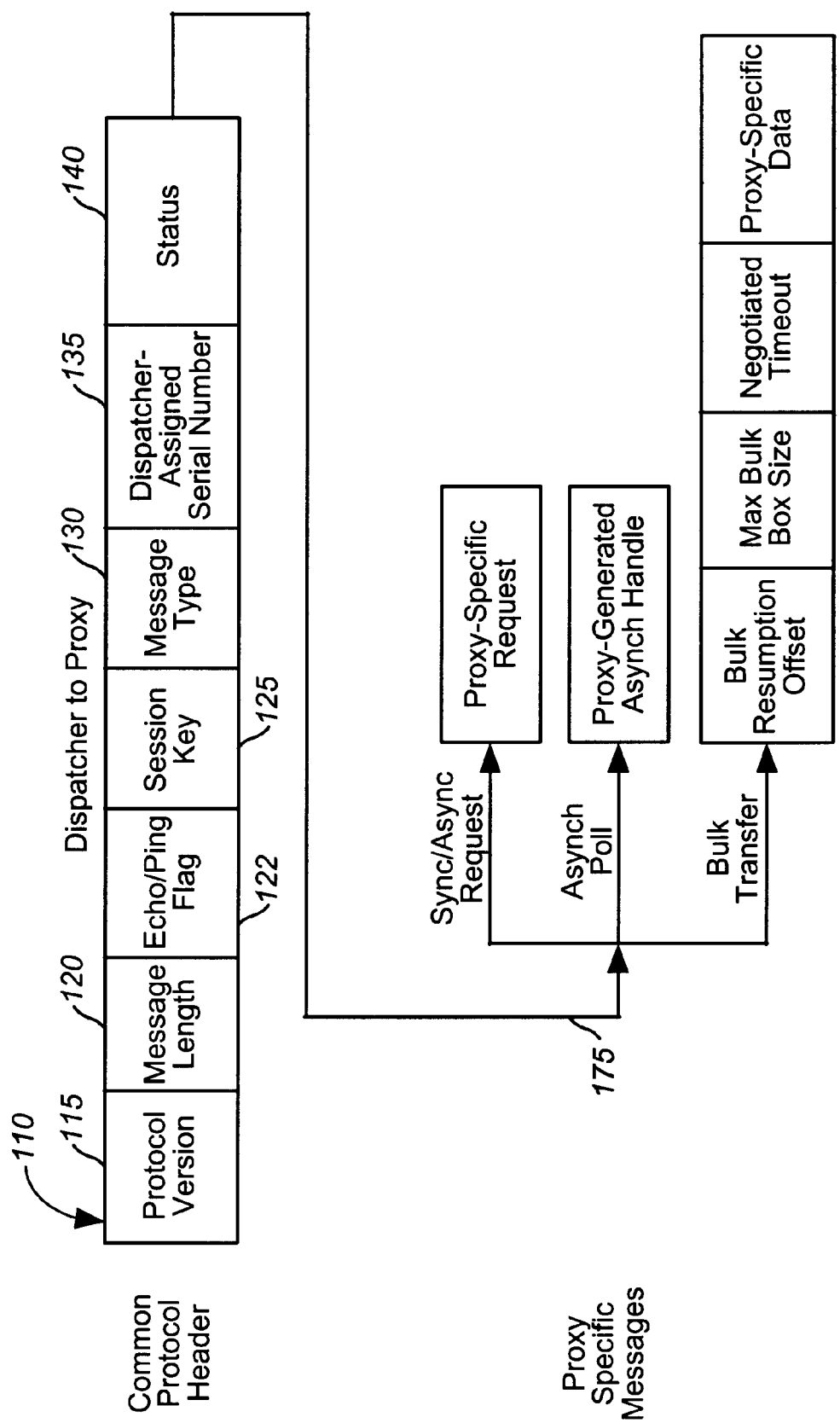
Figure 15B:
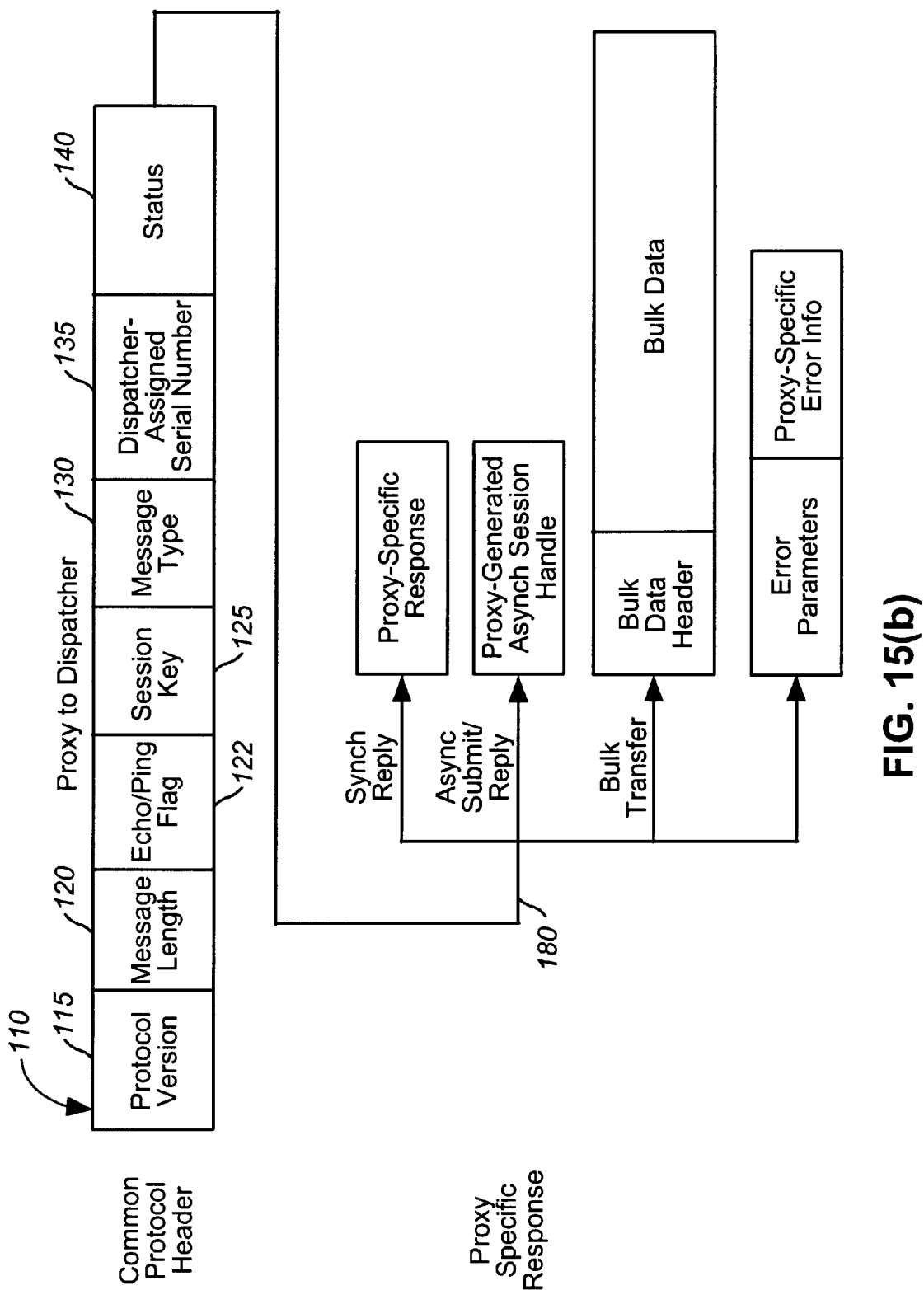

FIGS. 15(*a*) and 15(*b*) are schematic illustrations showing the message format passed between the dispatcher 26 and the relevant application specific proxy (FIG. 15(*a*)) and the message format passed between the application specific proxy back to the Dispatcher 26 (FIG. 15(*b*)). As shown in FIG. 15(*a*), all messages between the Dispatcher and the Proxies, in both directions, begin with a common header 110 to allow leverage of common code for processing the messages. A first portion of the header includes the protocol version 115 which may comprise a byte of data for identifying version control for the protocol, i.e., the message format itself, and is intended to prevent undesired mismatches in versions of the dispatcher and proxies. The next portion includes the message length 120 which, preferably, is a 32-bit integer providing the total length of the message including all headers. Next is the echo/ping flag portion 122 that is intended to support a connectivity test for the dispatcher-proxy connection. For example, when this flag is non-zero, the proxy immediately replies with an echo of the supplied header. There should be no attempt to connect to processes outside the proxy, e.g., the back-end application services. The next portion indicates the Session key 125 which is the unique session key or "cookie" provided by the Web browser and used to uniquely identify the session at the browser. As described above, since the communications middleware is capable of supporting several types of transport mechanisms, the next portion of the common protocol header indicates the message type/mechanism 130 which may be one of four values indicating one of the following four message mechanisms and types: 1)Synchronous transaction, e.g., a binary 0; 2) Asynchronous request, e.g., a binary 1; 3) Asynchronous poll/reply, e.g., a binary 2; 4) bulk transfer, e.g., a binary 3.

Additionally, the common protocol header section includes an indication of dispatcher-assigned serial number 135 that is unique across all dispatcher processes and needs to be coordinated across processes (like the Web cookie (see above)), and, further, is used to allow for failover and process migration and enable multiplexing control between the proxies and dispatcher, if desired. A field 140 indicates the status is unused in the request header but is used in the response header to indicate the success or failure of the requested transaction. More complete error data will be included in the specific error message returned. The status field 140 is included to maintain consistency between requests and replies. As shown in FIG. 15(*a*), the proxy specific messages 175 may be metadata message requests from a report requestor client and can be transmitted via a synchronous, asynchronous or bulk transfer transport mechanism. Likewise, the proxy specific responses are metadata response messages 180 again, capable of being transmitted via a synchronous, asynchronous or bulk transfer transport mechanism.

It should be understood that the application server proxies may either reside on the dispatch server 26 itself, or, preferably, may be resident on the middle-tier application servers i.e., the dispatcher front end code can locate proxies resident on other servers.

As mentioned, the proxy validation process includes parsing incoming requests, analyzing them, and confirming that they include validly formatted messages for the service with acceptable parameters. If necessary, the message is translated into an underlying message or networking protocol. If no errors are found, the proxy then manages the communication with the middle-tier server to actually get the request serviced. The application proxy supports application specific translation and communication with the back-end application server for both the Web Server (java applet originated) messages and application server messages. Particularly, in performing the verification, translation and communication functions, the proxies employ front end proxy C++ objects and components.

Outgoing (server-to-client) communications follow the reverse route, i.e., the proxies feed responses to the decode/dispatch server 26 and communicate them to the DMZ Web servers 24 over the socket connection. The Web servers 26 will forward the information to the client 10 using SSL. The logical message format returned to the client from the middle tier service is shown as follows:

|| TCP/IP || encryption || http || web response || dispatcher response || proxy-specific response || where "||" separates a logical protocol level, and protocols nested from left to right.

While the Broadband system described herein consists of performance reporting and trouble shooting tools that provide customers access to near real-time performance statistics and real-time alarms relating to a customer's Broadband network, including access and egress circuits and permanent virtual circuits, it should be understood that, in accordance with the principles of the invention, additional functionality may be provided including the ability to: 1) Monitor and report performance of Peak Information Rate ("PIR") which identifies the PIR to which the customer has subscribed, by PVC, and the rate at which they are transmitting compared to the assigned PIR. PIR monitoring includes the generation of an alarm when the PIR is exceeded; 2) monitor and report performance of PVC Redirect Events and Duration, i.e., support the reporting and alarming of a customer's PVC redirect feature to include all metrics and alarms available for PVC's 3) monitor & report performance of frame relay SVCs, i.e., support reporting and alarming of customer SVCs to include all metrics and alarms available for PVC's ; 4) monitor & report performance of frame relay SDLC, i.e., support reporting and alarming of a customer's SDLC service to include all metrics and alarms available for PVC's ; 5) provide service level guarantee reporting, i.e., support reporting of the Network's performance based on the SLG of the supported service; 6) provide Gateway Reporting, i.e., ability to support reporting and alarming of a customer's service that includes gateway traffic to include all metrics and alarms available for PVC's and SVCs that transition gateways; 7) ability to streamline existing reports, i.e., provide streamlined reports based on the capabilities via the nMCI Interact platform. This includes the elimination of unnecessary report fields based on the reports value position; 8) an ability to switch presentation of reports in Graphical and Tabular form and vice versa by reported element, i.e, support graphical to tabular report views and tabular to graphical report views by element presented; 9) ability to select more than one ad-hoc reporting variable for graphical display, i.e., support multiple selection and display of all variables in the ad-hoc reporting function for both physical and logical circuits; 10) ability to support customer defined thresholds in the ad-hoc reporting function which, when exceeded, cause an alarm to be provided to the customers SNMP interface; 11) ability to allow the customer to turn off any single or combination or reports in their selected service tier that they no longer want to receive and, then, reactive them when their needs change; and 12) an ability to support ad-hoc alarming functions based on the SNMP service such that a customer may define an event that, when the event exists, an SNMP alarm is delivered to the SNMP interface informing the customer of the events occurrence. This differs from the ad-hoc reporting SNMP alarming in that the Management Information Base (MIB) is used to select the alarm conditions via the ad-hoc reporting template.

The foregoing merely illustrates the principles of the present invention. Those skilled in the art will be able to devise various modifications, which although not explicitly described or shown herein, embody the principles of the invention and are thus within its spirit and scope.

APPENDIX A

Descriptions of interface/method combinations mentioned herein:
1) BBAlarmServerInterface
1a) getAlarmList method returns a vector of alarms to the customer browser in format:
    public Vector
        getAlarmList ()
            throws BBException, IOException;
1b) recordAlarm method writes an intercepted alarm to the Broadband database in format:
    public void

APPENDIX A-continued recordAlarm
           (
                String alarmType__,
                String interfaceID__,
                int alarmID__,
                String timeStamp__,
                int severityLevel__,
                String alarmText__
            ) throws BBException, IOException;
1c) clearAlarm method deletes an alarm from the Broadband database in format:
    public void
        clearAlarm
            (
                String alarmType__,
                String interfaceID__,
                int alarmID__,
                String timeStamp__
            ) throws BBException, IOException;
2) BBMapServerInterface
2a) getSwitchLocations method returns vector BBSwitchLocation, a list of switch locations, to the customer browser in format:
    public Vector
        getSwitchLocations ()
        throws BBException, IOException;
2b) getAccessCircuits method returns vector BBAccessCircuit, a list of access circuits, to the customer browser in format:
    public Vector
        getAccessCircuits ()
        throws BBException, IOException;
2c) getPVCList method returns vector<BBPVC>, (permanent virtual circuit), to the customer browser in format:
    public Vector
        getPVCList ()
        throws BBException, IOException;
3) BBReportServerInterface
3a) getReport method returns object BBReport to the customer browser in format:
    public BBReport
        getReport
            (
                int reportID__,
                int reportType__,
                int scheduleType__,
                GregorianCalendar date__
            )
        throws BBException, IOException
3b) getReportList method returns vector<BBReport>, a list of valid report types, to the customer browser in format:
    public Vector
        getReportList ()
        throws BBException, IOException
3c) getInboxReports method returns vector<BBReport>, a list of reports available in the customer's Inbox, to the customer browser in format:
    public Vector
        getInboxReports ()
        throws BBException, IOException;
3d) setReportGeneration method returns Boolean value to the customer browser after updating the Broadband database in format:
    public boolean
        setReportGeneration
            (
                int reportID__,
                int reportType__,
                int scheduleType__,
                boolean generateReports__
            )
        throws BBException, IOException;
4) BBServerInterface
4a) logon method returns a Boolean value to the customer browser after authenticating customer access in format:
    public boolean
        logon
            (
                String password__
            )
        throws BBException, IOException;
5) BBSnmpServerInterface

APPENDIX A-continued 5a) getSnmpCategories method returns vector<BBSnmpCategory>, a list of SNMP performance variables, to the customer browser in format:
```
        public Vector
            getSnmpCategories()
            throws BBException, IOException;
```
5b) getPVCList method returns vector< String >, each String a PVC number, to the customer browser in format:
```
        public Vector
            getPVCList()
            throws BBException, IOException;
```
5c) getCircuitList method returns vector< String >, each String a Circuit ID, to the customer browser in format:
```
        public vector
            getCircuitList()
            throws BBException, IOException;
```
5d) setAttribute method updates the an SNMP variable in the Broadband databasesets in format:
```
        public void
            setAttribute
            (
            String attribute_,
            String attributeValue_,
            int type_,
            String typeValue_
            ) throws BBException, IOException;
```
5e) getAttribute method returns object <String>, the string being and SNMP attribute name, to the customer browser in format:
```
        public String
            getAttribute
            (
            String category_,
            String attribute_,
            int type_,
            String typeValue_
            ) throws BBException, IOException;
```
6) BBUtilityServerInterface
6a) getLevelOfService method returns object BBUtilityServiceLevel, a level of service value, to the customer browser in format:
```
        public BBUtilityServiceLevel
            getLevelOfService()
            throws BBException, IOException
```
6b) getHelpDeskNumber method returns object <String>, the string being a customer service contact phone number, to the customer browser in format:
```
        public String
            getHelpDeskNumber()
            throws BBException, IOException;
```
6c) getCircuitLocation method returns vector <String>, each string a circuit location ID, to the customer browser in format:
```
        public Vector
            getCircuitLocation()
            throws BBException, IOException;
```
6d) setCircuitLocation method returns a boolean value to the customer browser after updating circuit location values in the Broadband database in format:
```
        public boolean
            setCircuitLocation
            (
            String circuitID_,
            String circuitLocation_
            )
            throws BBException, IOException;
```
6e) getServiceType method returns object BBServiceType, a broadband service type (Frame Relay or SMDS) identifier, to the customer browser in format:
```
        public BBServiceType
            getServiceType()
            throws BBException, IOException;
```
6f) getMessageCenterText method returns object <String> the string being a textual string value, to the customer browser in format:
```
        public String
            getMessageCenterText()
            throws BBException, IOException; format
```

What is claimed is:

1. A Web/Internet based reporting system for communicating a network performance report relating to a customer's switched packet data network to the customer via an integrated interface, said system comprising:

a client browser application located at a client workstation for enabling interactive Web based communications with said reporting system, said client workstation identified with said customer and providing said integrated interface;

at least one secure server for managing client sessions over the Internet and supporting a secure socket connection enabling encrypted communication between said browser application client and said secure server, said secure server enabling forwarding of a request message from said client browser application and forwarding of an associated response message back to said client browser application over said secure connection;

a device for receiving network information pertaining to said customer, said device then associating said customer with a corresponding one of a plurality of levels of service; and a device for periodically polling network switches pertaining to said customer's network and generating a particular network performance report relating thereto based on said one level of service, wherein said particular network performance report is assembled in a form suitable for display at said client workstation via said integrated interface.

2. The reporting system as claimed in claim 1, further including report viewer application enabling display of reports in accordance with customer input, said customer input specifying reporting views selected from graphical, and tabular, and map views.

3. The reporting system as claimed in claim 2, wherein said report viewer application enables simultaneous multiple graph reporting views.

4. The reporting system as claimed in claim 2, wherein said report viewer application enables graphic display view of a customer's data network, said view application including process for highlighting an area on said graphical representation to translate said graphic view into corresponding tabular view.

5. The reporting system as claimed in claim 4, wherein said graphic display includes an area map view having indicators depicting of end point locations of a customer's data network.

6. The reporting system as claimed in claim 5, wherein said report viewer application further enables generation of a textual view having information pertaining to physical circuits supported at said selected end point location of said customer's data network.

7. The reporting system as claimed in claim 6, wherein said physical circuits supported at said selected end point location includes permanent virtual circuits.

8. The reporting system as claimed in claim 2, wherein said client application further enables the presentation of customer defined reports that includes specific network performance data obtained during a customer-defined prior time interval.

9. The reporting system as claimed in claim 1, wherein said network generates alarm status indications, said system further including a device for communicating real-time alarm data pertaining to a customer's network over said secure connection for presentation to a customer via said integrated interface.

10. The reporting system as claimed in claim 9, wherein said real-time alarm data includes alarm information obtained from access and egress circuits configured between a customer premises equipment to a broadband data network access switch.

11. The reporting system as claimed in claim 9, wherein said real-time alarm data includes alarm information obtained from permanent virtual circuits configured in said customer's network.

12. The reporting system as claimed in claim 1, wherein said customer network is a Broadband Frame-Relay network, said polling device polling switches and circuits included in said networks to obtain performance data for generating said report.

13. The reporting system as claimed in claim 1, wherein said network performance report is generated based on customer-defined network performance thresholds specifying reporting of specific network behavior, said client browser application enabling customer-specification of said network performance thresholds via said integrated interface.

14. The reporting system as claimed in claim 1, wherein said performance report includes information relating to broadband network latency.

15. The reporting system as claimed in claim 1, wherein said performance report includes information relating to broadband network throughput.

16. The reporting system as claimed in claim 1, further including a process for enabling acquisition of metrics pertaining to service level guarantees for a customer's broadband network.

17. The reporting system as claimed in claim 1, wherein said assembled response data is input to an intermediate storage device prior to being dispatched over said secure communications link for display at said client workstation.

18. The reporting system as claimed in claim 17, wherein said intermediate storage device is an inbox server, said performance report being provided to said inbox server based on customer request.

19. The reporting system as claimed in claim 1, further including a report requestor device for enabling presentation of a report request menu comprising various reporting options for said customer in accordance with customer entitlements.

20. The reporting system as claimed in claim 1, wherein the particular report is not generated in response to a request from the customer to generate the particular report.

21. A method for communicating a network performance report over a Web/Internet interface for receipt by a customer via an integrated interface, said report relating to a customer's data network, said method comprising:

providing a client browser application located at a client workstation for enabling interactive Web based communications between said customer and said integrated interface;

managing a client session over the Web/Internet by providing a first server device capable of supporting a secure connection enabling encrypted communication between said client browser application and said first server, said first server enabling forwarding of a report request message from said client application and forwarding of an associated report response message back to said client browser application over said secure connection;

inputting network information pertaining to a specific customer to a device and associating said customer with a corresponding one of a plurality of levels of service via said device;

periodically polling network switches pertaining to said customer's network and generating a particular network performance report relating thereto based on said one level of service; and assembling said particular network performance report in a form suitable for display at said client workstation via said integrated interface.

22. The method as claimed in claim 21, further comprising the step of providing report viewer device for enabling display of reports in accordance with customer input, said customer input specifying reporting views selected from graphical, tabular, and map views.

23. The method as claimed in claim 21, wherein the particular report is not generated in response to a request from the customer to generate the particular report.

* * * * *